United States Patent
Kim et al.

(10) Patent No.: US 10,237,717 B2
(45) Date of Patent: Mar. 19, 2019

(54) METHOD FOR PROXIMITY-BASED NOTIFICATION IN WIRELESS COMMUNICATION SYSTEM, AND DEVICE FOR SAME

(71) Applicant: LG ELECTRONICS INC., Seoul (KR)

(72) Inventors: Hakseong Kim, Seoul (KR); Seungmoon Shin, Seoul (KR); Sunghoon Jung, Seoul (KR); Yujin Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 15/303,918

(22) PCT Filed: Apr. 13, 2015

(86) PCT No.: PCT/KR2015/003674
§ 371 (c)(1),
(2) Date: Oct. 13, 2016

(87) PCT Pub. No.: WO2015/160157
PCT Pub. Date: Oct. 22, 2015

(65) Prior Publication Data
US 2017/0034688 A1 Feb. 2, 2017

Related U.S. Application Data

(60) Provisional application No. 61/978,978, filed on Apr. 13, 2014, provisional application No. 61/978,979, (Continued)

(51) Int. Cl.
*H04W 8/00* (2009.01)
*H04W 76/14* (2018.01)
(Continued)

(52) U.S. Cl.
CPC ........... *H04W 8/005* (2013.01); *G01S 5/0036* (2013.01); *G01S 5/0289* (2013.01); *G01S 5/26* (2013.01);
(Continued)

(58) Field of Classification Search
CPC ....... H04W 48/16; H04W 4/005; H04W 4/02; H04W 4/021; H04W 4/023; H04W 4/06;
(Continued)

(56) References Cited

U.S. PATENT DOCUMENTS 8,688,839 B2* 4/2014 Subramanian .......... H04L 63/10
709/226
2011/0294474 A1 12/2011 Barany et al.
(Continued)

FOREIGN PATENT DOCUMENTS

KR     1020130129373      11/2013

OTHER PUBLICATIONS

3GPP TS 362.13v14.5.0—"3rd Generation Partnership Project; Technical Specification Group Radio Access Network; Evolved Universal Terrestrial Radio Access (E-UTRA); Physical Layer procedures (Release 14)" Section 14.3.2, p. 415. (Year: 2017).*
(Continued)

*Primary Examiner* — Stephen J Clawson
(74) *Attorney, Agent, or Firm* — Lee Hong Degerman Kang Waimey

(57) ABSTRACT

The present invention discloses a proximity based notification method in a wireless communication system and a device for the same. In detail, a proximity based notification method in a wireless communication system supporting device to device communication (D2D) may include the steps of: configuring, by a first terminal, a list of terminals which participate in an notification service and a notification time; broadcasting, by the first terminal, a discovery signal
(Continued)

including a first D2D ID on a physical sidelink discovery channel (PSDCH) when the notification time arrives; and outputting, by the first terminal, a notification for notifying that a second terminal is proximate when the first terminal receives a second discovery signal including a second D2D ID from the second terminal included in the terminal list on the PSDCH.

1 Claim, 50 Drawing Sheets

Related U.S. Application Data filed on Apr. 13, 2014, provisional application No. 61/978,976, filed on Apr. 13, 2014, provisional application No. 61/978,977, filed on Apr. 13, 2014.

(51) Int. Cl.
| | |
|---|---|
| *H04W 4/70* | (2018.01) |
| *H04W 4/02* | (2018.01) |
| *H04W 4/06* | (2009.01) |
| *H04W 68/00* | (2009.01) |
| *G01S 5/02* | (2010.01) |
| *H04W 48/16* | (2009.01) |
| *G01S 5/00* | (2006.01) |
| *G01S 5/26* | (2006.01) |
| *H04W 4/12* | (2009.01) |
| *H04W 4/021* | (2018.01) |
| *H04W 4/08* | (2009.01) |
| *H04W 88/04* | (2009.01) |

(52) U.S. Cl.
CPC ............... *H04W 4/02* (2013.01); *H04W 4/06* (2013.01); *H04W 4/70* (2018.02); *H04W 48/16* (2013.01); *H04W 68/005* (2013.01); *H04W 76/14* (2018.02); *H04W 4/021* (2013.01); *H04W 4/023* (2013.01); *H04W 4/08* (2013.01); *H04W 4/12* (2013.01); *H04W 88/04* (2013.01)

(58) Field of Classification Search
CPC ........... H04W 4/08; H04W 4/12; H04W 4/70; H04W 68/005; H04W 76/023; H04W 76/14; H04W 88/04; H04W 8/00; H04W 8/005
USPC ........................................................ 370/329
See application file for complete search history.

(56) References Cited

U.S. PATENT DOCUMENTS

| | | |
|---|---|---|
| 2012/0163235 A1 | 6/2012 | Ho et al. |
| 2013/0051277 A1* | 2/2013 | Hakola ................ H04W 76/14 370/254 |
| 2013/0287012 A1* | 10/2013 | Pragada ................ H04W 76/25 370/338 |
| 2013/0324114 A1 | 12/2013 | Raghothaman et al. |
| 2014/0003262 A1* | 1/2014 | He ........................ H04W 28/08 370/252 |
| 2014/0056220 A1 | 2/2014 | Poitau et al. |
| 2018/0084480 A1* | 3/2018 | Yasukawa ............. H04W 76/14 |

OTHER PUBLICATIONS

PCT International Application No. PCT/KR2015/003674, International Search Report dated Aug. 28, 2015, 2 pages.
European Patent Office Application Serial No. 15780134.1, Search Report dated Aug. 16, 2017, 9 pages.
European Patent Office Application Serial No. 15780134.1, Search Report dated Nov. 21, 2017, 8 pages.
3rd Generation Partnership Project (3GPP), "Technical Specification Group Radio Access Network; Evolved Universal Terrestrial Radio Access (E-UTRA); Physical layer procedures (Release 12)," Draft 3GPP TS 36.213 V12.5.0, XP050948459, Mar. 2015, 240 pages.
China Mobile, et al., "Security analysis for restricted ProSe discovery", 3GPP TSG SA WG3 (Security) Meeting #74, S3-140233, XP050766535, Jan. 2014, 3 pages.

* cited by examiner

[FIG. 1]
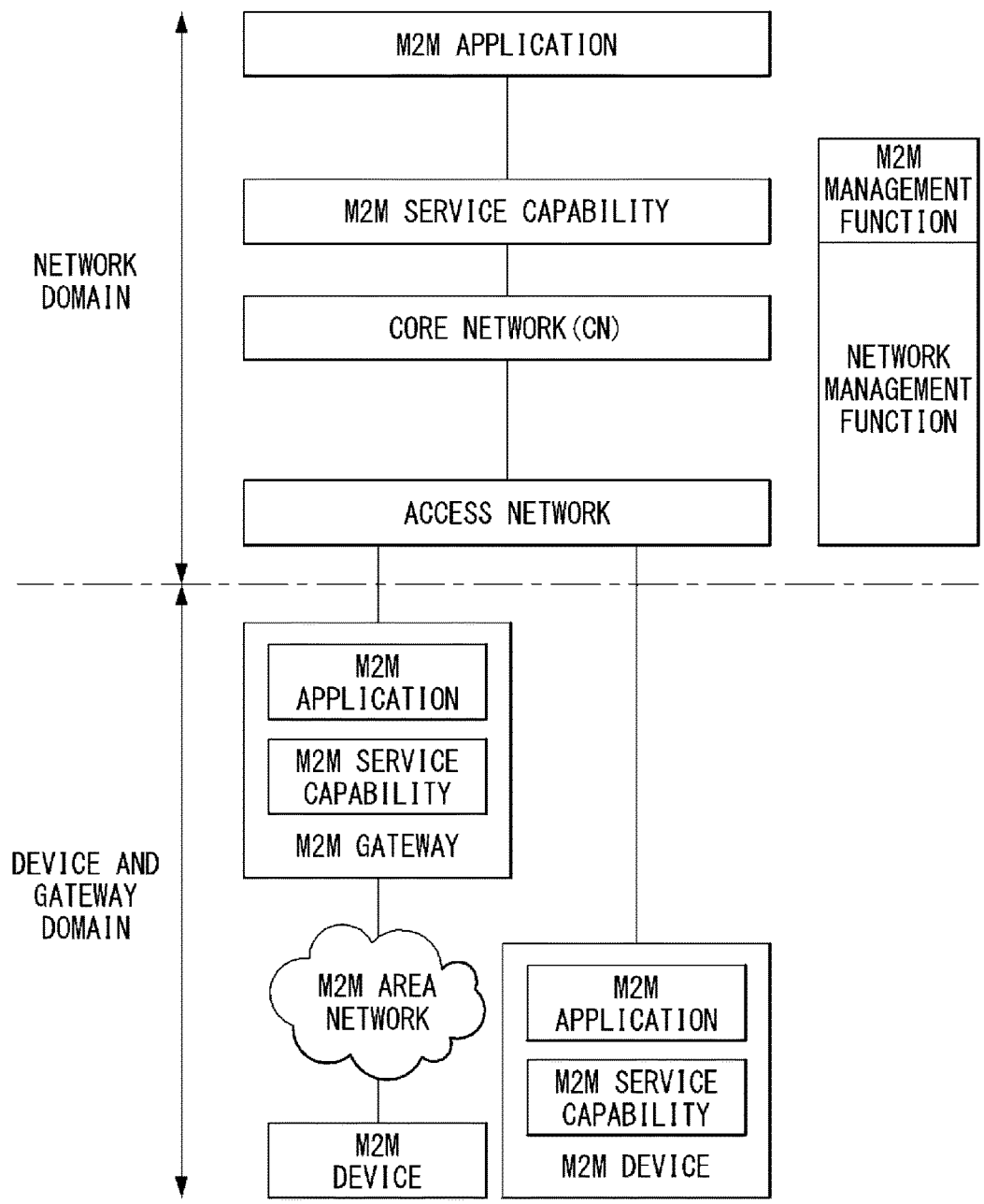

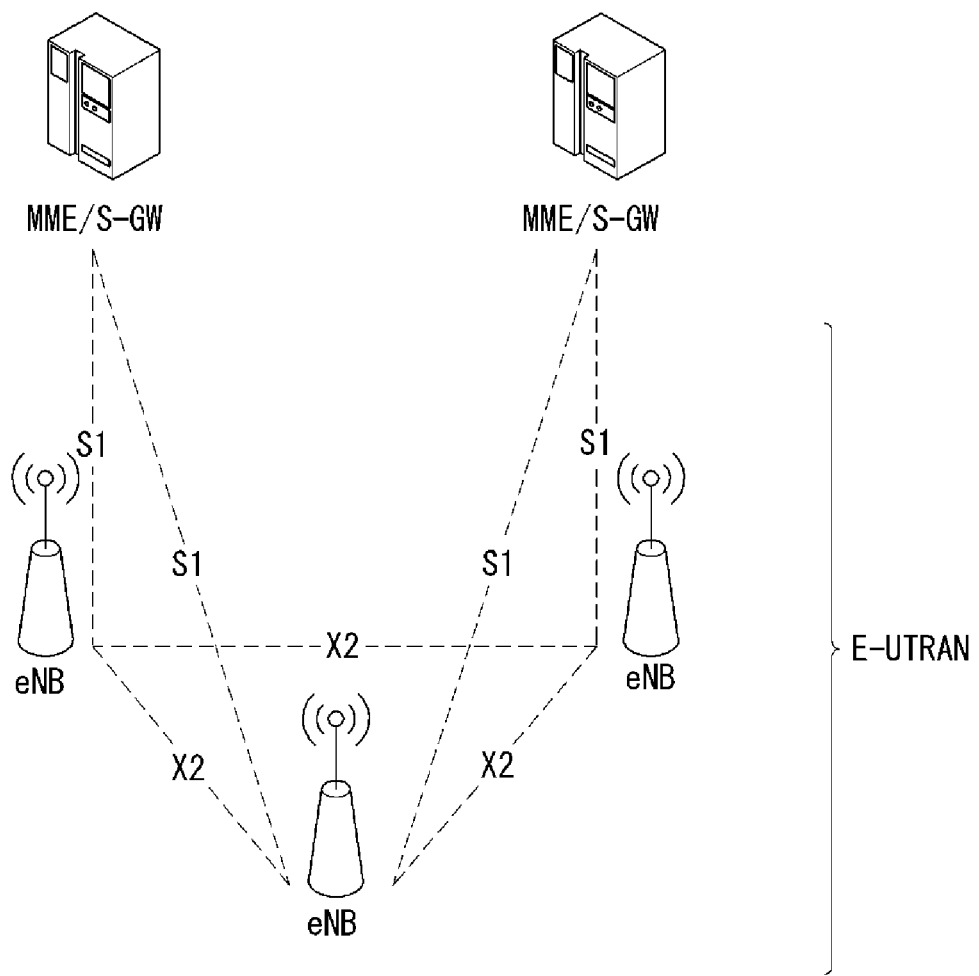
[FIG. 2]

[FIG. 3]
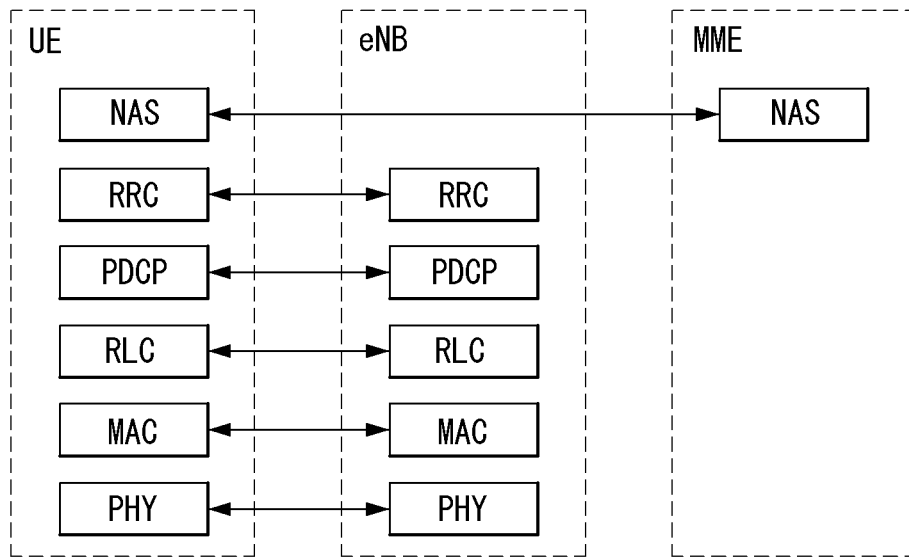
(a) CONTROL PLANE PROTOCOL STACK
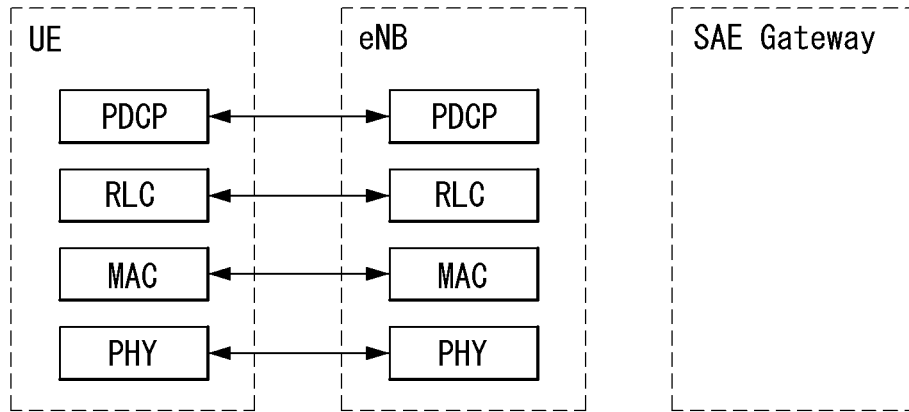
(b) USER PLANE PROTOCOL STACK

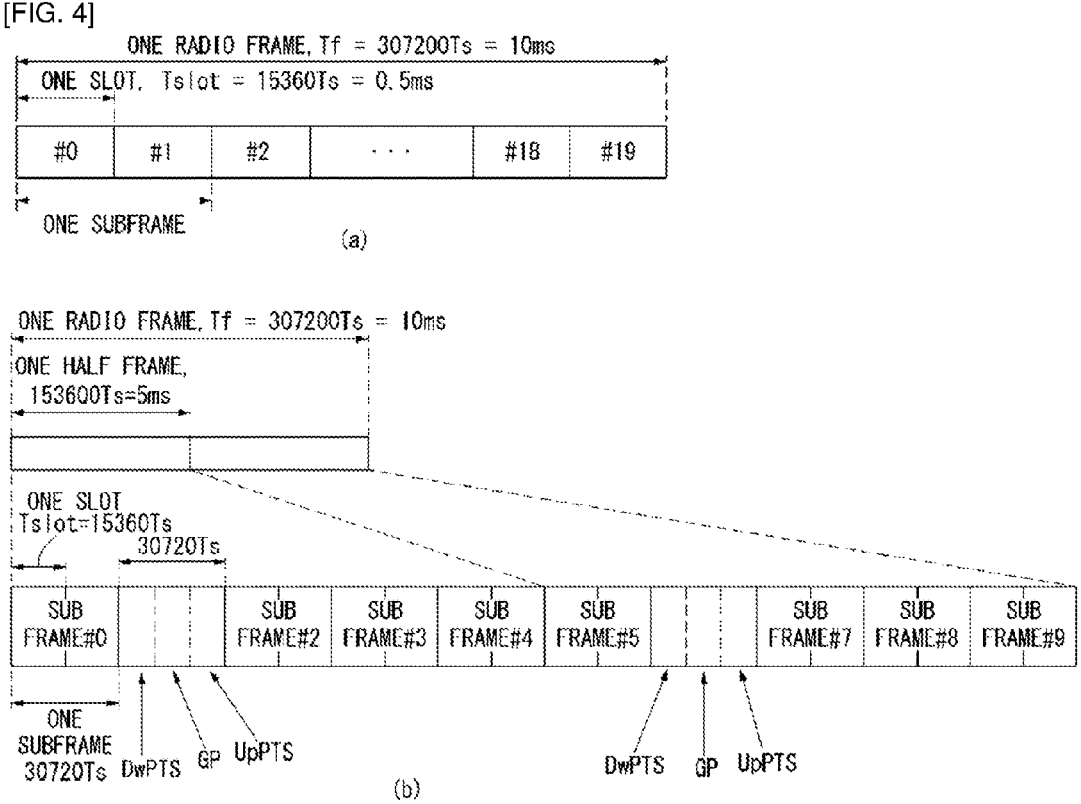
[FIG. 4]

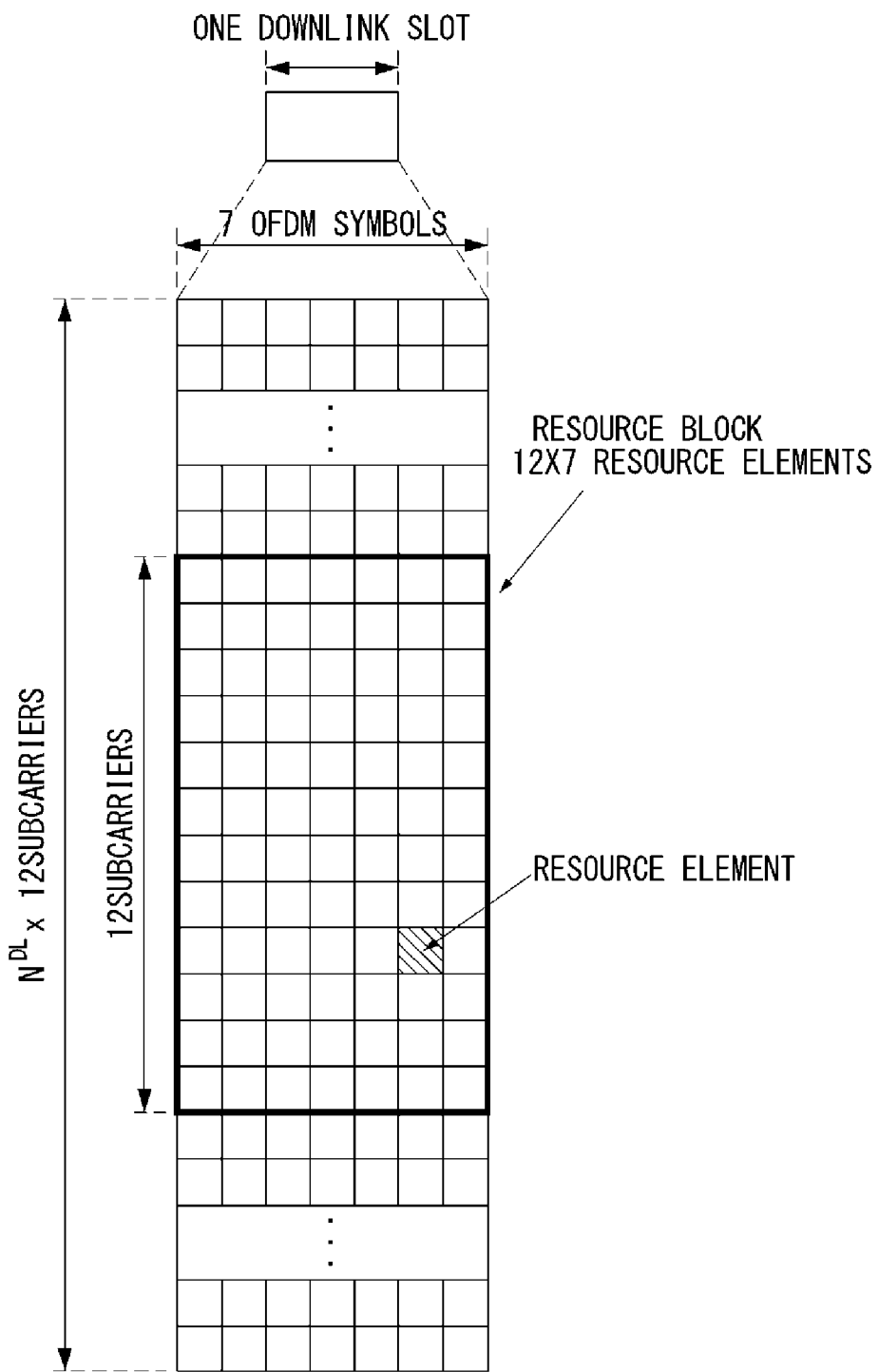
[FIG. 5]

[FIG. 6]
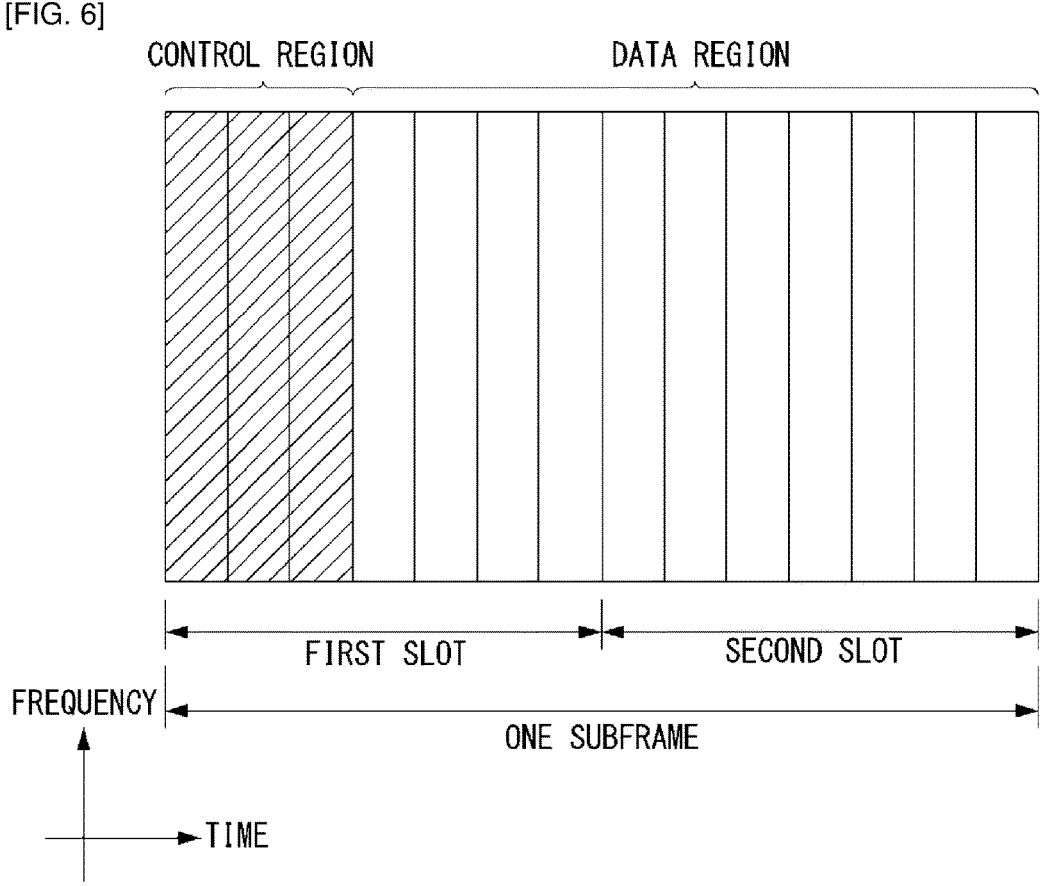

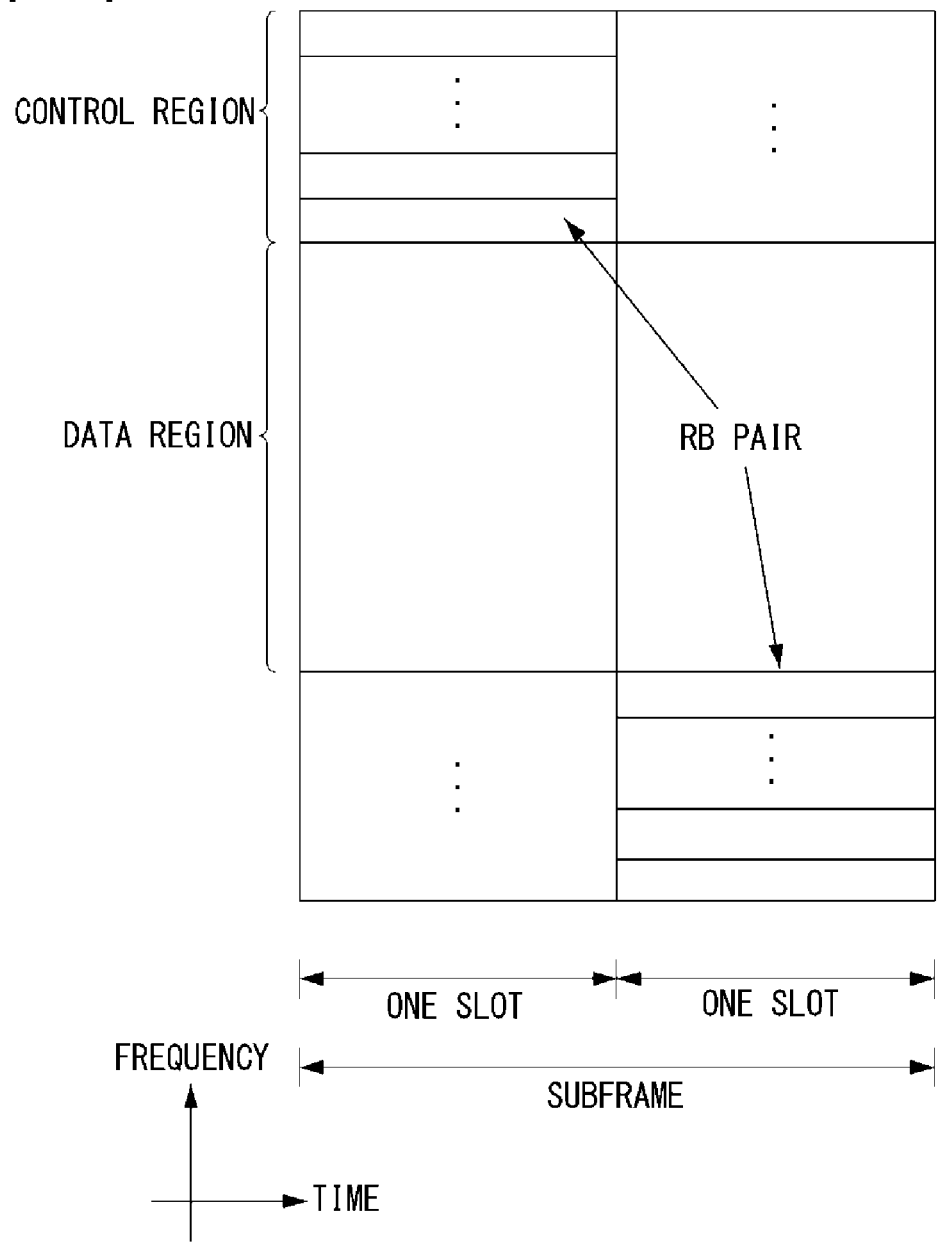
[FIG. 7]

[FIG. 8]
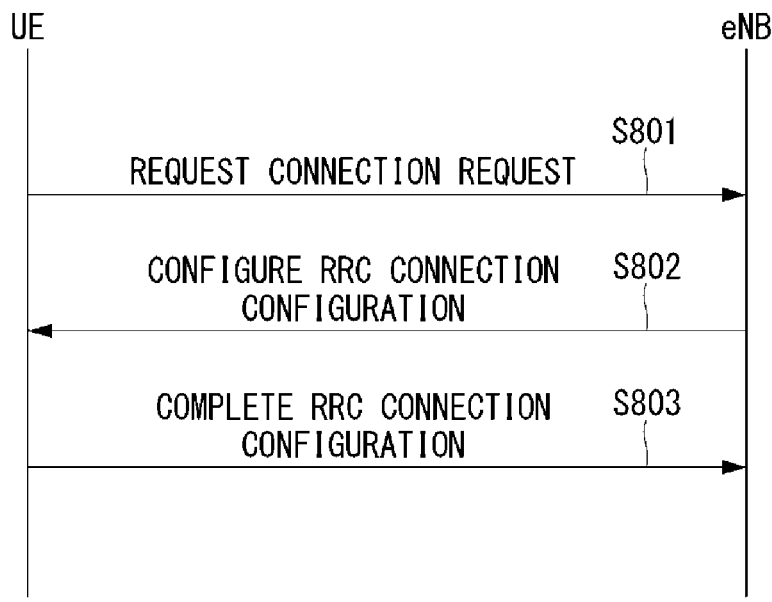
[FIG. 9]
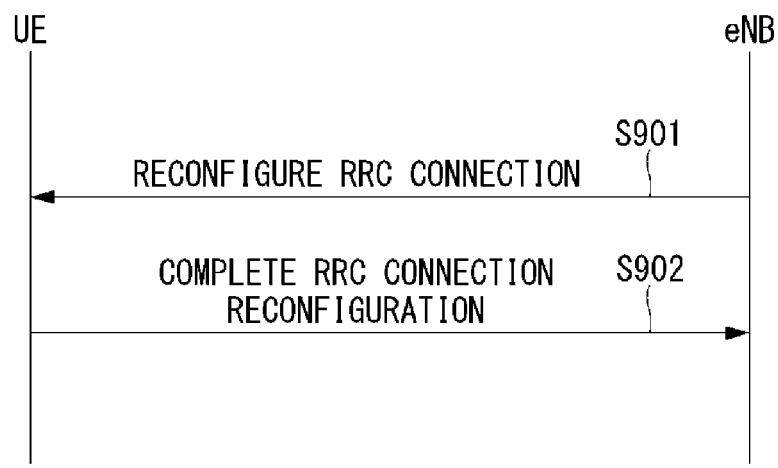

[FIG. 10]
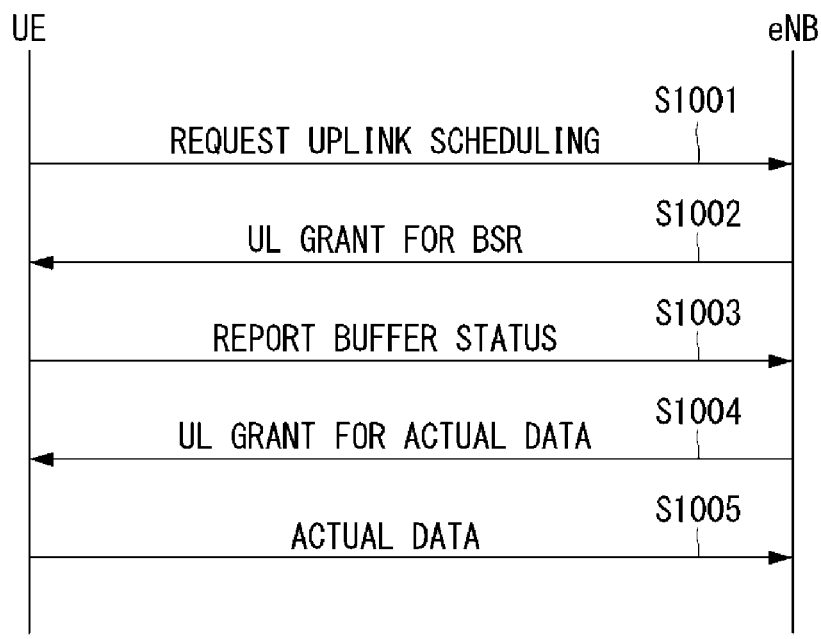
(a)
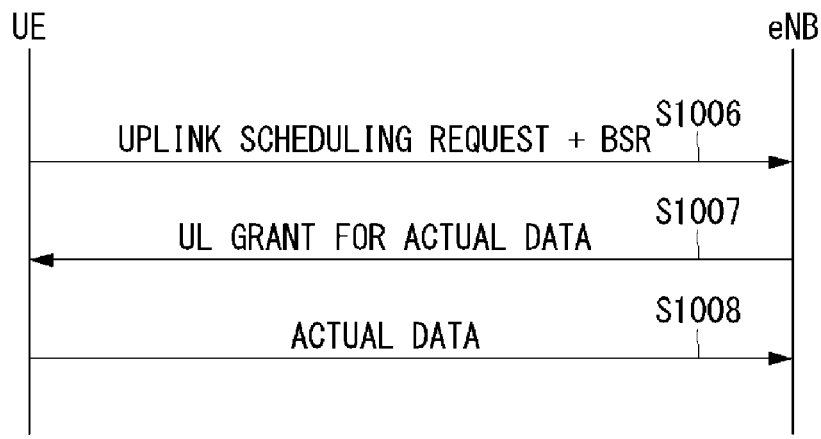
(b)

[FIG. 11]
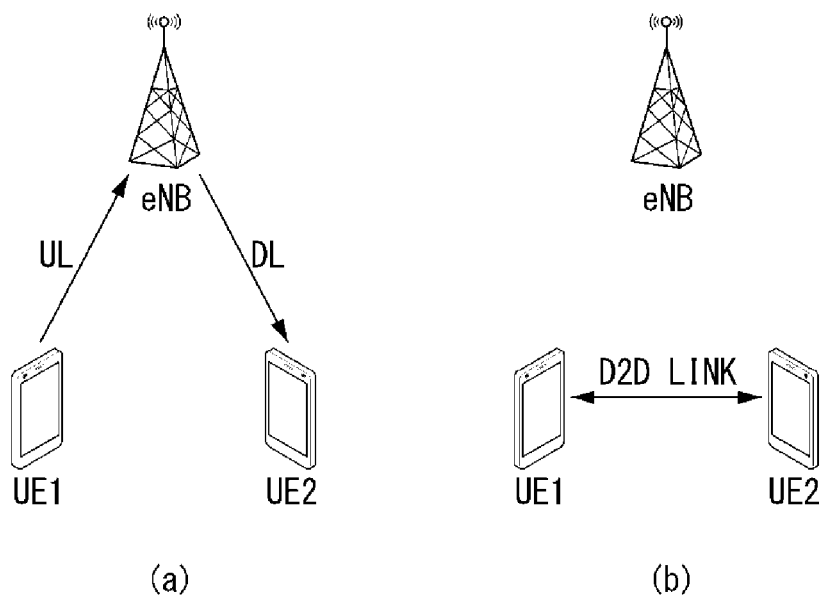

[FIG. 12]
(a) 
(b) 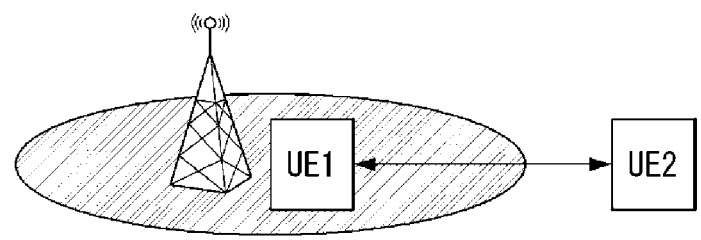
(c) 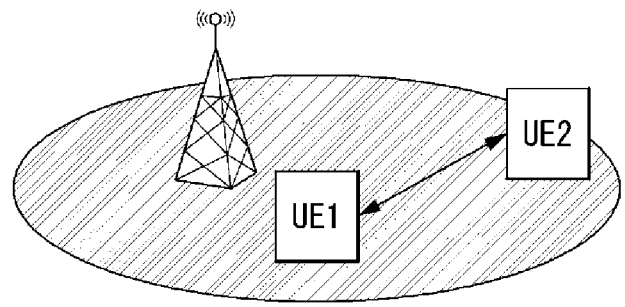
(d) 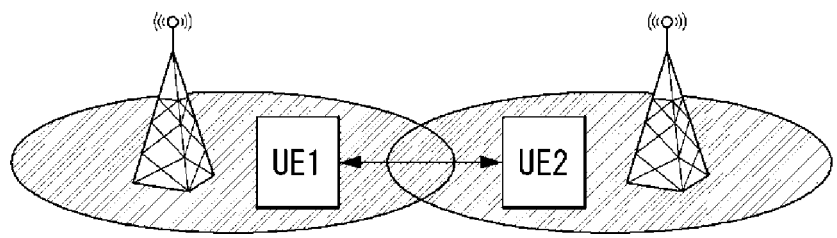

[FIG. 13]
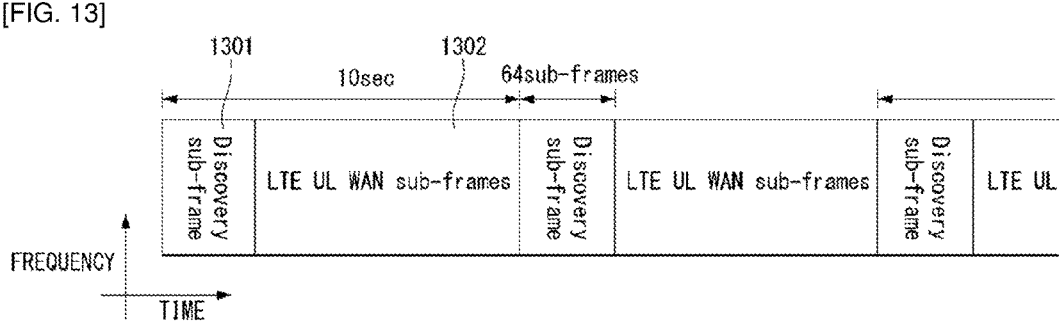

[FIG. 14]
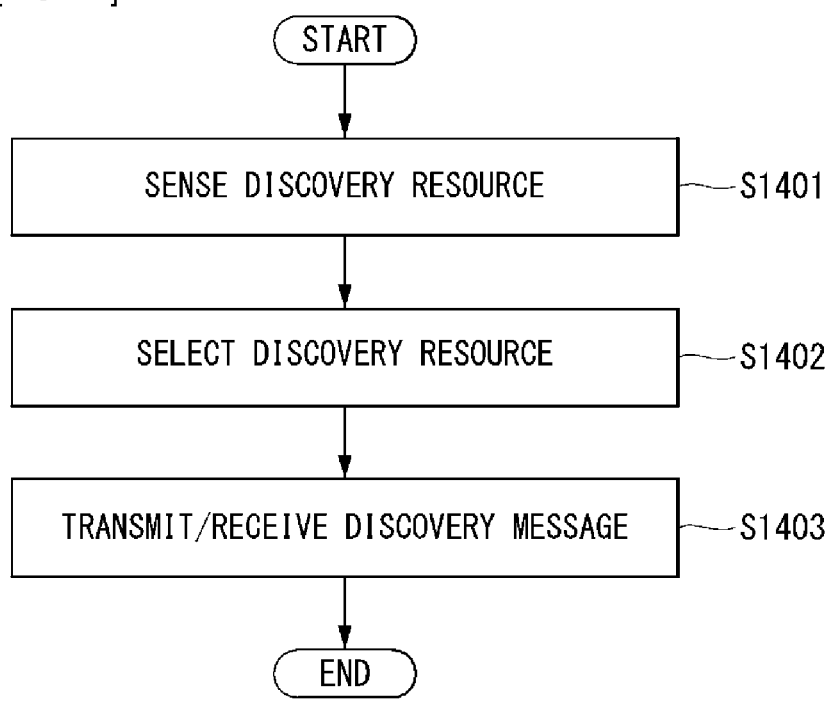

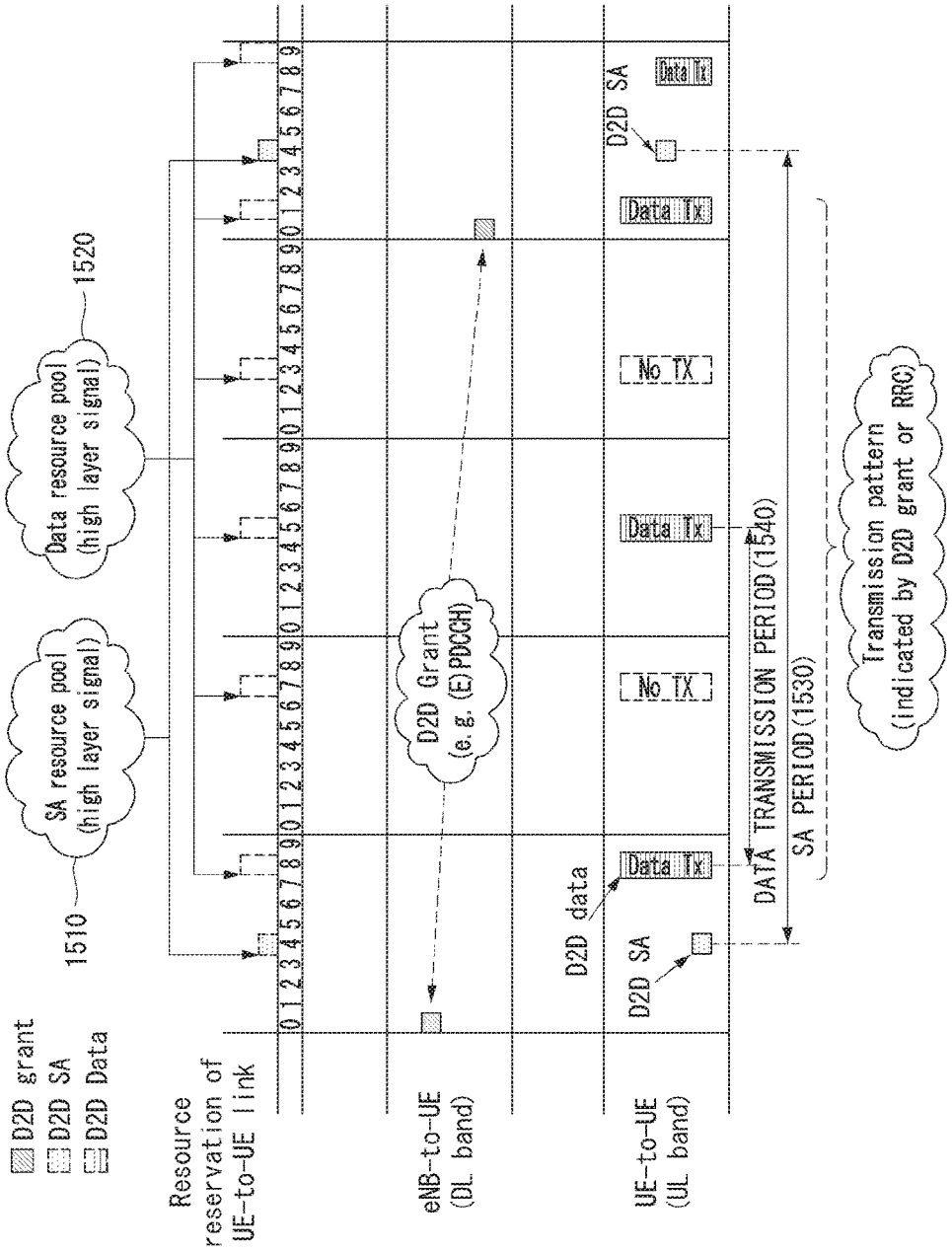

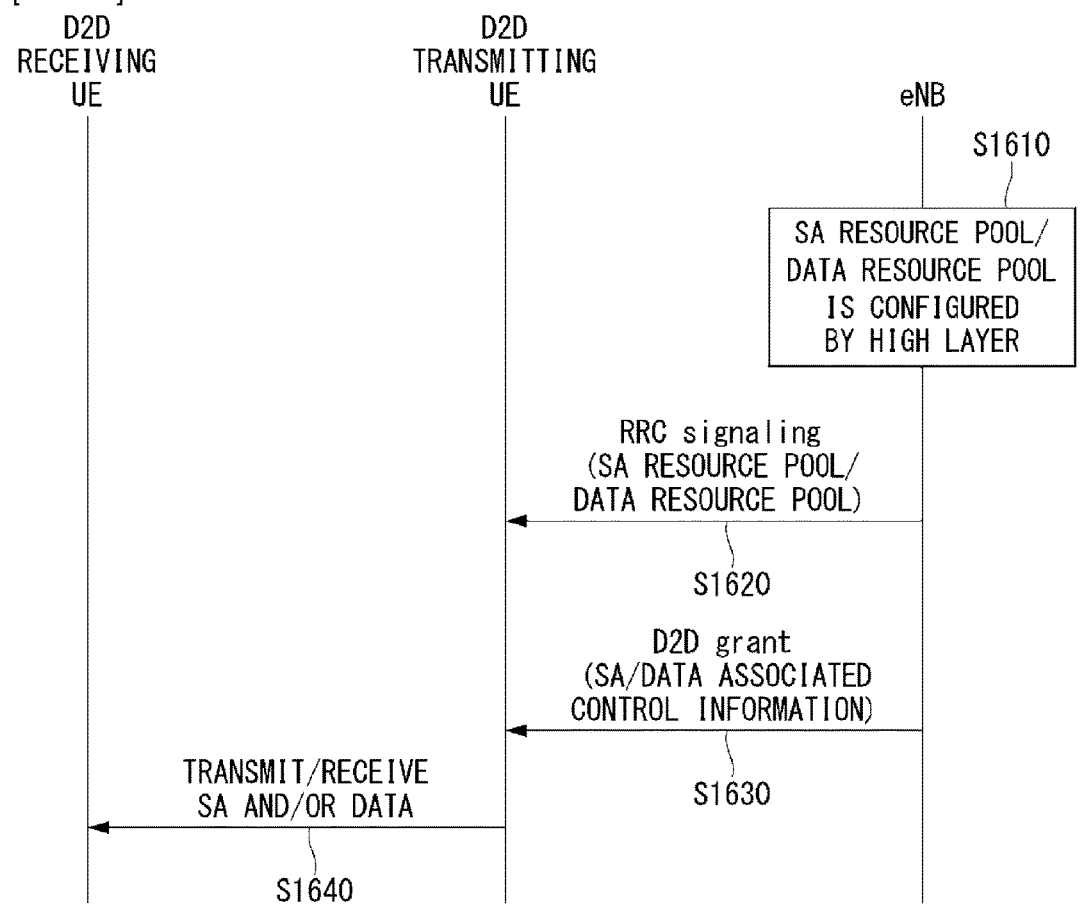

[FIG. 17]
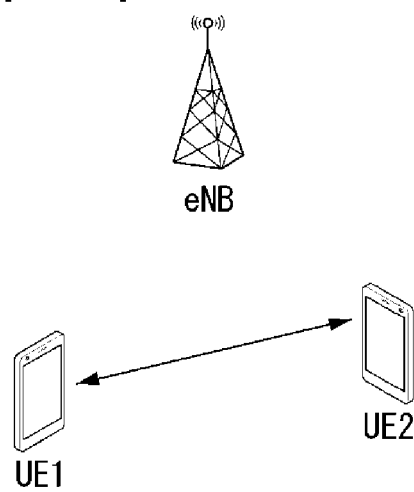

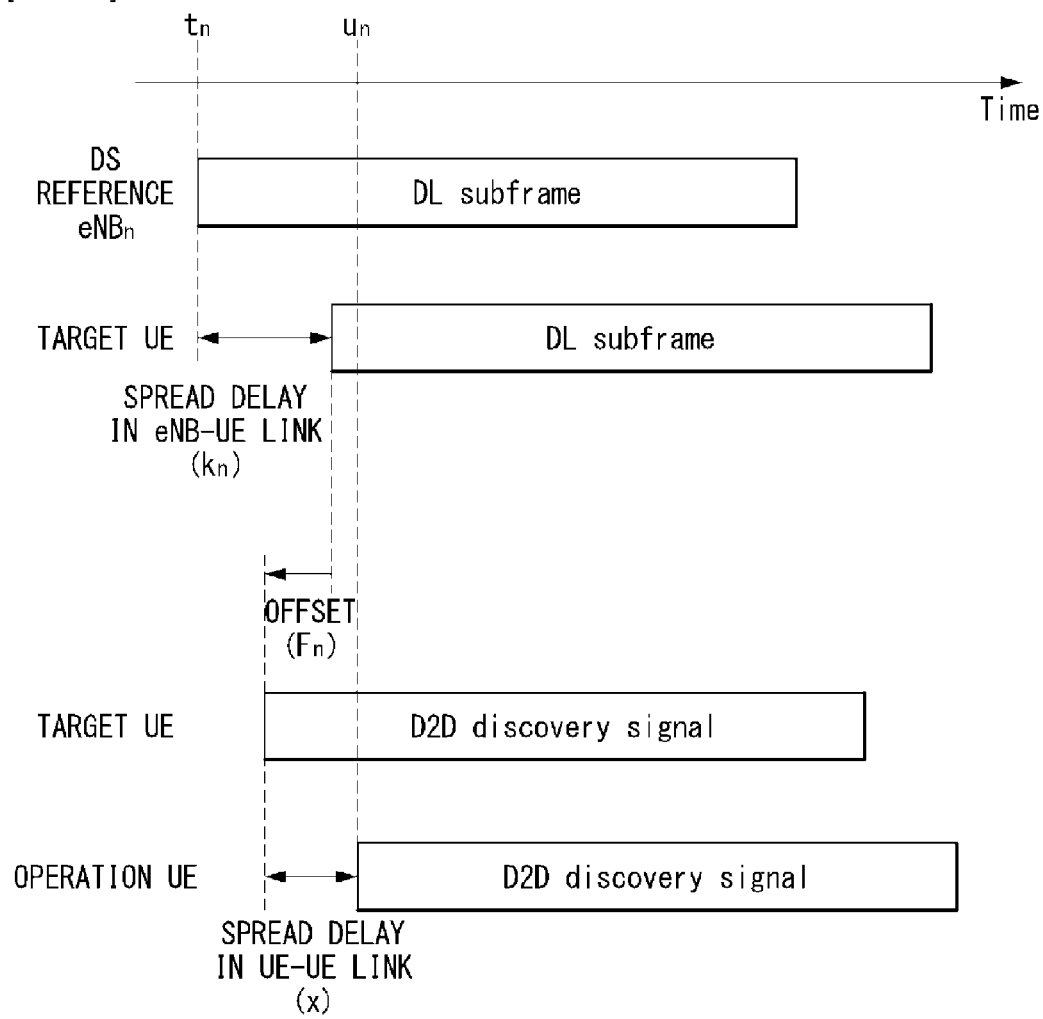

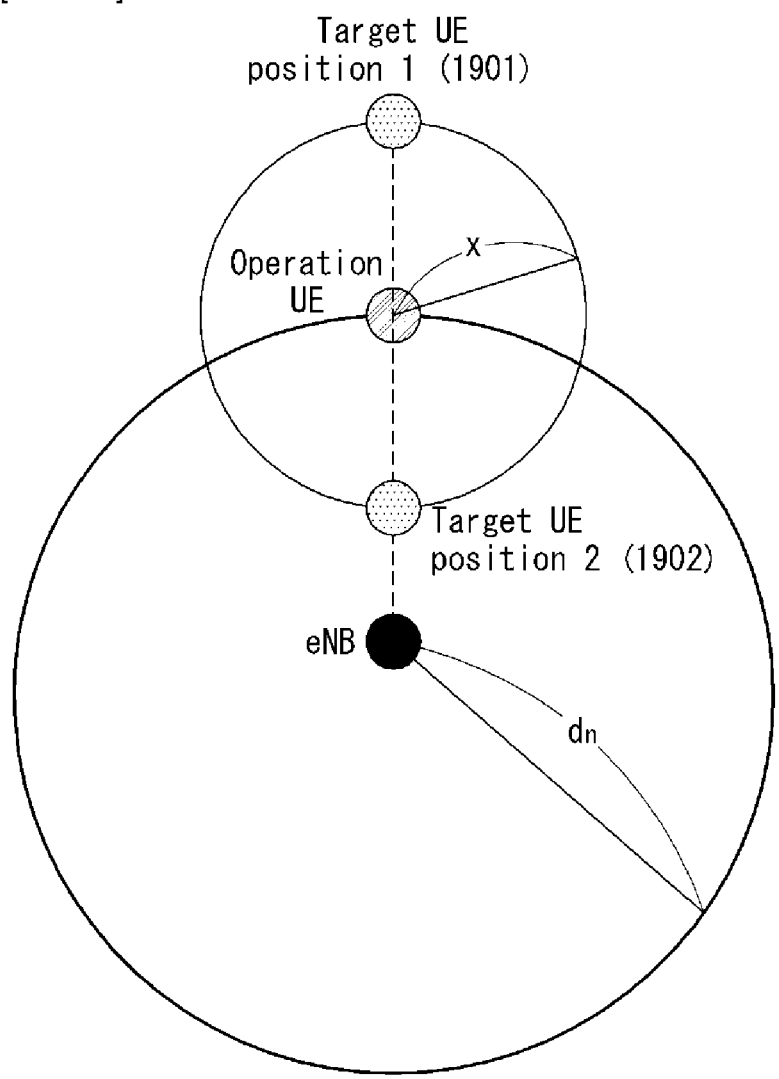
[FIG. 19]

[FIG. 20]
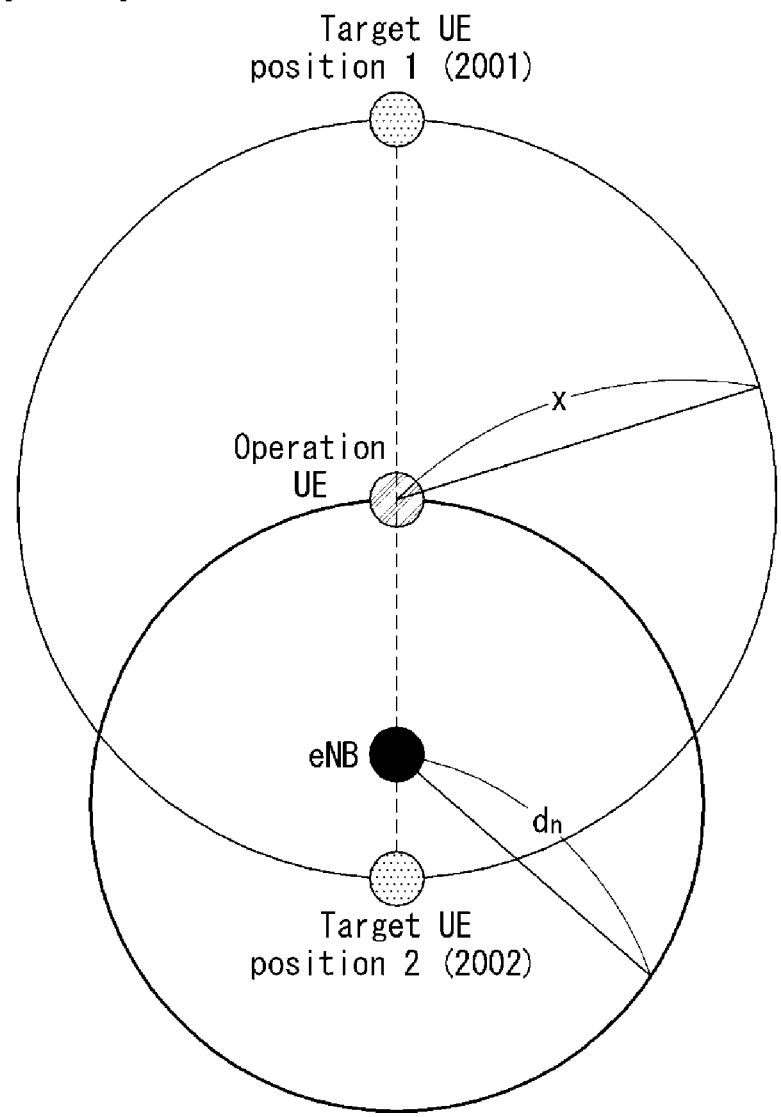

[FIG. 21]
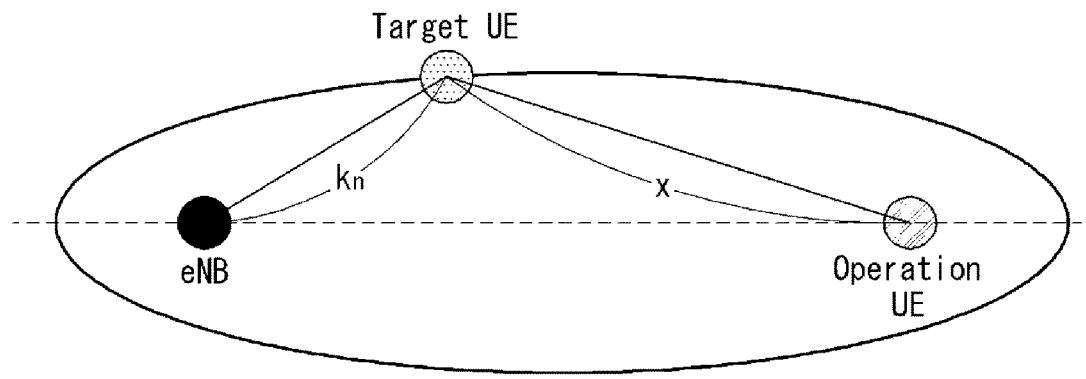
[FIG. 22]
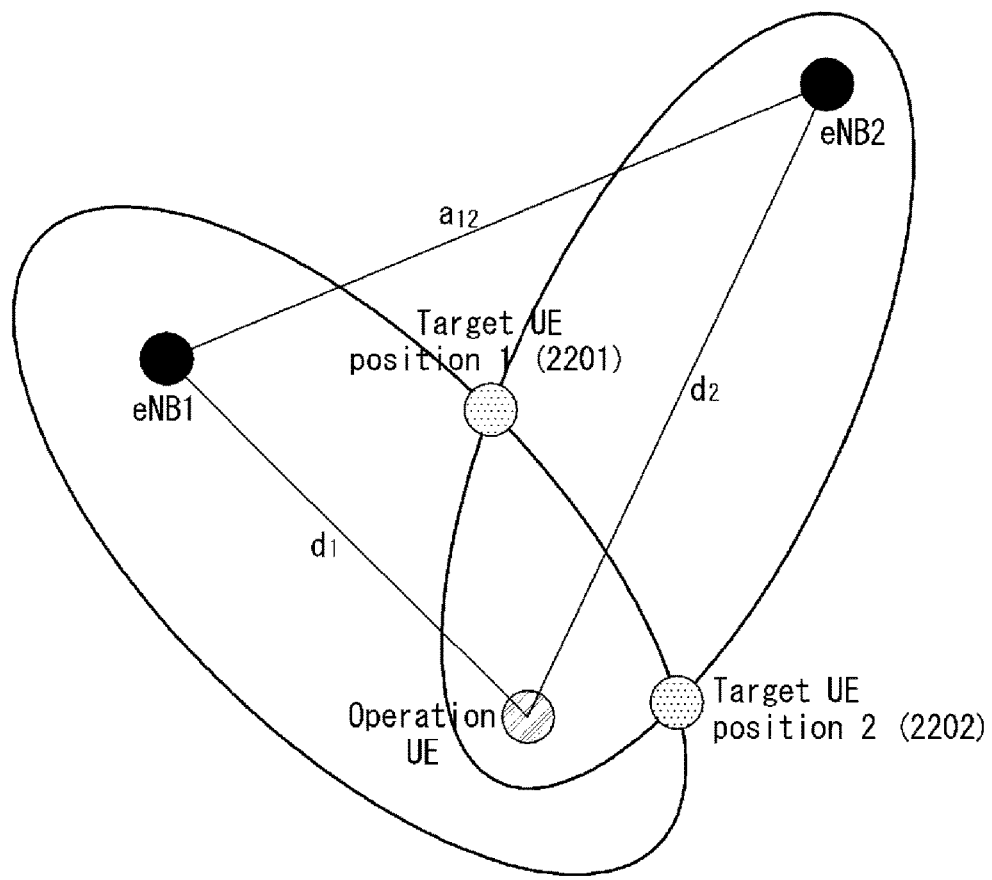

[FIG. 23]
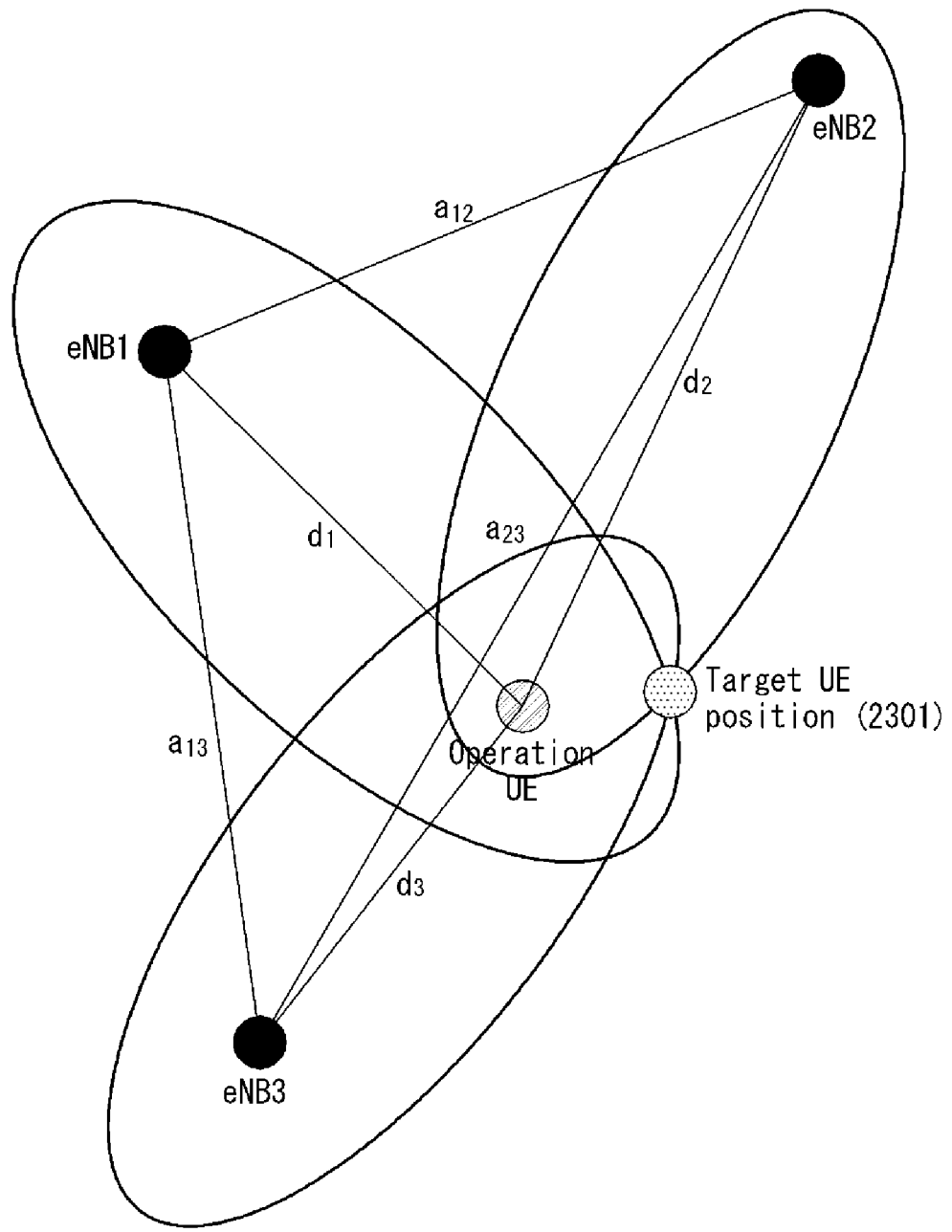

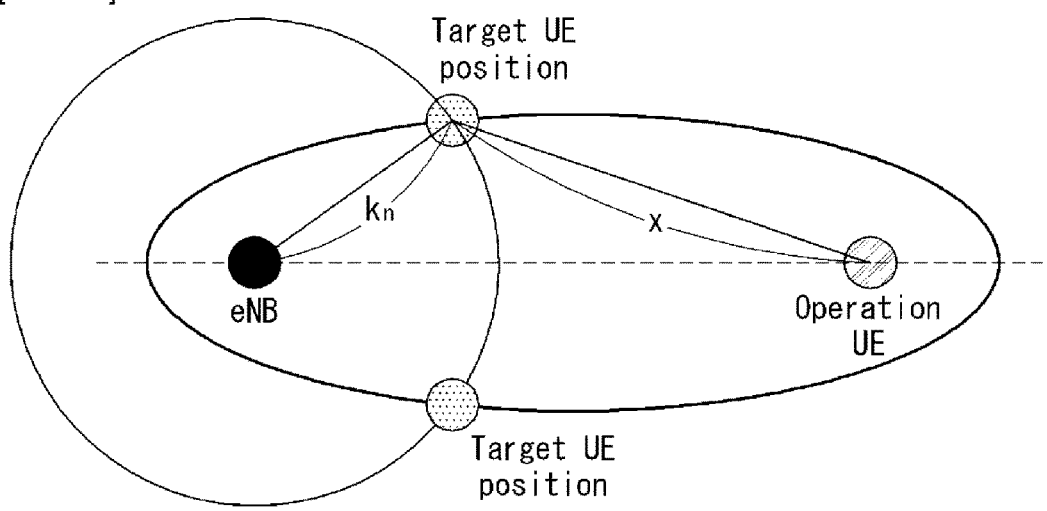
[FIG. 24]

[FIG. 25]
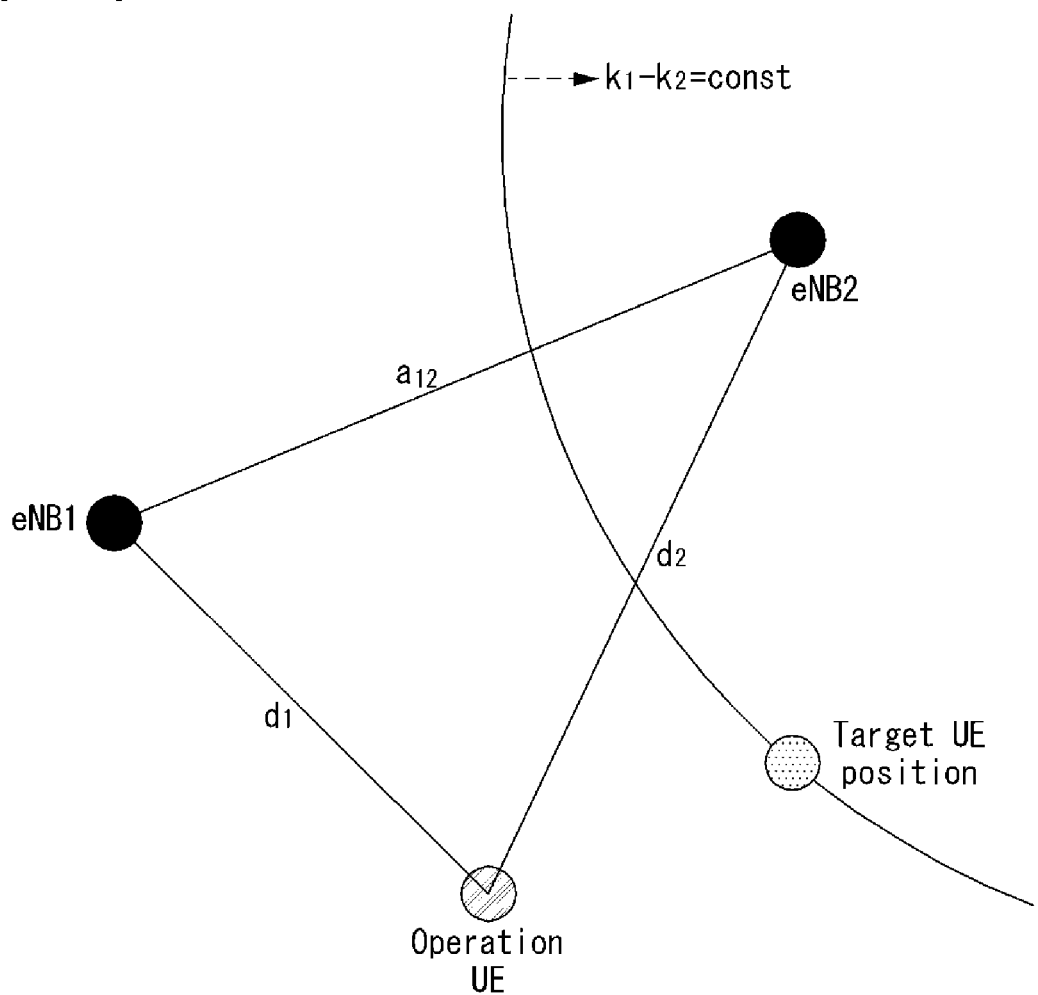

[FIG. 26]
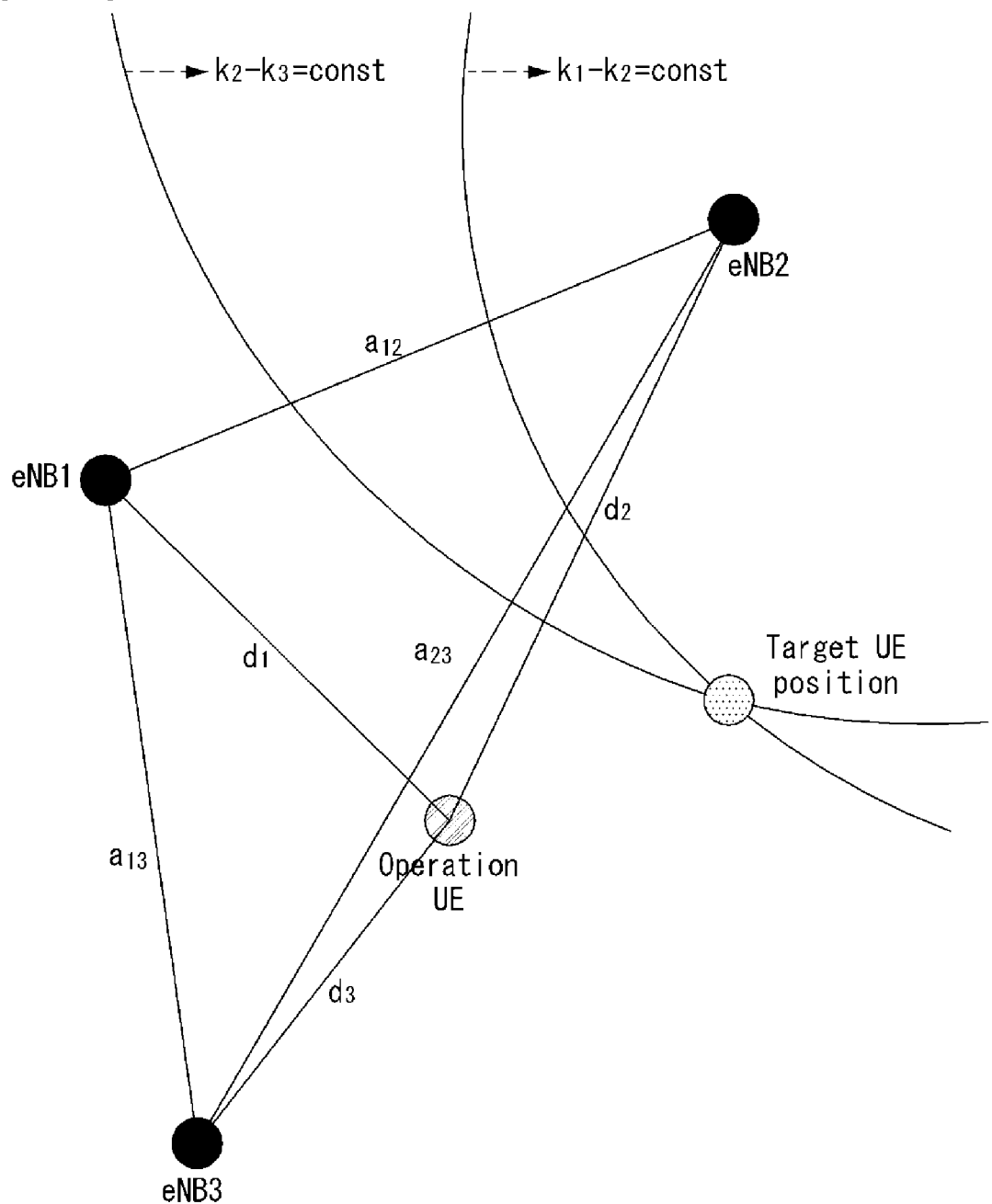

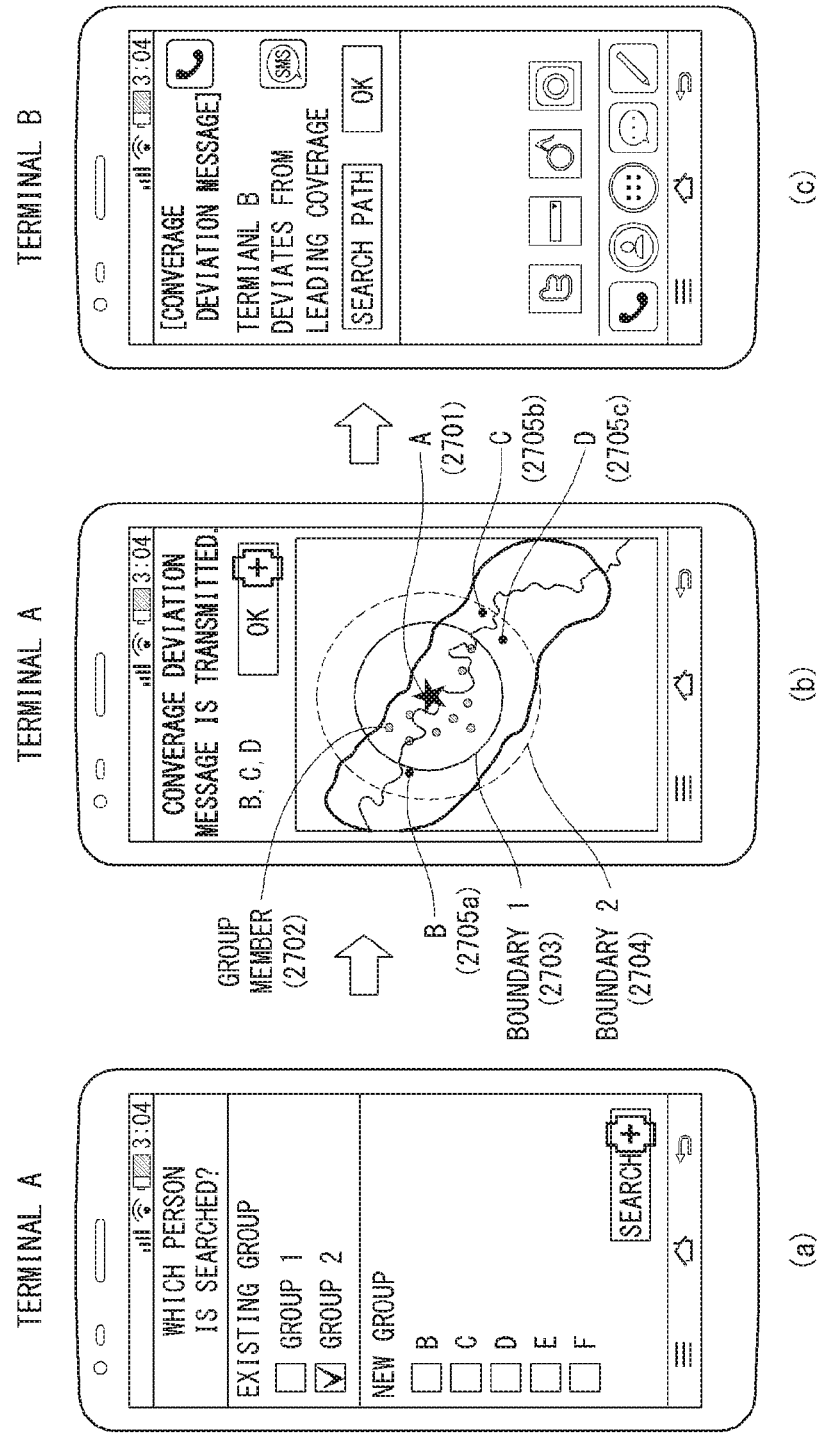
[FIG. 27]

[FIG. 28]
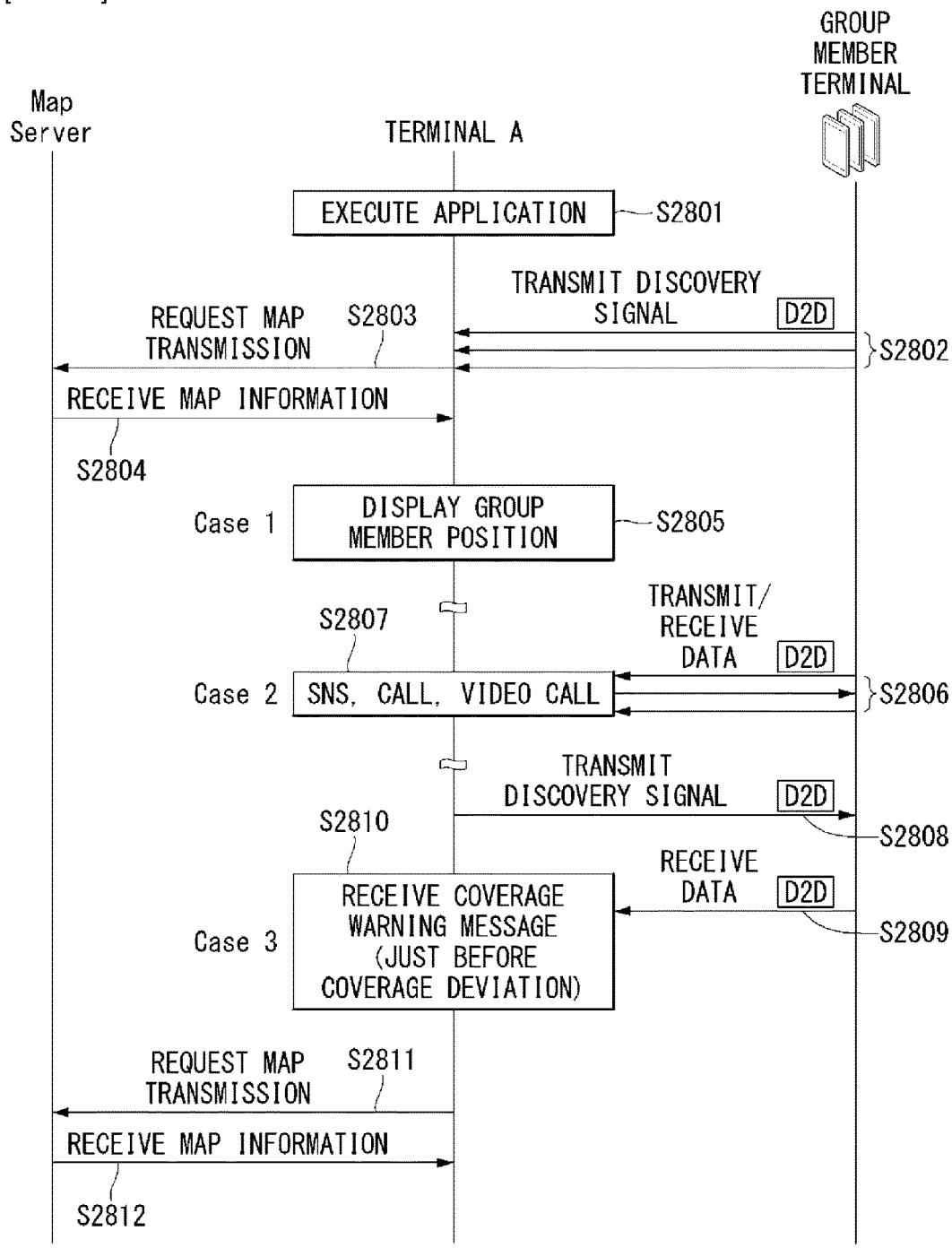

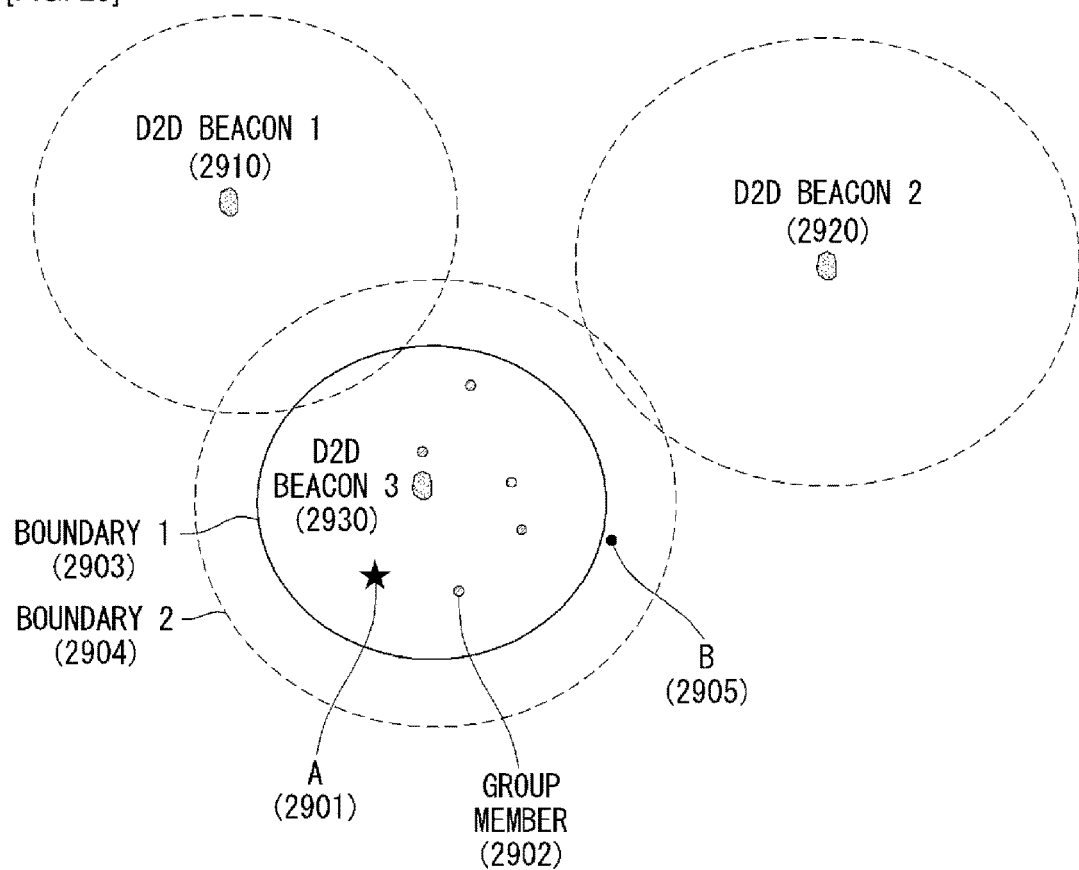
[FIG. 29]

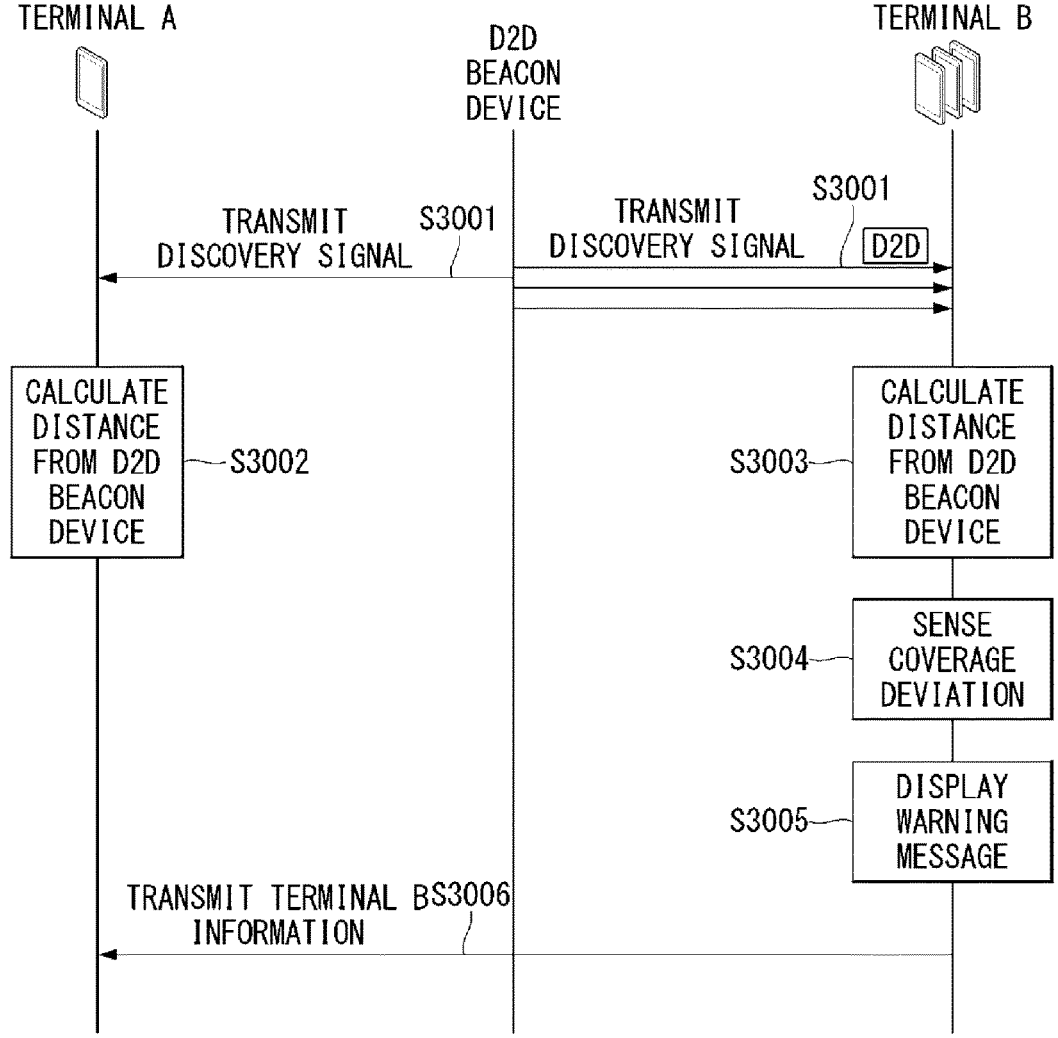

[FIG. 31]

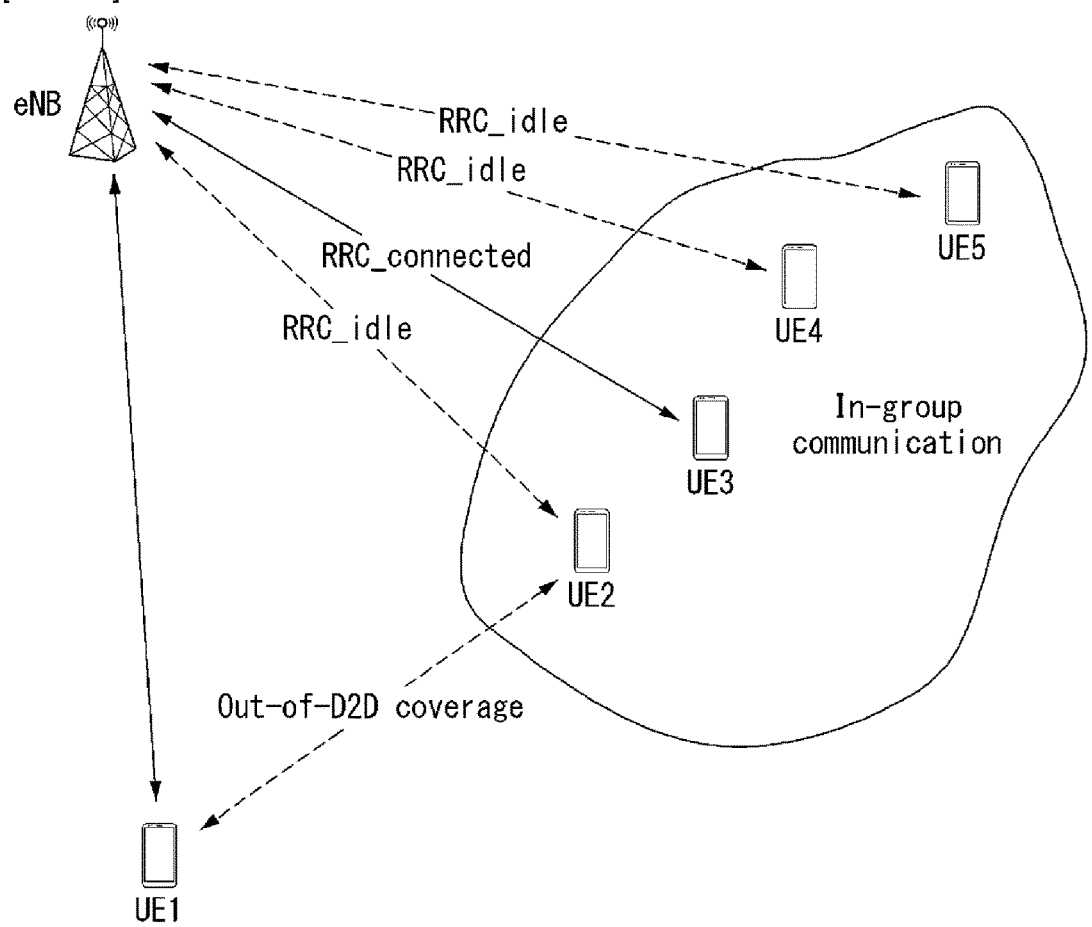
[FIG. 32]

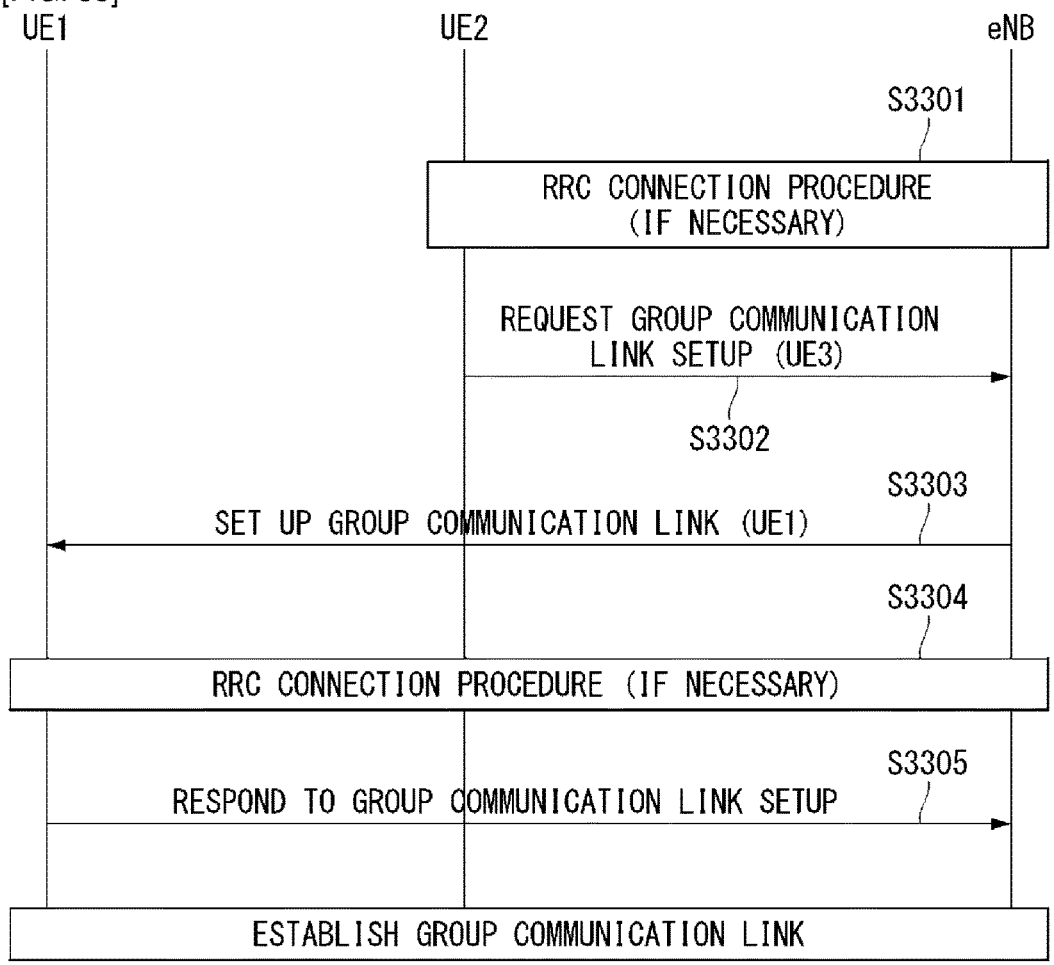

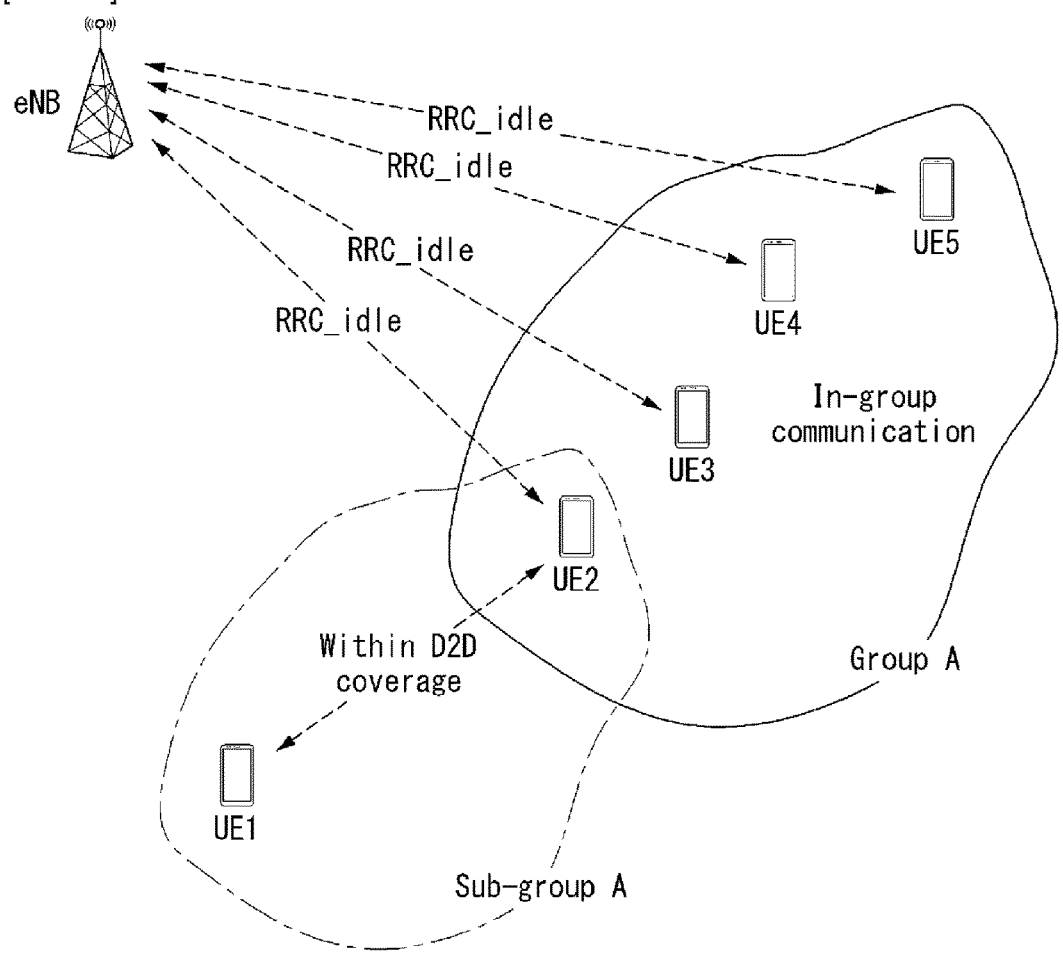

[FIG. 35]
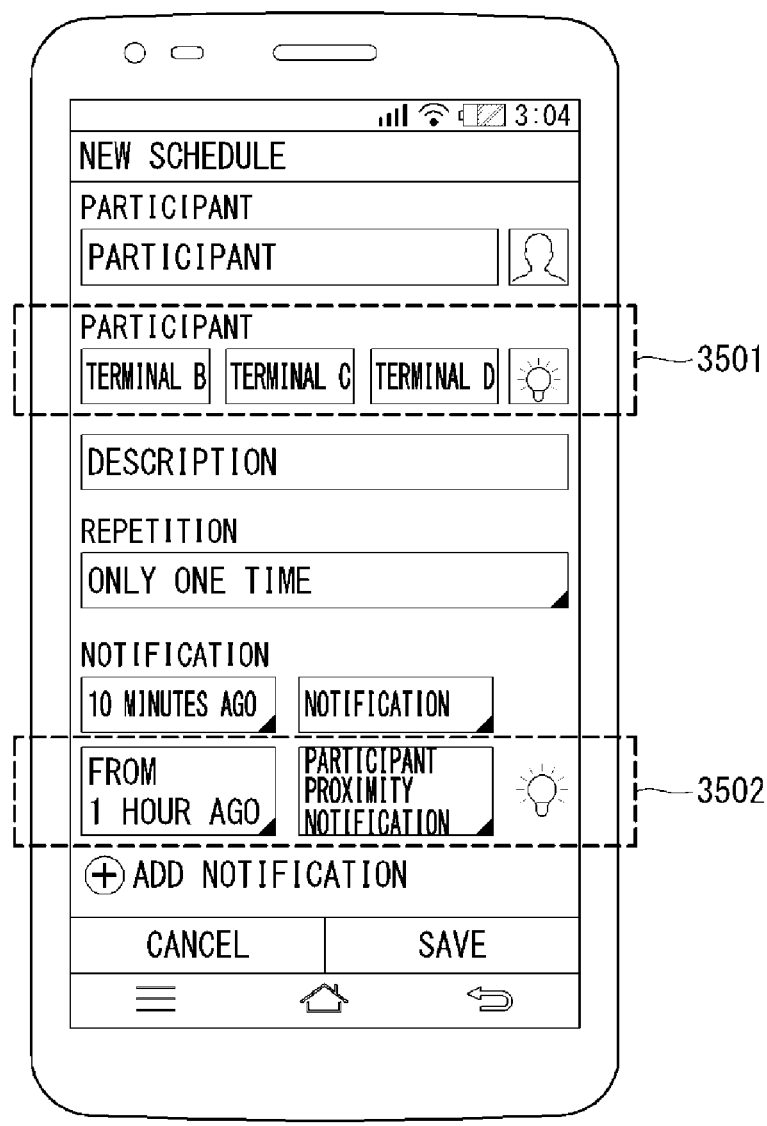

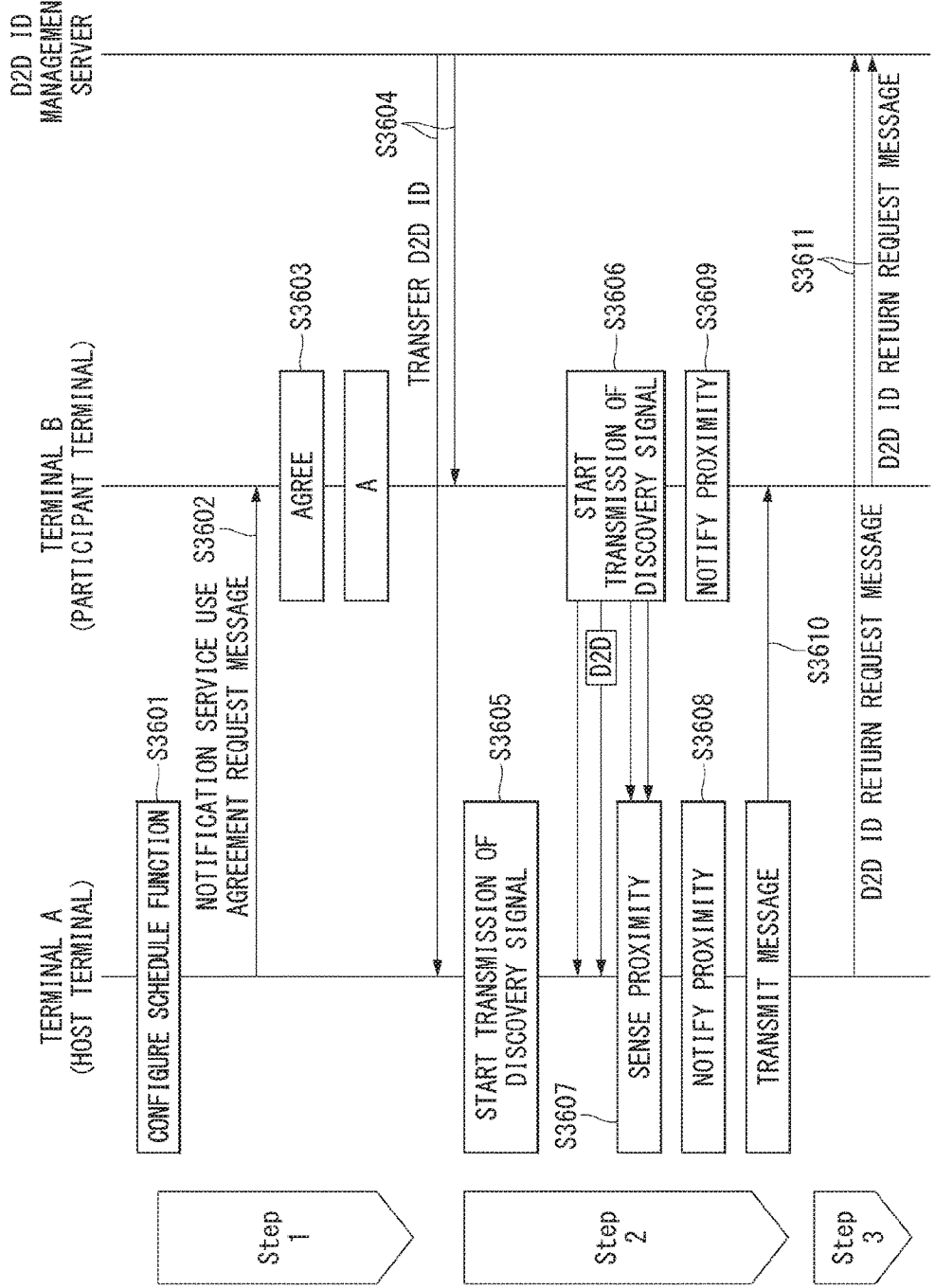

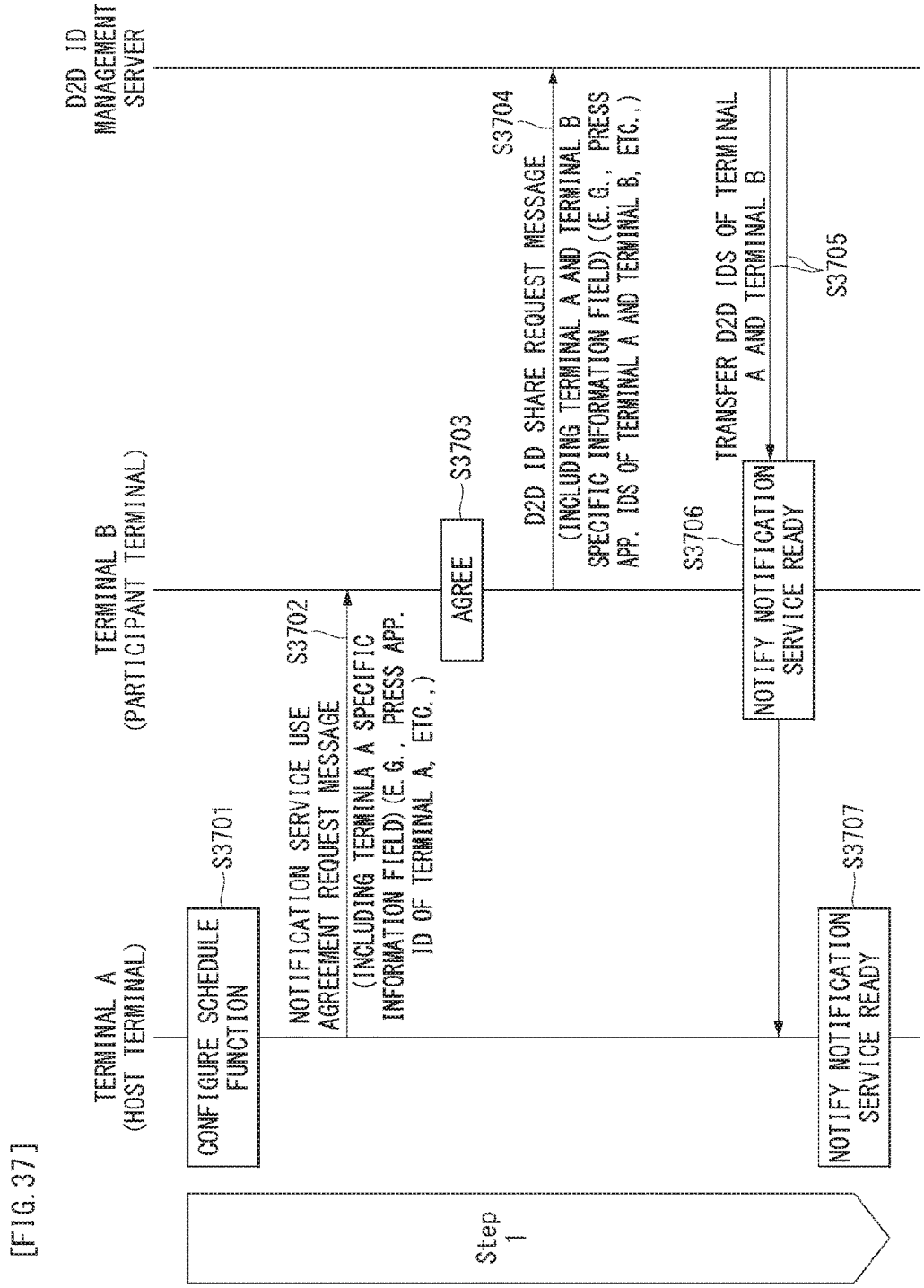

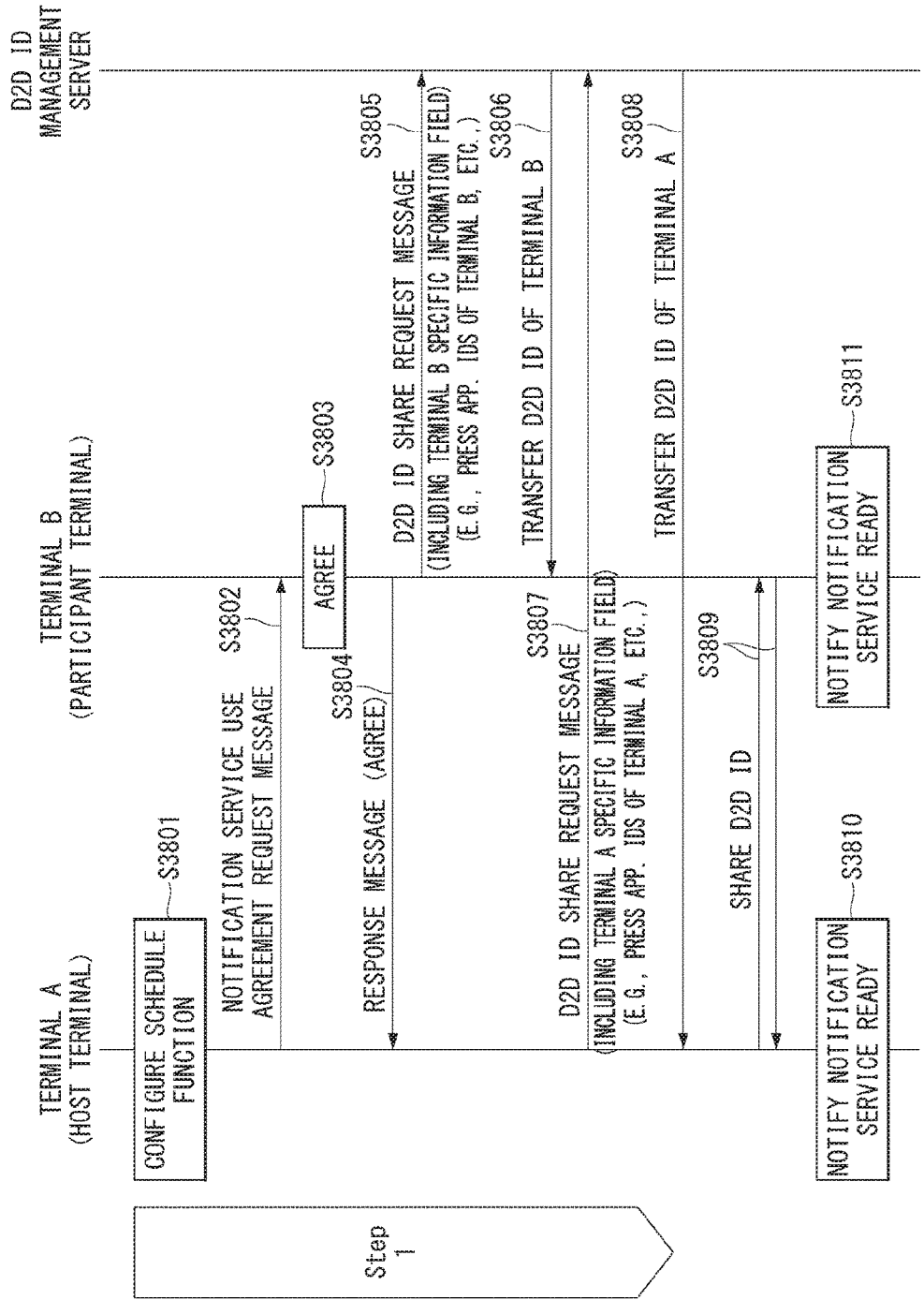

[FIG. 39]
| MANAGER | SPECIFIC INFORMATION FIELD | D2D ID |
|---|---|---|
| OPERATOR | PHONE NUMBER | 0x001123 |
| CHIP MANUFACTURER | UNIQUE ID OF CHIP MANUFACTURER | 0x001125 |
| OTHERS | E-MAIL/LOGIN ACCOUNT | 0x001125 |
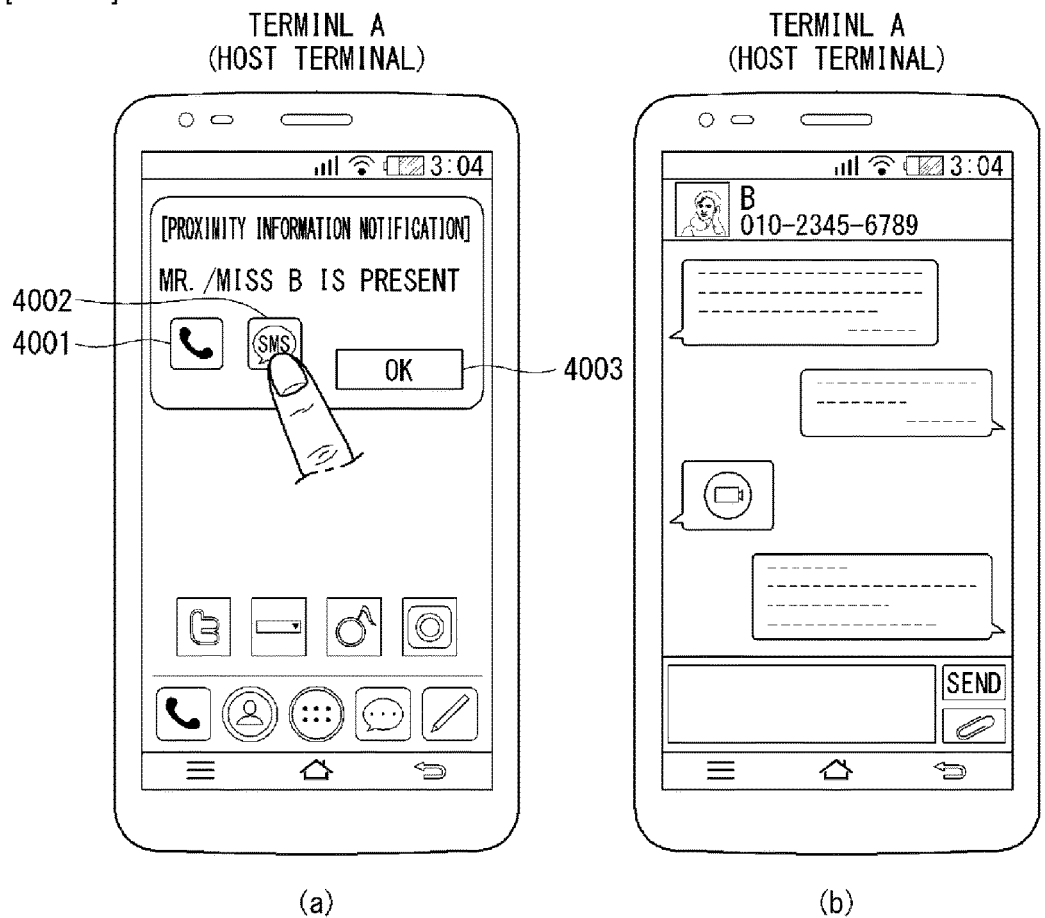
[FIG. 40]

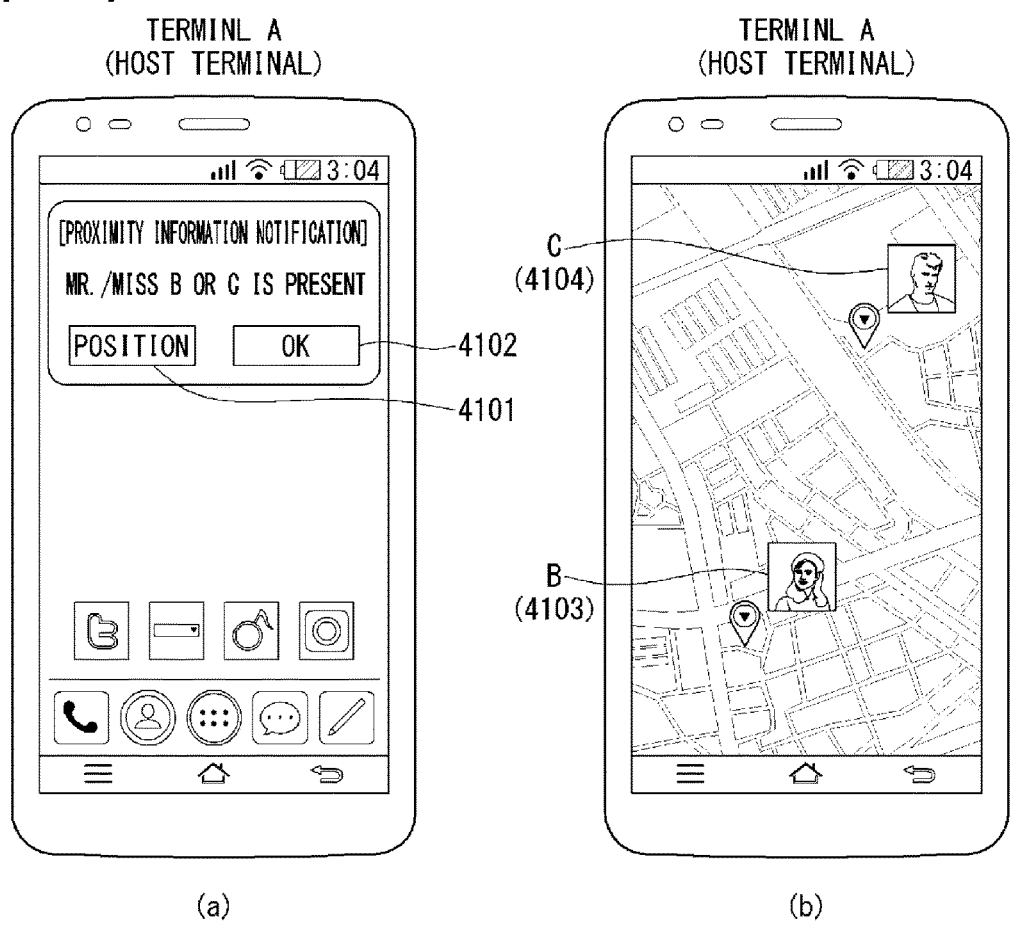
[FIG. 41]

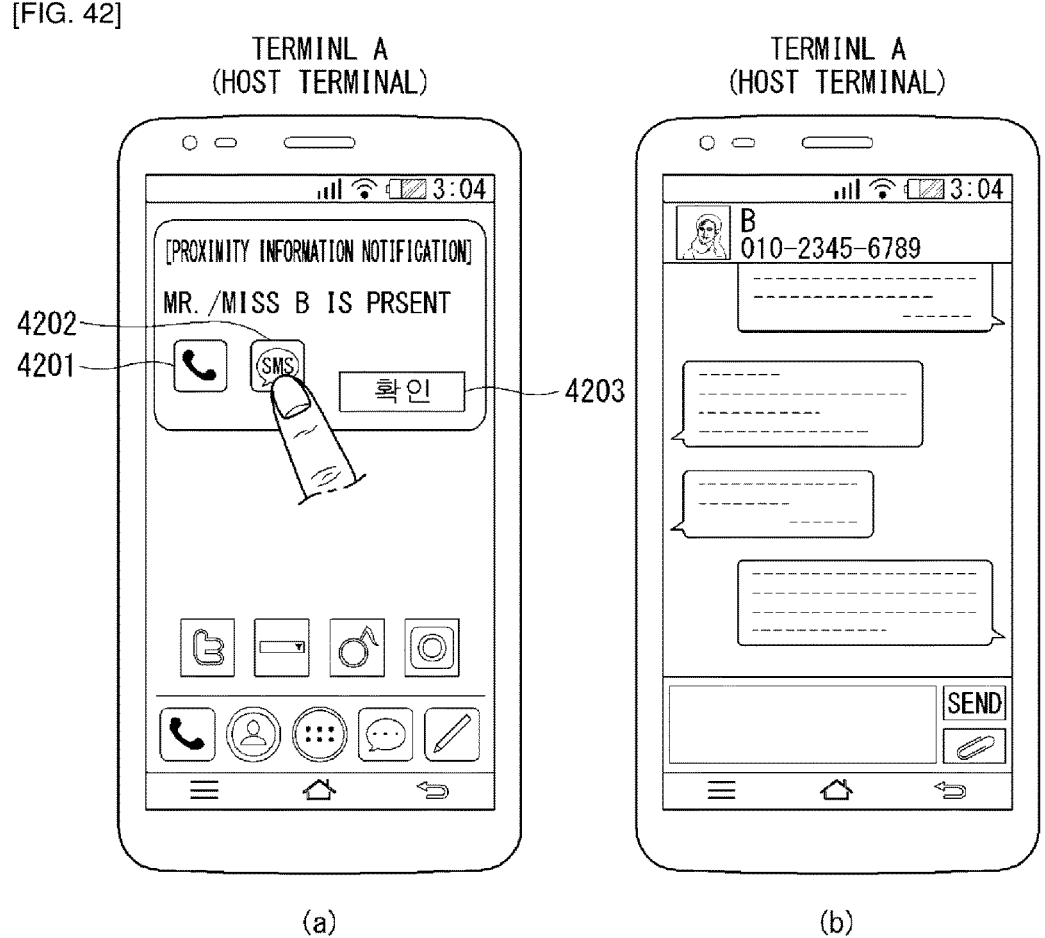

[FIG. 43]
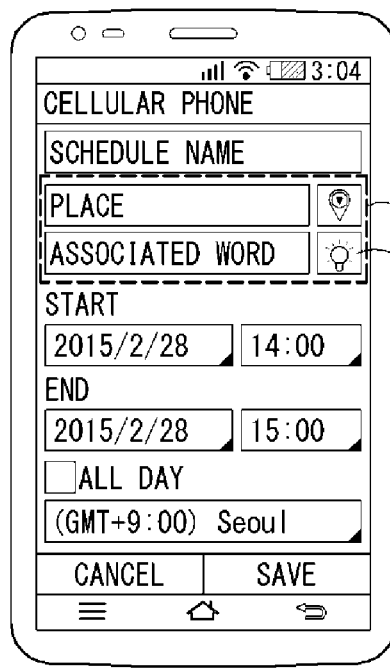
(a)
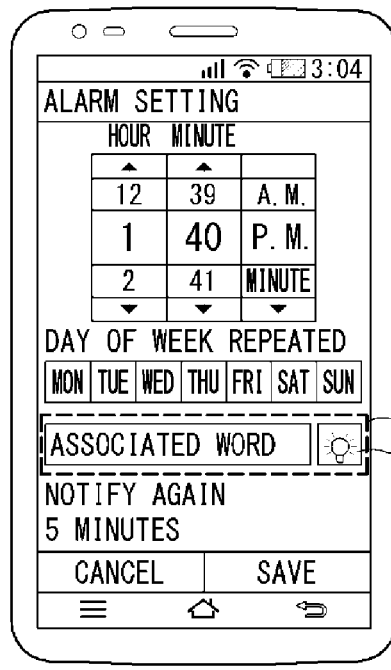
(b)
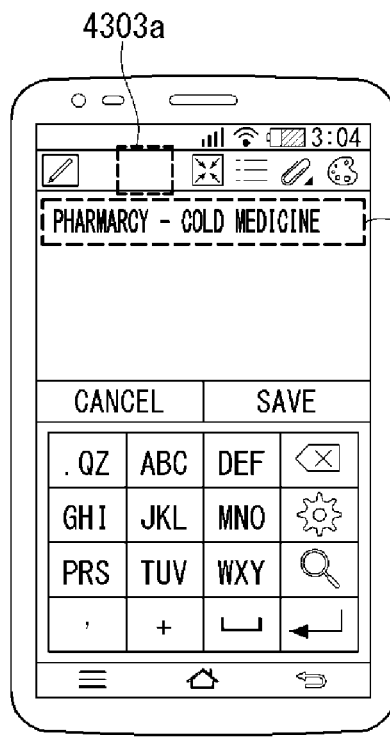
(c)
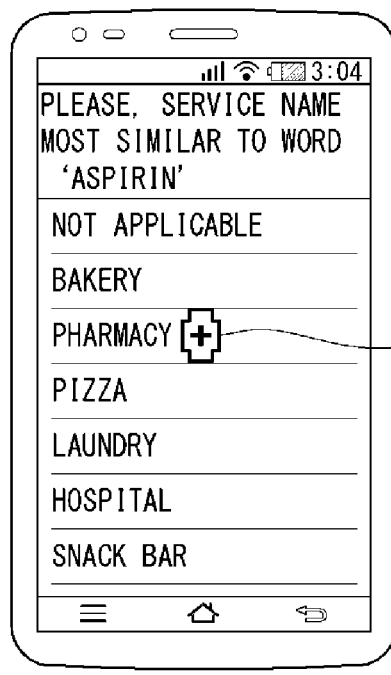
(d)

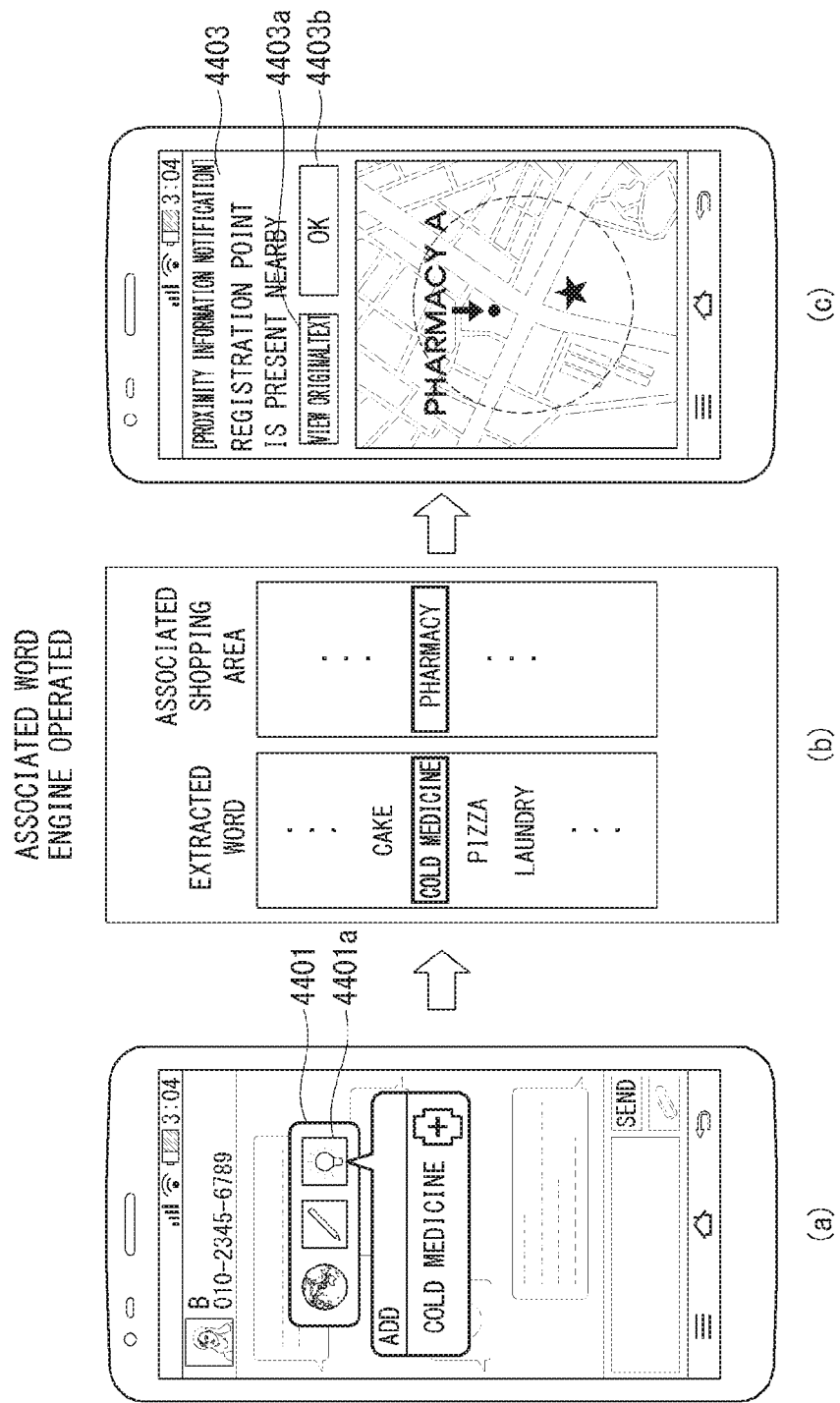
[FIG. 44]

[FIG. 45]

| ASSOCIATED WORDS | SERVICE ID |
|---|---|
| CAKE, BREAD, SNACK, BAKERY | 0x001122 |
| COLD, BODY ACHE, MEDICINE, PHARMACY, HOSPITAL | 0x001123 |
| PIZZA | 0x001124 |
| LAUNDRY, LAUNDRY, DRY | 0x001125 |
| <Reserved> | 0x001126 |
| <Reserved> | 0x001127 |
| STIR-FRIED RICE CAKE, FRIED FOOD, FISH CAKE, KOREAN SAUSAGE | 0x001128 |

[FIG. 46]

| ASSOCIATED LINK | SERVICE ID |
|---|---|
| Message ID:5 | 0x001123 |
| Calendar ID:8 | 0x001125 |

[FIG. 47]
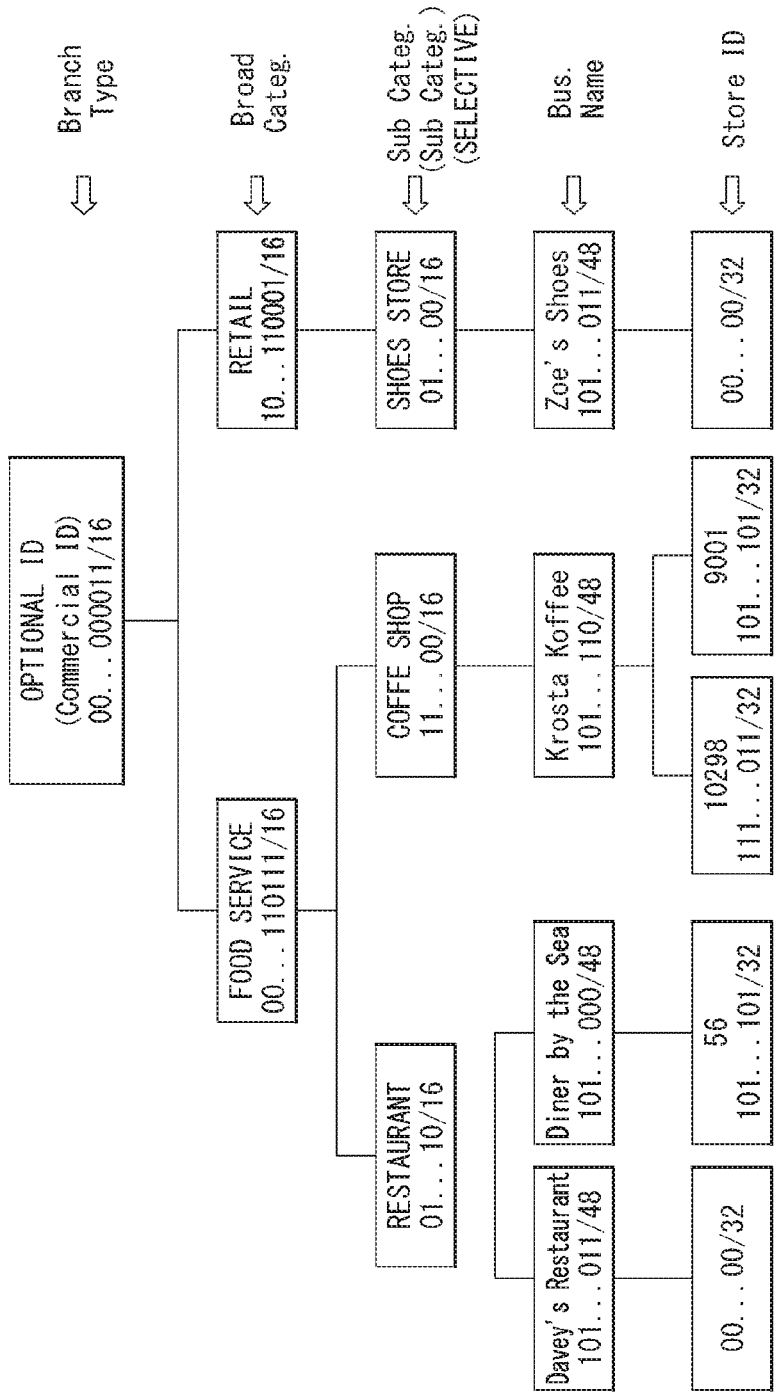

[FIG. 48]
| ASSOCIATED WORDS | LEVEL N-1 SUB-SERVICE ID | LEVEL N SUB-SERVICE ID |
|---|---|---|
| COLD, BODY ACHE, MEDICINE, PHARMACY, HOSPITAL | 0x2134 (MEANING 'HEALTH') | 0x1123 (MEANING 'PHARMACY') |
[FIG. 49]
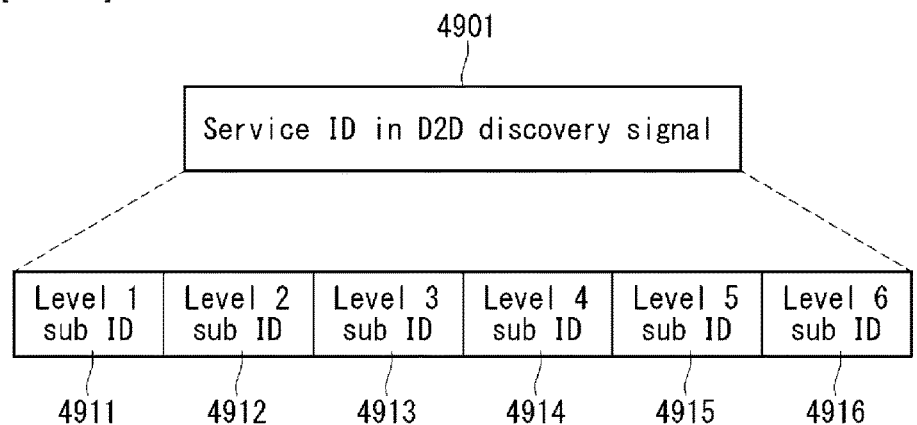

[FIG. 50]
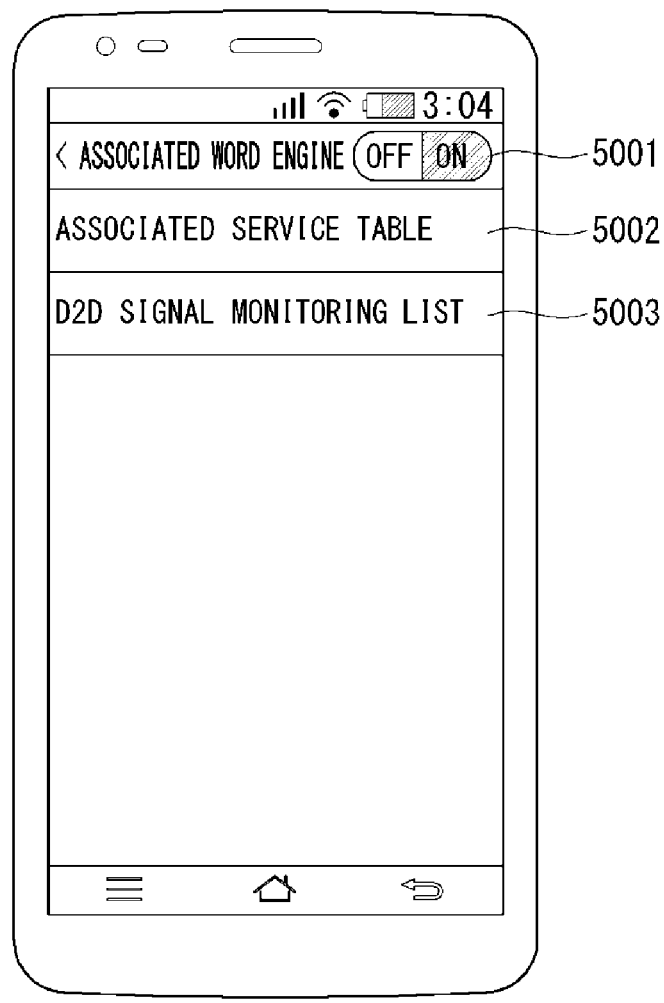

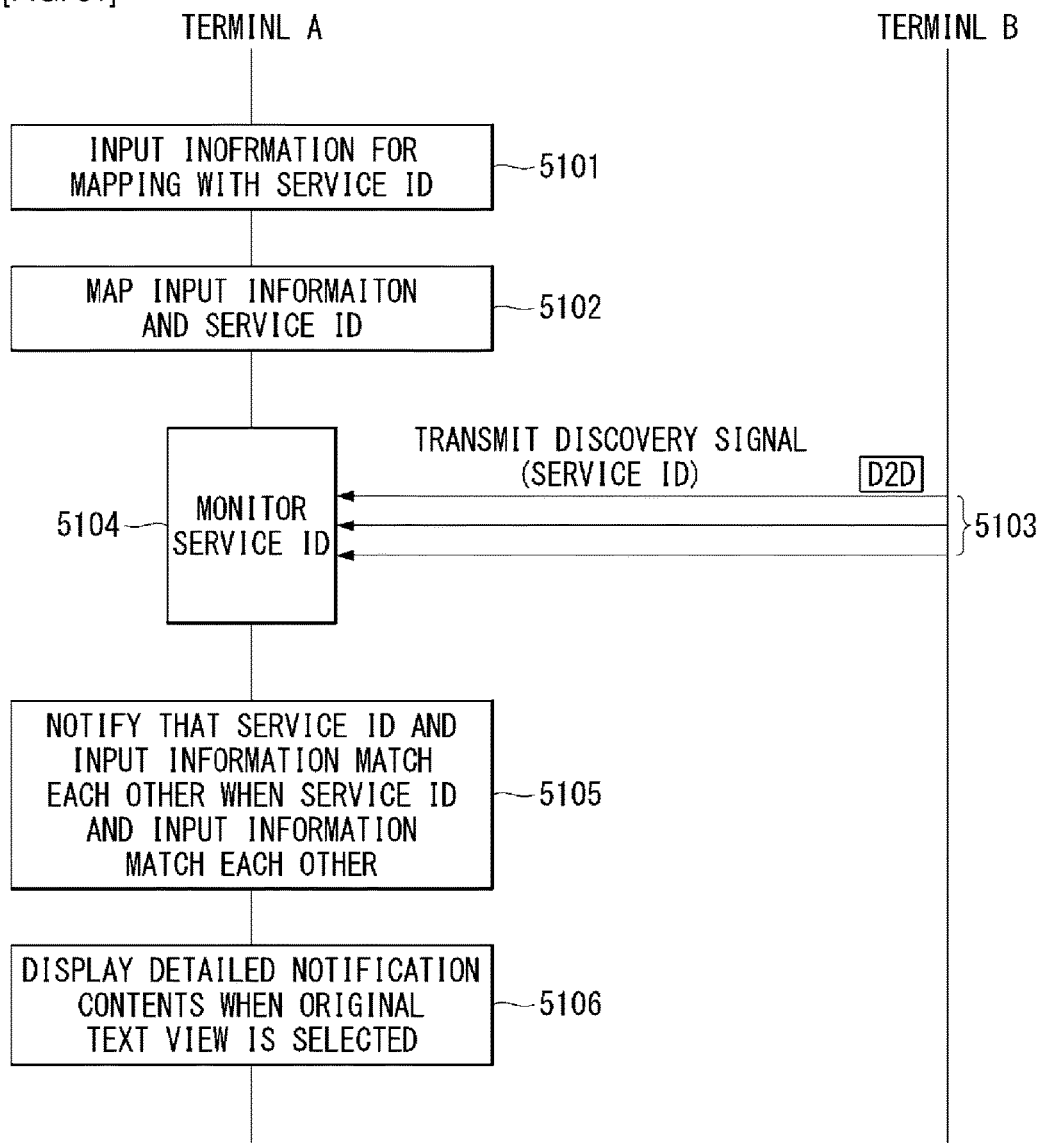

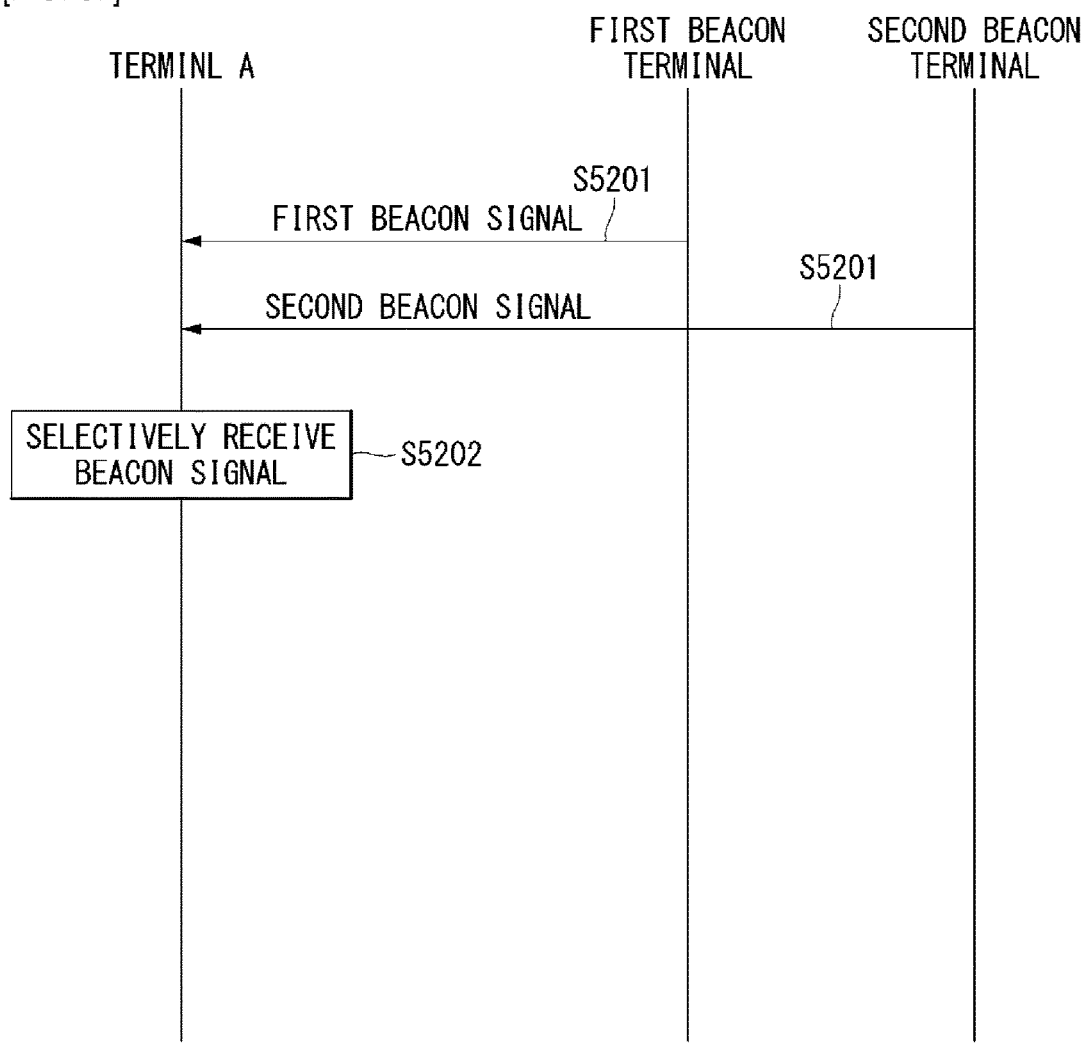
[FIG. 52]

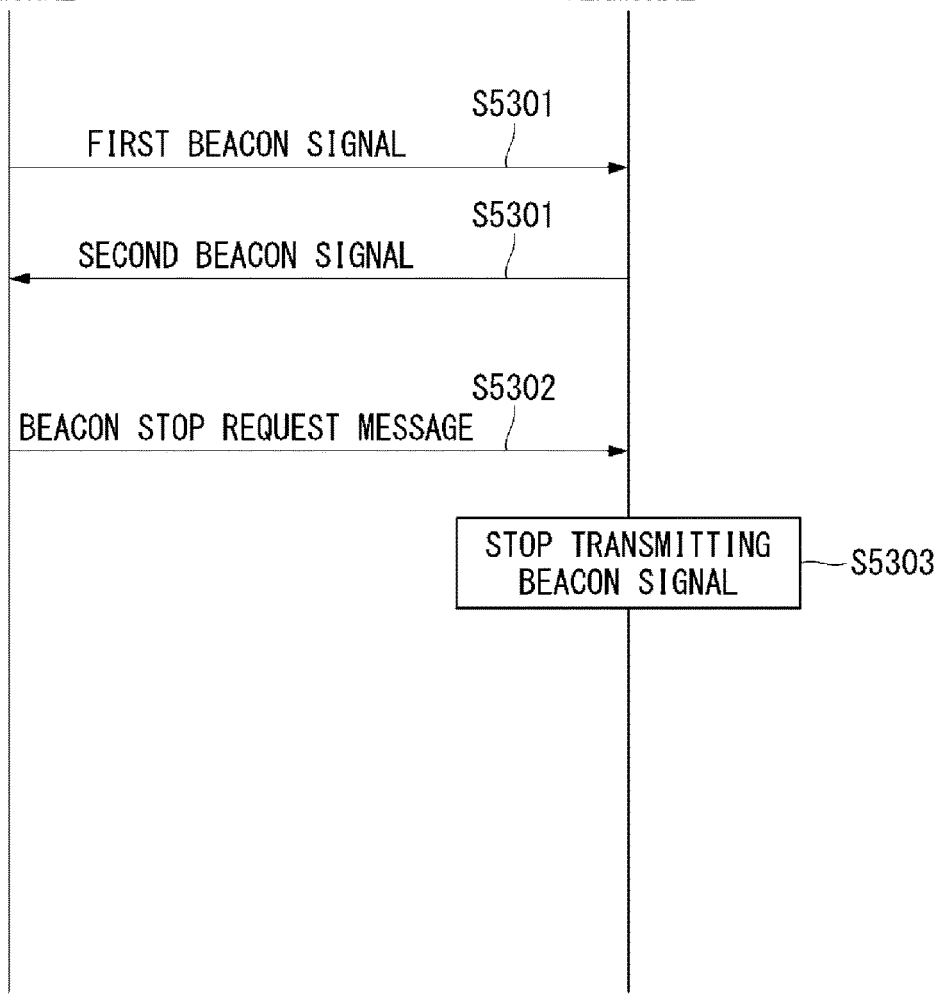

[FIG. 54]
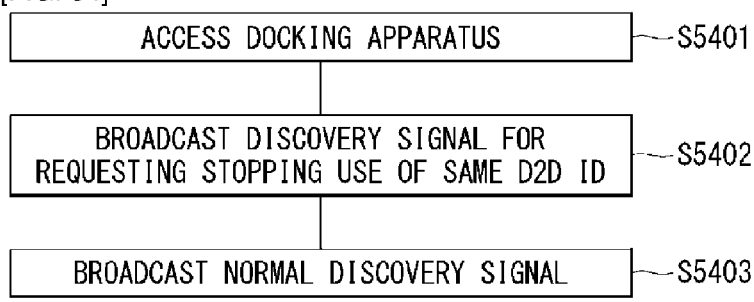
[FIG. 55]
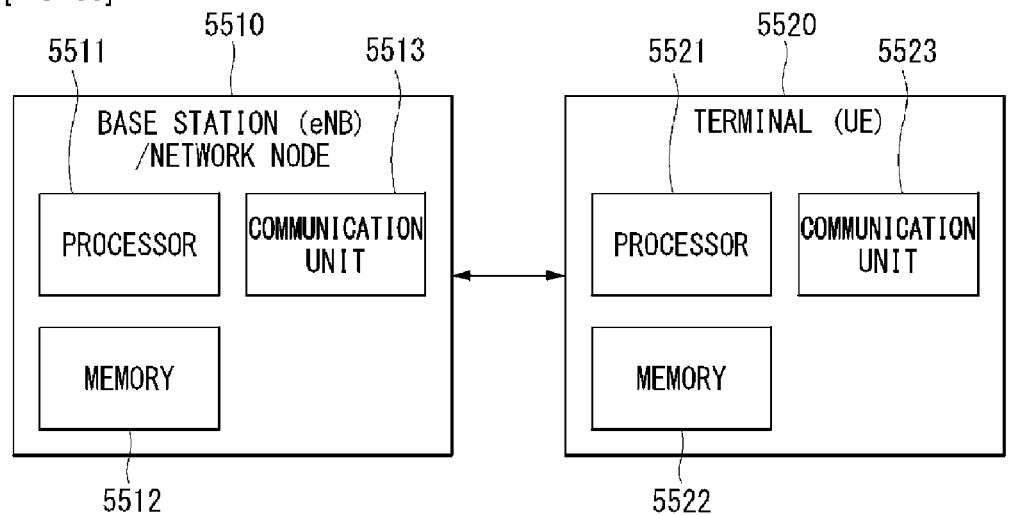

[FIG. 56]
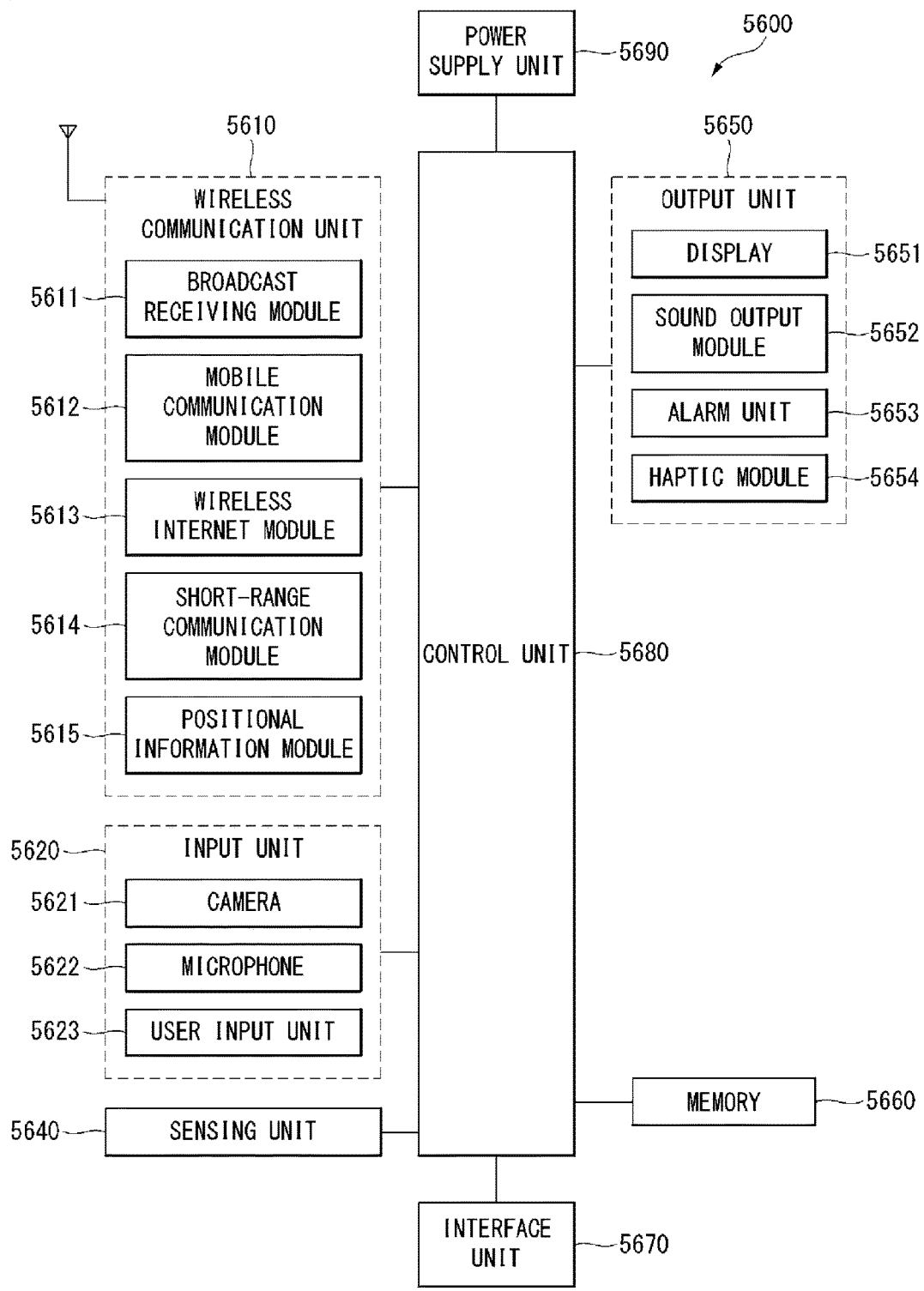

METHOD FOR PROXIMITY-BASED NOTIFICATION IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2015/003674, filed on Apr. 13, 2015, which claims the benefit of U.S. Provisional Application No. 61/978,976, filed on Apr. 13, 2014, No. 61/978,977, filed on Apr. 13, 2014, No. 61/978,978, filed on Apr. 13, 2014, No. 61/978,979, filed on Apr. 13, 2014, the contents of which are all hereby incorporated by reference herein in their entirety.

TECHNICAL FIELD

The present invention relates to a wireless communication system, and more particularly, to a method for proximity-based notification in a wireless communication system and a device for the same, which support device to device (D2D) communication.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention proposes a method for proximity-based notification, which is used for notifying that each terminal among a plurality of terminals having the same schedule, such as a meeting, a promise, and the like is proximate to a schedule place.

Another object of the present invention proposes a method for proximity-based notification, which is used for notifying that a store providing a service associated with information input by a terminal user, and the like are proximate.

Yet another object of the present invention proposes a method for preventing duplication of a service ID allocated for each service in a situation in which multiple services are provided.

Still yet another object of the present invention proposes a D2D terminal group managing method for managing a position of a group member terminal based on a specific D2D terminal in a D2D group constituted by a plurality of D2D terminals.

Still yet another object of the present invention proposes a D2D terminal group managing method for maintaining a connection between a terminal which deviates from coverage and a group member terminal when a D2D group member terminal deviates from predetermined coverage.

Technical objects of the present invention are not limited to the above-described object and other technical objects that have not been described above will become evident to those skilled in the art from the following description.

Technical Solution

According to an aspect of the present invention, a proximity based notification method in a wireless communication system supporting device to device communication (D2D) may include the steps of: configuring, by a first terminal, a list of terminals which participate in an notification service and a notification time; broadcasting, by the first terminal, a discovery signal including a first D2D ID on a physical sidelink discovery channel (PSDCH) when the notification time arrives; and outputting, by the first terminal, a notification for notifying that a second terminal is proximate when the first terminal receives a second discovery signal including a second D2D ID from the second terminal included in the terminal list on the PSDCH.

According to another aspect of the present invention, a first terminal performing a proximity based notification in a wireless communication system supporting device to device communication (D2D) includes a radio frequency (RF) unit for transmitting/receiving a wireless signal; and a processor, wherein the processor is configured to configure a list of terminals which participate in an notification service and a notification time, broadcast a discovery signal including a first D2D ID on a physical sidelink discovery channel (PSDCH) when the predetermined notification time arrives, and output a notification for notifying that a second terminal is proximate when the first terminal receives a second discovery signal including a second D2D ID from the second terminal included in the terminal list on the PSDCH.

Preferably, the proximity based notification method may further include the step of transmitting, by the first terminal, a notification service use agreement request message for requesting participation in the notification service to the second terminal.

Preferably, the proximity based notification method may further include the step of receiving, by the first terminal, the first D2D ID and the second D2D ID from a D2D ID management server.

Preferably, the proximity based notification method may further include the steps of receiving, by the first terminal, the first D2D ID from the D2D ID management server; and receiving, by the first terminal, the second D2D ID from the second terminal.

Preferably, the proximity based notification method may further include the step of returning, by the first terminal, the first D2D ID to the D2D ID management server.

According to another aspect of the present invention, a proximity based notification method in a wireless communication system supporting device to device communication (D2D) may include the steps of: receiving, by a terminal, input information from a user; mapping, by the terminal, the input information and a service ID; monitoring, by the terminal, whether a discovery signal transmitted from an adjacent terminal on a physical sidelink discovery channel (PSDCH) includes the mapped service ID; and outputting, by the terminal, a notification for notifying that a service corresponding to the mapped service ID is proximate when receiving the discovery signal including the mapped service ID.

According to another aspect of the present invention, a terminal performing a proximity based notification in a wireless communication system supporting device to device communication (D2D) includes an input unit for inputting information; a radio frequency (RF) unit for transmitting/receiving a wireless signal; and a processor, wherein the processor is configured to receive input information from a user, map the input information and a service ID, monitor whether a discovery signal transmitted from an adjacent terminal on a physical sidelink discovery channel (PSDCH) includes the mapped service ID, and output a notification for notifying that a service corresponding to the mapped service ID is proximate when receiving the discovery signal including the mapped service ID.

Preferably, the proximity based notification method may further include the step of generating, by the terminal, a discovery signal monitoring list including the mapped service ID and link information for connection to an application program in which the input information is input.

Preferably, the proximity based notification method may further include displaying, by the terminal, the application program in which the input information is input by using the link information.

Preferably, the service ID may be hierarchically configured through a combination of one or more sub-service IDs.

Advantageous Effects

According to embodiments of the present invention, it can be verified in real time that each terminal among a plurality of terminals having the same schedule, such as a meeting, a promise, and the like is proximate to a schedule place.

Further, according to the embodiment of the present invention, it can be verified in real time that a store providing a service associated with information input by a terminal user, and the like are proximate.

In addition, according to the embodiment of the present invention, it is possible to prevent duplication of a service ID even in a situation in which multiple services are provided.

Moreover, according to the embodiment of the present invention, a position of a D2D group member terminal can be continuously managed based on a D2D signal.

Besides, according to the embodiment of the present invention, even when the D2D group member terminal deviates from predetermined coverage, a connection between the terminal which deviates from the coverage and the group member terminal can be maintained.

The technical effects of the present invention are not limited to the above-described effects and other technical effects that have not been described above will be evidently understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 illustrates an M2M system according to an ETSI technical standard to which the present invention can be applied.

FIG. 2 illustrates an example of the network structure of E-UTRAN (evolved universal terrestrial radio access network) to which the present invention can be applied.

FIG. 3 illustrates the configurations of a control plane and a user plane of a radio interface protocol between the E-UTRAN and a UE in the wireless communication system to which the present invention can be applied.

FIG. 4 illustrates the structure of a radio frame in a wireless communication system to which an embodiment of the present invention can be applied.

FIG. 5 is a diagram illustrating a resource grid for one downlink slot in a wireless communication system to which an embodiment of the present invention can be applied.

FIG. 6 illustrates the structure of a downlink subframe in a wireless communication system to which an embodiment of the present invention can be applied.

FIG. 7 illustrates the structure of an uplink subframe in a wireless communication system to which an embodiment of the present invention may be applied.

FIG. 8 is a flowchart illustrating a process of establishing RRC connection in the wireless communication system to which the present invention can be applied.

FIG. 9 is a flowchart illustrating a process of reconfiguring RRC connection in the wireless communication system to which the present invention can be applied.

FIG. 10 is a diagram illustrating an uplink resource allocating process of a terminal in the wireless communication system to which the present invention can be applied.

FIG. 11 is a diagram for conceptually describing D2D communication in the wireless communication system to which the present invention can be applied.

FIG. 12 illustrates one example of various scenarios of D2D communication to which a method proposed by the present specification can be applied.

FIG. 13 is a diagram for describing a distributed discovery resource allocating method in the wireless communication system to which the present invention can be applied.

FIG. 14 is a diagram schematically illustrating a discovery process of a terminal using the distributed discovery resource allocating method in the wireless communication system to which the present invention can be applied.

FIG. 15 is a diagram for describing a method for transmitting/receiving signaling for D2D direct communication in the wireless communication system to which the present invention can be applied.

FIG. 16 is a diagram for describing a method for transmitting downlink control information for D2D direct communication in the wireless communication system to which the present invention can be applied.

FIG. 17 is a diagram illustrating a scenario of measuring a position of UE using a D2D signal/channel according to an embodiment of the present invention.

FIG. 18 is a diagram for describing a spread delay between UEs according to an embodiment of the present invention.

FIGS. 19 and 20 are diagrams for describing a method of measuring a distance between operating UE and target UE by using the D2D signal/channel according to an embodiment of the present invention.

FIGS. 21 to 24 are diagrams for describing a method of measuring a position of the target UE by using the D2D signal/channel according to an embodiment of the present invention.

FIGS. 25 and 26 are diagrams for describing a method of measuring the position of the target UE or the distance from the target UE by using the D2D signal/channel according to an embodiment of the present invention.

FIG. 27 illustrates a user interface for implementing a D2D terminal group managing method according to an embodiment of the present invention.

FIGS. 28 to 34 are diagrams illustrating a D2D terminal group managing method according to an embodiment of the present invention.

FIG. 35 is a diagram illustrating a user interface (UI) for implementing a method for proximity-based notification according to an embodiment of the present invention.

FIGS. 36 to 38 are diagrams illustrating a method for proximity-based notification according to an embodiment of the present invention.

FIG. 39 is a diagram for describing a method for matching a specific information field and a D2D ID according to an embodiment of the present invention.

FIGS. 40 to 42 are diagrams illustrating a user interface for implementing a method for proximity-based notification according to an embodiment of the present invention.

FIG. 43 illustrates a user interface for receiving information from a user according to an embodiment of the present invention.

FIG. 44 is a diagram illustrating a user interface for receiving information from a user by using a link function according to an embodiment of the present invention.

FIG. 45 is a diagram illustrating an association service table according to an embodiment of the present invention.

FIG. 46 is a diagram illustrating a D2D discovery signal monitoring list according to an embodiment of the present invention.

FIG. 47 is a diagram illustrating a branch of a hierarchical service ID according to an embodiment of the present invention.

FIG. 48 is a diagram illustrating a mapping result of an association word and a service ID according to an embodiment of the present invention.

FIG. 49 is a diagram illustrating a format of a discovery signal according to an embodiment of the present invention.

FIG. 50 is a diagram illustrating a setting menu screen for implementing a method of proximity-based notification according to an embodiment of the present invention.

FIG. 51 is a diagram illustrating a method for proximity-based notification according to an embodiment of the present invention.

FIGS. 52 to 54 are diagrams illustrating a method for preventing duplication of a service ID according to an embodiment of the present invention.

FIG. 55 is a block diagram of a wireless communication apparatus according to an embodiment of the present invention.

FIG. 56 is a block diagram of another terminal according to an embodiment of the present invention.

BEST MODE

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical spirit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of ETSI (European Telecommunications Standards Institute), IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

A concept and a technology in which an object is connected to a network or information is shared by configuring a communication network among objects by using a communication device attached to the object may be called machined to machine communication.

The ETSI calls the machine to machine communication as Machine-to-Machine (M2M) and the M2M is defined as communication among two or more objects in which human direct intervention is not particularly required.

In the specification, an M2M server calls a server for M2M communication and calls a fixed station or a mobile station. The M2M server may exchange data and control information by communicating with M2M devices and/or other M2M server. Further, in the present invention, an M2M gateway calls a device that serves as a connection point which enters another network from one network when a network connected with the M2M device and a network connected with the M2M server are different from each other.

In addition, in the specification, a term "entity" may be used to call hardware such as the M2M device, the M2M gateway, and the M2M server or used to call software components of an M2M application layer and an M2M (common) service layer described below.

FIG. 1 illustrates an M2M system according to an ETSI technical standard to which the present invention can be applied.

An M2M system according to an ETSI TS M2M technical standard defines a common M2M service framework for various M2M applications. The M2M applications may call software components that implement M2M service solutions such as e-Health, City Automation, Connected Consumer, and Automotive. In the M2M system, functions commonly required for implementing the various M2M applications may be provided and the commonly required functions may be called an M2M service or an M2M common service. When the M2M common service is used, the M2M application may be easily implemented without reconfiguring a basic service framework for each M2M application.

The M2M service is provided in the form of a service capability (SC) and the M2M application may access the SC through an open interface and use the M2M service provided by the SC. The SC may be a set of functions of the M2M service, which may be used when the M2M application is provided on the service framework. A service capability (SC) entity and a service capability (SC) layer may be collectively called the SC.

The SC may be expressed as xSC. Herein, x may be expressed as one of N, G, and D and represents at which network (and/or server), gateway, or device the SC is present. For example, the NSC represents the SC which is present on the network and/or server and the GSC represents the SC which is present on the gateway.

The M2M application may be present on the network, the gateway, or the device.

The M2M application which is present on the network or present in direct connection with the server is called an M2M network application and may be briefly represented by a network application (NA). For example, the NA is software implemented in direct connection to the server and may serve to communicate with and manage the M2M gateway or the M2M device.

The M2M application which is present on the device is called an M2M device application and may be briefly expressed by a device application (DA). For example, the DA is software driven in the M2M device and may transfer sensor information, and the like to the NA.

The M2M application which is present on the gateway is called an M2M gateway application and may be briefly expressed by a gateway application (GA). For example, the GA may serve to manage an M2M gateway and provide the service capability (SC) to the DA. An application entity (AE) and an application layer may be collectively called the M2M application.

Referring to FIG. 1, a high level architecture for the M2M may be divided into a network domain and a device and gateway domain.

The network domain may be constituted by an access network, a core network, an M2M service capability (SC), an M2M application, network management functions, and an M2M management function.

The access network is an entity that enables the M2M device and the gateway domain to communicate with the core network. Examples of the access network include xDSL (Digital Subscriber Line), HFC (Hybrid Fiber Coax), a satellite, GERAN, UTRAN, eUTRAN, Wireless LAN, WiMAX, and the like.

The core network is an entity that provides functions including Internet protocol (IP) connection, service and network control, interconnection, roaming, and the like. The core network includes a 3rd Generation Partnership Project (3GPP) core network, an ETSI Telecommunications and Internet converged Services and Protocols for Advanced Networking (TISPAN) core network, a 3GPP2 core network, and the like.

Therefore, in an example of FIG. 1, the core network and the access network provides connections among the respective entities rather than performing an M2M function. M2M communication may be performed among the M2M SCs in the network domain and the device and gateway domain through the core network and the access network and the M2M application of each domain may transmit and receive a signal or information through the M2M SC of each domain.

The M2M SC may provide an M2M common service function (CSF) which may be shared in multiple M2M network applications and exposes the M2M service through the open interface to allow the M2M applications to use the M2M service. An M2M SC entity may be appreciated as one instance of a common service function (CSF) and provides a subset of the common service functions (CSFs) which may be used and shred by the M2M applications. An M2M service capability layer (SCL) may represent a layer including the M2M SC entity.

The M2M application is an entity that may operate service logic and use the M2M SC through the open interface. The M2M application layer may represent a layer including the application and related operational logic.

The network management functions are constituted by functions required for managing the core network and the access network. The functions include provisioning, supervision, fault management, and the like.

The M2M management function is constituted by a function required for managing the M2M SC in the network domain. A specific M2M SC is used to manage the M2M device and the gateway. A set of the M2M management function includes a function for an M2M service bootstrap. The function is called an M2M service bootstrap function (MSBF) and is implemented in an appropriate server. A role of the MSBF enables a bootstrap of permanent M2M service layer security credential in the M2M SC in the M2M device (alternatively, the M2M gateway) and the network domain. Permanent security credential bootstrapped by using the MSBF (e.g., an M2M root key) is stored at a safe position called an M2M authentication server (MAS). The server may be an AAA server. The MSBF may be included in the MAS and further, may communicate with the MAS through an appropriate interface (e.g., a diameter when the MAS is AAA). The corresponding permanent security credential established in a DIG M2M node during the bootstrapping is stored in a secured environment domain of the D/G M2M node.

The device and gateway domain is constituted by the M2M device, an M2M area network, and the M2M gateway.

The M2M device is an entity that operates the M2M device application through the M2M SC. The M2M device may include the M2M application and/or the M2M SC.

The M2M device may be connected with the network domain through the access network (that is, communicate with the M2M server of the network domain). The M2M device performs procedures including registration, authentication, authorization, management, and provisioning with the network domain. The M2M device may provide the service in connection with other devices (e.g., a legacy device, and the like) hidden from the network domain.

The M2M device may be connected with the network domain through the M2M gateway (that is, communicate with the M2M server of the network domain). When the M2M device is connected with the network domain through the M2M gateway, the M2M gateway operates like a proxy. One example of a proxy procedure of the M2M gateway corresponds to the authentication, the authorization, the management, and the provisioning. The M2M device is connected with the M2M gateway by using the M2M area network.

The M2M device may be connected to the network domain through multiple M2M gateways.

The M2M area network provides connectivity between the M2M device and the M2M gateway. In this case, the network between the M2M gateway and the M2M server and the network between the M2M device and the M2M gateway may be different from each other. For example, the M2M area network may be implemented by using a personal area network (PAN) technology such as IEEE802.15.1, Zigbee, Bluetooth, IETF ROLL, or ISA100.11a and a local network technology such as power line communication (PLC), M-BUS, wireless M-BUS, KNX, or the like.

The M2M gateway is an entity that manages the M2M application through the M2M SC and provides the service to the M2M application. The M2M gateway may include the M2M application and/or the M2M SC. The M2M gateway may represent an entity having a gateway function among the M2M devices.

The M2M gateway may serve as the proxy between the M2M device and the network domain and provide the service in connection with other devices (e.g., the legacy device, and the like) hidden from the network domain. For example, the M2M gateway may operate an application that collects and handles various information (e.g., information from a sensor and a contextual parameter).

An M2M system architecture illustrated in FIG. 1 is just an example and a name of each entity may vary. For example, in a system (called an oneM2M system) according to a oneM2M technical standard, the M2M SC may be called an M2M common service entity (CSE) and a service capability layer (SCL) may be called a common service layer (CSL). Further, the M2M application may be called the application entity (AE) and the M2M application layer may be briefly called the application layer. Similarly, the name of each domain may also vary. For example, in the oneM2M system, the network domain may be called an infrastructure domain and the device and gateway domain may be called a field domain.

As illustrated in FIG. 1, the M2M system may be appreciated as a layer structure including the M2M application layer and the M2M SC layer for the M2M communication.

Meanwhile, even in the 3GPP, a standardization work is progressed by using a name called machine type communications with respect to M2M communication. In the 3GPP, the MTC is defined in the form of data communication which one or more objects are concerned with, in which human intervention is not particularly required.

In the specification, the MTC may be appreciated as the same meaning as the M2M communication, Internet of things (IoT), and device-to-device (D2D).

Hereinafter, in order to clearly describe the present invention, 3GPP LTE/LTE-A is primarily described, but a technical feature of the present invention is not limited thereto.

General System to which Present Invention can be Applied

FIG. 2 illustrates an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (S1-U) is defined between the eNB and the serving gateway (S-GW). The SI control plane interface (S1-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 3 illustrates the configurations of a control plane and a user plane of a radio interface protocol between the E-UTRAN and a UE in the wireless communication system to which the present invention can be applied.

FIG. 3(*a*) shows the respective layers of the radio protocol control plane, and FIG. 3(*b*) shows the respective layers of the radio protocol user plane.

Referring to the FIG. 3, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

FIG. 4 illustrates the structure of a radio frame in a wireless communication system to which an embodiment of the present invention can be applied.

3GPP LTE/LTE-A support a radio frame structure type 1 which may be applicable to Frequency Division Duplex (FDD) and a radio frame structure which may be applicable to Time Division Duplex (TDD).

FIG. 4(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 4(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of a radio frame is only one example. The number of subcarriers included in a radio frame or the number of slots included in a subframe and the number of OFDM symbols included in a slot may be changed in various ways.

FIG. 5 is a diagram illustrating a resource grid for one downlink slot in a wireless communication system to which an embodiment of the present invention can be applied.

Referring to FIG. 5, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

FIG. 6 illustrates the structure of a downlink subframe in a wireless communication system to which an embodiment of the present invention can be applied.

Referring to FIG. 6, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a high layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 7 illustrates the structure of an uplink subframe in a wireless communication system to which an embodiment of the present invention can be applied.

Referring to FIG. 7, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

RRC Connection Procedure

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

Further, in order to manage signaling connection between the terminal and the network, an EPS connection management (ECM) connected state (ECM-CONNECTED) and an ECM idle (ECM-IDLE) state may be defined. The ECM connected state and the ECM idle state may also be applied to the terminal and the MME. ECM connection is constituted by RRC connection configured between the terminal and the base station and S1 signaling connection configured between the base station and the MME. An RRC state represents whether the RRC layer of the terminal and the RRC layer of the base station are logically connected to each other. That is, when the RRC layer of the terminal and the RRC layer of the base station are connected to each other, the terminal is in the RRC connected state (RRC_CONNECTED). When the RRC layer of the terminal and the RRC layer of the base station are not connected to each other, the terminal is in the RRC idle state (RRC_IDLE).

The network may determine the presence of the terminal which is in the ECM connected state by the unit of the cell and effectively control the terminal. On the contrary, the network may not determine the presence of the terminal which is in the ECM idle state and the core network (CN) manages the terminal by the unit of a tracking area which is a larger region unit than the cell. When the terminal is in the ECM idle state, the terminal performs discontinuous reception (DRX) configured by the NAS by using a uniquely allocated ID in the tracking area. That is, monitors a paging signal at a specific paging opportunity for each terminal-specific paging DRX cycle to receive a broadcast of system information and paging information. Further, when the terminal is in the ECM idle state, the network does not have context information of the terminal. Therefore, the terminal in the ECM idle state may perform a terminal based mobility associated procedure such as cell selection or cell reselection without receiving a command of the network. When a position of the terminal in the ECM idle state is different from a position known by the network, the terminal may notify the position of the corresponding terminal to the network through a tracking area update (TAU) procedure. On the contrary, when the terminal is in the ECM connected state, the mobility of the terminal is managed by the command of the network. In the ECM connected state, the network knows the cell to which the terminal belongs. Accordingly, the network may transmit and/or receive data to or from the terminal, control the mobility such as handover of the terminal and perform cell measurement for a neighboring cell.

As described above, the terminal needs to be transitioned to the ECM connected state in order to receive a general mobile communication service such as voice or data. Like the case of turning on the power of the terminal for the first time, the initial terminal is in the ECM idle state similarly to the EMM state and when the terminal successfully registers in the corresponding network through the initial attach procedure, the terminal and the MME are transitioned to the ECM connected state. Further, when the terminal is registered in the network, but traffic is deactivated and a radio resource is not thus allocated, the terminal is in the ECM idle state and when new uplink or downlink traffic occurs in the corresponding terminal, the terminal and the MME are transitioned to the ECM connected state through a service request procedure.

FIG. 8 is a flowchart illustrating a process of establishing RRC connection in the wireless communication system to which the present invention can be applied.

The terminal transmits an RRC connection request message for requesting the RRC connection to the base station (S510). The base station transmits an RRC connection setup message as a response to the RRC connection request (S802). The terminal enters an RRC connection mode after receiving the RRC connection setup message.

The terminal transmits an RRC connection setup complete message used for verify successful completion of establishing the RRC connection (S803).

FIG. 9 is a flowchart illustrating a process of reconfiguring RRC connection in the wireless communication system to which the present invention can be applied.

RRC connection reconfiguration is used to modify the RRC connection. The RRC connection reconfiguration is used to RB establish/modify/release, handover execution, and measurement setup/modification/release.

The base station transmits the RRC connection configuration message for modifying the RRC connection (S901). The terminal transmits to the base station an RRC connection reconfiguration complete message used for verify successful completion of the RRC connection reconfiguration as a response to the RRC connection reconfiguration (S902).

Uplink Resource Allocation Procedure

In a 3GPP LTE/LTE-A system, a scheduling based data transmitting/receiving method of the base station is used in order to maximize utilization of the resource. This means that when there is data which the terminal will transmit, uplink resource allocation is preferentially requested to the base station and the data may be transmitted by using only an allocated uplink resource.

FIG. 10 is a diagram illustrating an uplink resource allocating process of a terminal in the wireless communication system to which the present invention can be applied.

In order to efficiently use an uplink radio resource, the base station needs to know transmit what kind of data and how much data is to be transmitted to the uplink. Therefore, the terminal may transfer information on uplink data which the terminal autonomously intends to transmit and the base station may allocate the uplink resource to the corresponding terminal based thereon. In this case, the information on the uplink data which the terminal transfers to the base station as an amount of the uplink data stored in a buffer of the terminal is called a buffer status report (BSR). When the resource on the PUSCH is allocated at a current TTI and a reporting event is triggered, the terminal transmits the BSR by using an MAC control element.

FIG. 10(*a*) illustrates in which the terminal allocates the uplink resource for the actual data when the uplink radio resource for the buffer status report is not allocated to the terminal. That is, since a terminal that is transitioned from a DRX mode to an active mode has no previously allocated data resource, the terminal needs to request a resource for uplink data with SR transmission through the PUCCH as a start and in this case, an uplink resource allocation procedure of 5 steps is used.

Referring to FIG. 10(*a*), as a case in which a PUSCH resource for transmitting the BSR is not allocated, the terminal first transmits a scheduling request (SR) to the base station in order to be allocated with the PUSCH resource (S1001).

The scheduling request is used for the terminal to request the PUSCH resource in order to be allocated with the PUSCH resource for uplink transmission when the radio resource is not scheduled on the PUSCH at the current TTI while reporting event occurs. That is, when a regular BSR is triggered, but the terminal has no uplink radio resource for transmitting the BSR to the base station, the terminal transmits the SR on the PUCCH. The terminal transmits the SR on the PUCCH or starts a random access procedure according to whether the PUCCH resource for the SR is configured. In detail, the PUCCCH resource in which the SR may be transmitted may be determined by a combination of a PRB in which the SR is transmitted, a cyclic shift (CS) applied to a basic sequence (e.g., a ZC sequence) for frequency domain spread of the SR, and an orthogonal code (OC) for time domain spread of the SR. Further, the PUCCH resource may include SR transmission periodicity and SR subframe offset information. The PUCCH resource in which the SR may be transmitted may be terminal-specifically configured by a high layer (e.g., the RRC layer).

When the terminal receives from the base station a UL grant for the PUSCH resource for transmitting the BSR (S1002), the terminal transmits the BSR triggered through the PUSCH resource allocated by the UL grant (S1003).

The base station verifies the amount of data which the terminal will actually transmit to the uplink through the BSR and transmits the UL grant for the PUSCH resource for actual data transmission to the terminal (S1004). The terminal that receives the UL grant for the actual data transmission transmits actual uplink data to the base station through the allocated PUSCH resource (S1005).

FIG. 10(*b*) illustrates a process in which the terminal allocates the uplink resource for actual data when the uplink radio resource for the BSR is allocated to the terminal.

Referring to FIG. 10(b), as a case in which the PUSCH resource for transmitting the BSR has already been allocated, the terminal transmits the BSR through the allocated PUSCH resource and transmits the scheduling request to the base station simultaneously therewith (S1006). Subsequently, the base station verifies the amount of data which the terminal will actually transmit to the uplink through the BSR and transmits the UL grant for the PUSCH resource for the actual data transmission to the terminal (S1007). The terminal that receives the UL grant for the actual data transmission transmits the actual uplink data to the base station through the allocated PUSCH resource (S1008).

Device-to-Device (D2D) Communication

A Device-to-Device (D2D) communication technology means a scheme in which terminals which are geographically proximate to each other directly communicate with each other without using an infrastructure such as the base station. As the D2D communication technology, technologies primarily using an unlicensed frequency band have been developed, such as Wi-Fi Direct and Bluetooth. However, development and standardization of the D2D communication technology using a licensed frequency band are in progress for the purpose of improving frequency use efficiency of a cellular system.

In general, the D2D communication as a term which denotes communication between things or the M2M communication is limitedly used, but the D2D communication in the present invention may include all of communication among various types of devices having a communication function, such as a smart phone or a personal computer in addition to a simple device having the communication function.

FIG. 11 is a diagram for conceptually describing D2D communication in the wireless communication system to which the present invention can be applied.

FIG. 11(a) illustrates a base station based communication scheme in the related art and terminal 1 (UE 1) may transmit data to the base station on the uplink and the base station may transmit data to terminal 2 (UE 2) on the downlink. The communication scheme may be referred to as an indirect communication scheme through the base station. In the indirect communication scheme, a Un link (as a link between the base stations or a link between the base station and a repeater, may be referred to as a backhaul link) which is a link defined in a wireless communication system in the related art and/or a Un link (as a link between the base station and the terminal or a link between the repeater and the terminal, may be referred to as an access link) may be associated.

FIG. 11(b) as one example of the D2D communication illustrates a UE-to-UE communication scheme and UE-to-UE data exchange may be performed without using the base station. The communication scheme may be referred to as a direct communication scheme between the devices. The D2D direct communication scheme has advantages including a decrease in latency, use of less radio resources, and the like as compared with the indirect communication scheme through the base station.

FIG. 12 illustrates one example of various scenarios of D2D communication to which a method proposed by the present specification can be applied.

A scenario of the D2D communication may be largely divided into (1) an Out-of-coverage network, (2) a partial-coverage network, and (3) an in-coverage network according to whether UE 1 and UE 2 are positioned in coverage/out of coverage.

The case of the in-coverage network may be divided into an in-coverage-single-cell and an in-coverage-multi-cell according to the number of cells corresponding to the coverage of the base station.

FIG. 12(a) illustrates one example of an Out-of-coverage network scenario of the D2D communication.

An out-of-coverage network scenario represents D2D communication between D2D terminals without control of the base station.

In FIG. 12(a), it may be illustrated that only UE 1 and UE 2 are present and UE 1 and UE 2 perform direct communication.

FIG. 12(b) illustrates one example of a partial-coverage network scenario of the D2D communication.

The partial-coverage network scenario represents performing the D2D communication between the D2D terminal positioned in the network coverage and the D2D terminal positioned out of the network coverage.

In FIG. 12(b), it may be illustrated that UE 1 positioned in the network coverage and UE 2 positioned out of the network coverage communicate with each other.

FIG. 12(c) illustrates one example of an in-coverage-single-cell scenario and FIG. 12(d) illustrates one example of an in-coverage-multi-cell scenario.

The in-coverage network scenario represents that the D2D terminals perform the D2D communication through the control of the base station in the network coverage.

In FIG. 12(c), UE 1 and UE 2 are positioned within the same network coverage (alternatively, cell) and perform the D2D communication under the control of the base station.

In FIG. 12(d), UE 1 and UE 2 are positioned in the network coverage, but positioned in different network coverage. In addition, UE 1 and UE 2 perform the D2D communication under the control of the base station managing each network coverage.

Hereinafter, the D2D communication will be described in more detail.

The D2D communication may operate in the scenario illustrated in FIG. 3, but in general, the D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs) per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal and a secondary sidelink synchronization signal, respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal/sequence.

Further, a channel may be required, which is used for purpose of transferring required information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

D2D Discovery

Hereinafter, in the present patent, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In distributed discovery, as a resource used for the UE to transmit and receive the discovery message, a dedicated resource may be periodically allocated apart from a cellular resource. The dedicated resource will be described below with reference to FIG. 13.

FIG. 13 is a diagram for describing a distributed discovery resource allocating method in the wireless communication system to which the present invention can be applied.

Referring to FIG. 13, in a distributed discovery scheme, a discovery subframe (that is, a 'discovery resource pool') 1301 for discovery among all cellular uplink frequency-time resources is fixedly (alternatively, dedicatedly) allocated and the residual area is constituted by an LTE uplink wide area network (WAN) subframe area 1302 in the related art. The discovery resource pool may be constituted by one or more subframes.

The discovery resource pool may be periodically allocated at a predetermined time interval (that is, a 'discovery period'). Further, the discovery resource pool may be repeatedly configured within one discovery period.

FIG. 13 illustrates an example in which the discovery resource pool is allocated with a discovery period of 10 sec and 64 consecutive subframes are allocated to the respective discovery resource pools. However, the size of the time/frequency resource of the discovery period and the discovery resource pool corresponds to one example and the present invention is not limited thereto.

The UE autonomously selects the resource (that is, the 'discovery resource') for transmitting the discovery message thereof in the dedicatedly allocated discovery pool and transmits the discovery message through the selected resource. This will be described below with reference to FIG. 14.

FIG. 14 is a diagram schematically illustrating a discovery process of a terminal using the distributed discovery resource allocating method in the wireless communication system to which the present invention can be applied.

Referring to FIGS. 13 and 14, the discovery scheme is largely constituted by three procedures of sensing a resource for transmitting the discovery message (S1401), selecting the resource for transmitting the discovery message (S1402), and transmitting and receiving the discovery message (S1403).

First, in sensing the resource for transmitting the discovery message (S1401), all UEs that perform the D2D discovery receive (that is, sense) all discovery messages during one period (that is, discovery resource pool) of the D2D discovery resource by a distributed scheme (that is, autonomously). For example, in FIG. 13, assumed that an uplink bandwidth is 10 MHz, all UEs receive (that is, sense) all discovery messages transmitted in N=44 RB (since a whole uplink bandwidth is 10 MHz, 6 RBs are used for PUCCH transmission in a total of 50 RBs.) for K=64 msec (64 subframes).

In addition, in selecting the resource for transmitting the discovery message (S1402), the UE classifies resources at a low energy level among the sensed resources and randomly selects the discovery resource among the classified resources within a predetermined range (e.g., lower x % (x=a predetermined integer, 5, 7, 10, . . . )).

The discovery resource may be constituted by one or more resource blocks having the same size and multiplexed by TDM and/or FDM in the discovery resource pool.

The reason why the UE selects the resource at the low energy level as the discovery resource is that the case of selecting the resource at the low energy level may be interpreted as a meaning that the UEs do not generally use the same D2D discovery resource nearby. That is, this disproves that there are not a lot of UEs that perform the D2D discovery procedure which causes interference nearby. Accordingly, there is a high possibility that the interference will be small at the time of transmitting the discovery message when the resource at the low energy level is selected.

Further, the reason for randomly selecting the discovery resource within the predetermined range without selecting a resource at a lowest energy level is that there is a possibility that several UEs will simultaneously select the same resource corresponding to the lowest energy level when selecting the resource at the lowest energy level. That is, the same resource at the lowest energy level is selected, and as a result, the interference may be frequently caused. Therefore, the corresponding resource is preferably randomly selected within a predetermined range (that is, configuring a candidate pool of selectable resources). Herein, for example, a range of the energy level may be variably set according to a design of a D2D system.

In addition, in transmitting and receiving the discovery message (S1403) as a last procedure, the UE transmits/receives the discovery message based on the discovery resource selected after one discovery period (after P=10 sec in the example of FIG. 13) and periodically transmits/receives the discovery message according to a random resource hopping pattern at subsequent discovery periods.

The D2D discovery procedure is performed even in the RRC_CONNECTED state in which the UE and the base station are connected and continuously performed even in the RRC_IDLE state in which the UE and the base station are not connected.

When such a discovery scheme is considered, all UEs sense all resources (that is, the discovery resource pool) which adjacent UEs transmit and randomly select the discovery resource among the sensed resources within the predetermined range (e.g., within the lower x %).

D2D Direct Communication

Hereinafter, methods for transmitting/receiving D2D control information and/or D2D data proposed in the specification will be described in detail.

The D2D control information may be referred to as sidelink control information (SCI) or scheduling assignment (SA). As described above, the D2D control information may be transmitted on the PSCCH and the D2D data may be transmitted on the PSSCH. Hereinafter, the D2D control information will be referred to as SA.

FIG. 15 is a diagram for describing a method for transmitting/receiving signaling for D2D direct communication in the wireless communication system to which the present invention can be applied.

FIG. 15 illustrates a method that performs the D2D communication by transmitting/receiving a D2D operating procedure in a D2D operating procedure (D2D communication Mode 1) by the control of the base station and information associated therewith.

As illustrated in FIG. 15, a scheduling assignment (SA) resource pool 1510 and/or a data resource pool 1520 associated with the D2D communication may be pre-configured and the pre-configured resource pool may be transmitted from the base station to the D2D UEs through the high layer signaling.

The high layer signaling may be the RRC signaling.

An expression of 'A and/or B' used in the specification may be interpreted as a concept meaning at least one of A and B (indicating A, B, or A & B).

The SA resource pool and/or data resource pool means a resource reserved for the D2D (UE-to-UE) link or the D2D communication.

The UE-to-UE link may be expressed as sidelink.

In detail, the SA resource pool means a resource area to transmit the SA and the data resource pool means a resource area to transmit the D2D data.

The SA may be transmitted according to an SA period 1530 and the D2D data may be transmitted according to a data transmission period 1540.

The SA period and/or the data transmission period may be transmitted from the base station to the D2D UE through a D2D grant.

Alternatively, the SA period may be transmitted through the D2D grant and the data transmission period may be transmitted through the SA.

Herein, the D2D grant represents downlink control information (DCI) required for transmitting the SA and the D2D data transmitted to the D2D UE by the base station.

The D2D grant may be expressed as DCI format 5 and transmitted through the physical layer channels including the PDCCH, the EPDCCH, and the like or an MAC layer channel.

Further, the D2D grant may include information associated with SA transmission and information associated with data transmission.

The SA may include a resource allocation (RA), an MCS, a new data indicator (NDI), a redundancy version (RV), and the like as an example.

As described above, the SA resource pool for the SA transmission may be transmitted through the RRC signaling.

Further, the SA may be transmitted through the Physical Sidelink Control Channel (PSCCH) and the D2D data may be transmitted through the Physical Sidelink Shared Channel (PSSCH).

The D2D transmitting UE may receive SA information, in particular, resource allocation (RA) information (hereinafter, referred to as 'SA RA' information) in which the SA may be transmitted, from the base station through the D2D grant.

In this case, the D2D transmitting UE may transmit the SA RA information received from the base station to the D2D receiving UE as it is or generate new SA RA information by referring to the received SA RA information and thereafter, transmit the newly generated SA RA information to the D2D receiving UE.

Herein, when the D2D transmitting UE newly generates the SA RA, the D2D transmitting UE needs to perform resource allocation of the SA only within the resource pool indicated by a D2D grant RA.

That is, the D2D transmitting UE may transmit the SA by selecting only a partial resource area (SA RA) in the resource area (D2D grant RA) which eNB allows to be used.

Alternatively, contrary to this, the D2D transmitting UE may use the D2D grant RA allocated by the eNB as it is.

FIG. 16 is a diagram for describing a method for transmitting downlink control information for D2D direct communication in the wireless communication system to which the present invention can be applied.

First, the SA resource pool and/or D2D data resource pool associated with the D2D communication are/is configured by a high layer (S1610).

Thereafter, the base station transmits the SA resource pool and/or D2D data resource pool to the D2D UE through the high layer signaling (S1620).

Thereafter, the base station transmits control information associated with the SA and/or control information associated with the D2D data to the D2D transmitting UE through the D2D grant separately or together (S1630). The control information includes scheduling information of the SA and/or D2D data in the SA resource pool and/or D2D data resource pool. The control information may include the RA, the MCS, the NDI, the RV, and the like as one example.

Thereafter, the D2D transmitting UE transmits the SA and/or D2D data to the D2D receiving UE based on the information received in step S1630 (S1640).

The SA transmission and the D2D data transmission may be simultaneously performed or the D2D data may be transmitted after the SA is transmitted.

Meanwhile, although not illustrated in FIG. 16, the D2D transmitting UE requests a transmission resource (that is, a PSSCH resource) for the D2D data to the base station and the base station schedules resources for transmitting the SA and the D2D data. To this end, the buffer status report (BSR) procedure may be performed so that the D2D transmitting UE transmits the scheduling request (SR) to the base station and thereafter, the base station determines the quantity of resources requested by the D2D transmitting UE.

Herein, Since the SR is the SR for requesting allocation of not the PUSCH resource but the PSSCH resource, the SR may be distinguished from the SR for requesting the PUSCH resource. To this end, in order to distinguish the SR for the PSSCH from the SR for the PUSCH, a PUCCH resource index (that is, the PRB in which the SR is transmitted), a cyclic shift (CS) applied to the basic sequence (e.g., ZC sequence) for frequency domain spread of the SR, and an orthogonal code (OC) for time domain spread of the SR may be differently configured.

When the D2D Rx UEs monitor the control information pool and decodes control information associated therewith, the D2D Rx UEs may selectively decode D2D data transmission associated with the corresponding control information.

The D2D grant serves to allocate the resources which the D2D Tx UE requires for transmitting the SA and the data and transfer the control information including the MCS, and the like, that is, the scheduling information, as described above.

Further, since the SCI is used for scheduling the PSSCH from the viewpoints of the D2D Tx UE and the D2D Rx UE, a DCI format for the D2D grant proposed in the present invention may be used for scheduling the PSSCH and include field information of the SCI.

The DCI format for the D2D grant (alternatively, the sidelink grant) includes both the scheduling for the SA and the data as described above, but a resource allocation assignment/allocation (RA) field (alternatively, information) for the SA and an RA field (alternatively, information) for the data may be distinguished from each other.

For example, the DCI format for the D2D grant may be constituted by a frequency hopping flag (FH) field, a resource allocation (RA) field for the D2D SA, a first RA field for the D2D data, a second RA field for the D2D data, a TPC field, and a zero padding (ZP) bit(s) (a case in which the ZP bit(s) is(are) present).

The FH field indicates whether frequency hopping is applied at the time of transmitting the SA and the data. Since the FH field may be commonly applied to the SA transmission and the data transmission, the FH field may be constituted by one field.

For example, when an FH field value is '1', the D2D Tx UE performs frequency hopping transmission at the time of transmitting the SA and the data and when the FH field value is '0', the D2D Tx UE does not perform the frequency hopping transmission at the time of transmitting the SA and the data.

The SA RA field (alternatively, a PSCCH RA field, a resource field for the PSCCH) indicates resource information for the SA transmission. That is, the SA RA field indicates scheduling information (that is, resource information) for PSCCH transmission. Therefore, the D2D Tx UE transmits the SA (that is, the PSCCH) in a resource indicated by the SA RA field.

Herein, the SA RA field may also include information (alternatively, an index) for deriving a time for the SA transmission and/or a position of the frequency resource area.

For example, the SA RA field may announce a start position (that is, the index) of the resource for the SA transmission. In other words, the SA RA field may indicate a start index of a subframe and/or a resource block in which the SA is transmitted.

Further, the D2D Tx UE may derive a time resource (e.g., a subframe index) and/or a frequency resource (e.g., a resource block index) for the SA transmission by using a predetermined function (equation) based on the information included in the SA RA field.

The resource allocation information for the D2D data transmission may be constituted by a D2D data first RA field (alternatively, a first PSSCH RA field, a resource block allocation and hopping resource allocation field), a D2D data second RA field (alternatively, a second PSSCH RA field, a time resource pattern field).

The D2D data first RA field indicates the resource information (e.g., the resource block) for the D2D data transmission in the frequency domain. That is, the D2D data first RA field indicates the scheduling information in the frequency domain for the PSSCH transmission. Therefore, the D2D Tx UE transmits the D2D data (that is, the PSSCH) in a frequency resource indicated by the D2D data first RA field.

For example, the D2D data first RA field may indicate a start position (that is, a start resource block index) of the resource block for the D2D data transmission and the length of the allocated resource block by using a resource indication value (MV) like a UL RA scheme.

Further, the D2D data first RA field may separately and announce the start position (that is, the start resource block index) and an end position (that is, a last resource block index) of the resource block for the D2D data transmission as separate fields (alternatively, information). In this case, an additional bit (e.g., 1 bit) may be further required.

The D2D data second RA field indicates resource information (e.g., the subframe) used for the D2D data transmission in the time domain. That is, the D2D data second RA field indicates the scheduling information in the time domain for the PSSCH transmission. Therefore, the D2D Tx UE transmits the D2D data (that is, the PSSCH) in a time resource indicated by the D2D data first RA field.

For example, the D2D data second RA field may indicate a subframe pattern (that is, a time resource pattern) to be used for the D2D data transmission. That is, the D2D data second RA field may include information indicating the time resource pattern used for the PSCCH transmission.

Herein, the D2D data second RA field may indicate any one pattern of a plurality of predetermined time resource patterns. For example, n subframe patterns (expressed by a bitmap) may be pre-defined like SF pattern #0(10001010), SF pattern #1(00111001), . . . , SF pattern #n(10011001) and the D2D data second RA field may indicate any one subframe pattern of n defined subframe patterns. Herein, a value of '1' of the bitmap may mean that the D2D data is transmitted in a corresponding subframe and a value of '0' may mean that the D2D data is not transmitted in the corresponding subframe. Further, the values of the bitmap may have meanings contrary thereto.

A TPC field indicates transmission power for the SA and data transmission in the D2D Tx UE. That is, the TPC field indicates transmission power information of the PSCCH and the PSSCH.

The TPC field 4205 may be constituted by one field. As such, when the TPC field is constituted by one field, the TPC field value is commonly applied to the transmission power for the SA transmission and the transmission power for the data transmission.

The ZP may be filled with the control information, not used, or not present as necessary. That is, when the ZP is not required, the ZP may be omitted.

Each field order and a bit count of each bit of the DCI format exemplified as above are just one example for easy description and may be modified.

Meanwhile, as compared with DCI format 0 given above, the DCI format for the D2D grant exemplified as above does not include the MCS field.

When the eNB announces the MCS value to the D2D Tx UE, the MCS field needs to be present in the DCI format for the D2D grant. However, the D2D Tx UE may autonomously determine the MCS value or the MCS value may be transferred through the higher layer signaling (e.g., the RRC signaling) or determined as a pre-fixed value. Accordingly, the D2D grant does not include the MCS field.

Further, the DCI format for the D2D grant exemplified as above does not include even the NDI field and the RV field. Similarly to the above, the D2D Tx UE may autonomously determine the NDI and RV values or the NDI and RV values may be transferred through the higher layer signaling (e.g., the RRC signaling) or determined as pre-fixed values.

Method for Measuring Position of D2D UE

FIG. 17 is a diagram illustrating a scenario of measuring a position of UE using a D2D signal/channel according to an embodiment of the present invention.

The present invention proposes a method in which UE measures a position of a counterpart UE or a distance between the counterpart UE and the UE by using signals used to transmitting/receiving a D2D direct radio channel/signal to/from another UE as illustrated in FIG. 17.

If the UE may determine the position of another UE or a distance from another UE, the UE may provide various useful services. As one example, if the UE may determine a distance from UE of another user registered as a friend of a user, when the corresponding friend is positioned within a predetermined distance, the UE may provide a service that announces the fact to the user to determine who is a friend positioned close to the user. As another example, when multiple UEs transmit a message such as the advertisement, the user may enable an operation that configures only an advertisement message which is present within a predetermined distance from the UE of the user to be received. As yet another example, the UE may provide a service that observes whether UE registered as an interest target therein is present within a predetermined area therefrom or a distance therefrom and announces whether the UE registered as an interest target therein is present within a predetermined area therefrom or the distance therefrom to the user.

A technology that determines positional information of the UE in the wireless communication system includes a series of technologies in which the UE receives the signal transmitted by the eNB and determines the position thereof based on the received signal.

In the technology, the UE measures an arrival time of a transmitted signal from each eNB with respect to a plurality of eNBs by measuring the signal (a positioning reference signal (PRS)) transmitted by the eNB or a difference between arrival times of transmitted signals from two eNBs to determine the position of the UE.

When a more detailed principle is described, when the UE measures the difference between the arrival times of the transmitted signals from two eNBs, the UE may determine a distance between distances from two corresponding eNBs. In addition, the distance between the distances from two eNBs may indicate that the UE is positioned at one point on a certain curve. When such a process is repeatedly applied even to two other eNBs, various curves at which the UE may be positioned and it may be determined that the UE is positioned at a point where the curves meet.

When the positional information of the eNB which is measured by the UE is actually required for such an operation and when the UE reports the arrival time of the transmitted signal from the eNB or the difference between the arrival times of the transmitted signals from two eNBs, which are described above to the network, the network has already known which eNB is positioned and where the eNB is positioned, the network may determine the position of the corresponding UE.

Another technology that determines the positional information of the UE in the wireless communication system includes a series of technologies in which the eNB receives the signal transmitted by the UE and the network determines the position of the corresponding UE based on the received signal.

In the technology, the UE transmits a specific signal (a sounding reference signal of the 3GPP LTE/LTE-A) and while the plurality of eNBs receives the transmitted signal, the arrival time of the transmitted signal from the UE or a difference between arrival times of transmitted signals in two eNBs from the UE is measured. Then, the network may calculate a distance from the UE in each eNB or a difference between distances from the corresponding UE in two eNBs based on the positional information of each eNB and determine a point where the operation is repeatedly commonly shown with respect to various eNBs as a point where the corresponding UE is positioned.

However, the aforementioned operations for measuring the position of the UE in the related art may be inappropriate to be widely used when one UE intends to determine the position of another specific UE. First, since the network finally determines the position of the UE in both schemes, if specific UE intends to use the positional information of another UE, the network needs to measure the position through a series of operations with UE as a target of which the position is measured and thereafter, transfer the corresponding information to UE which desires the measured position. During such a process, signaling overhead occurs between the network and the UE and when the number of UEs significantly increases, calculation complexity for the network to calculate the position of every UE significantly increases. In particular, when the information desired by the UE corresponds to an accurate position of the target UE but partial information such as the distance from the UE, there is a high possibility that the signaling overhead or the calculation complexity will acts as unnecessary cost.

In order to solve the problem, the present invention proposes a scheme that measures the positions of the UEs and the distance between the UEs, which minimizes the signaling overhead and the calculation complexity from the viewpoint of the network by transmitting/receiving the direct D2D channel/signal (e.g., the PDSCH, the PSBCH, the D2D synchronization signal, the D2D reference signal, and the like) between the UE and the UE.

Hereinafter, in the present invention, it is assumed that each UE transmits a signal announcing presence thereof according to a predetermined rule. For example, the signal may correspond to the discovery signal/message (that is, the PSDCH), the D2D synchronization signal, a D2D broadcast channel (that is, the PSBCH), the D2D reference signal, and the like and hereinafter, the signals will be collectively called and described as the discovery signal (DS).

UE that receives a specific DS according to a rule of DS transmission is designed to determine who the UE transmitting the DS is. As one example, the DS may include the identity information of the transmitting UE.

Herein, the DS transmission rule includes a method in which each UE generates the DS and a method for generating the time/frequency resource that transmits the DS described as above.

The network may operate to allow UEs that participate in DS transmission/reception to determine the rule by transmitting (e.g., a broadcast scheme) the DS transmission rule through the system information (e.g., a master information block (MIB) or the system information block (SIB)) or the high layer signal such as the RRC signaling.

In the present invention, the UE assumes that the eNB which becomes a criterion for determining a transmission time is present at the time of transmitting the DS. This is referred to as DS reference eNB.

The UE may have a plurality of DS reference eNBs. For example, the UE may operate to transmit the DS with eNB1 as the DS reference eNB at time 1 and transmit the DS with eNB1 as the DS reference eNB at time 2.

Hereinafter, in the specification, UE that intends to measure the position of another UE by receiving the DS will be named as 'operation UE' and UE of which position the operation UE intends to measure will be referred to as 'target UE'. That is, the operation UE measures the DS transmitted by the target UE to measure the position of the target UE or a distance between the operation UE and the target UE.

FIG. 18 is a diagram for describing a spread delay between UEs according to an embodiment of the present invention.

FIG. 18 illustrates the time when the target UE transmits the DS and the time when the operation UE receives the DS.

When $eNB_n$ is given as the DS reference eNB, the target UE determines a transmission time of the DS from a time when the target UE receives a DL subframe boundary of the $eNB_n$.

When the $eNB_n$ transmits the DL subframe boundary at a time $t_n$ and a propagation delay between the $eNB_n$ and the target UE is $k_n$, a time when the target UE receives the DL subframe boundary of the $eNB_n$ becomes '$t_n+k_n$'.

At this time, the target UE transmits the DS thereof at a time earlier by a time as long as $F_n$ and the $F_n$ value may be a pre-fixed value or given by an indication of the eNB. If the $F_n$ value is pre-fixed, the $F_n$ value may be fixed as the same value with respect to all DS reference eNBs.

A time when a signal which the target UE transmits at a time '$t_n+k_n-F_n$' reaches the operation UE through the propagation delay 'x' between the target UE and the operation UE may be expressed as shown in Equation 1 given below.

$$u_n = t_n + k_n - F_n + x \qquad \text{[Equation 1]}$$

A propagation delay between DS reference $eNB_n$ and the operation UE is assumed as $d_n$.

Hereinafter, a method for acquiring an upperlimit and a lowerlimit of the distance between the operation UE and the target UE when the DS is transmitted by the aforementioned process will be described.

FIGS. 19 and 20 are diagrams for describing a method of measuring a distance between operating UE and target UE by using a D2D signal/channel according to an embodiment of the present invention.

First, in the case of $x \le d_n$, an area where the target UE may be positioned is illustrated in FIG. 19.

A maximum value and a minimum value of the time when the operation UE receives the DS of the target UE are shown in target UE position 1 1901 and target UE position 2 1902, respectively.

When the target UE is positioned at position 1 1901, the time when the operation UE receives the DS of the target UE may be shown in Equation 2 given below.

$$u_n \leq t_n + d_n + x - F_n + x = t_n + d_n - F_n + 2x \quad \text{[Equation 2]}$$

That is, when $k_n = d_n + x$ is applied to Equation 1 given above, a result shown in Equation 2 is derived.

Herein, a condition of $x \geq (u_n + F_n - t_n - d_n)/2$ is acquired.

Further, when the target UE is positioned at position 2 1902, the time when the operation UE receives the DS of the target UE may be shown in Equation 3 given below.

$$u_n \geq t_n + d_n - x - F_n + x = t_n + d_n - F_n \quad \text{[Equation 3]}$$

That is, when $k_n = d_n - x$ is applied to Equation 1 given above, a result shown in Equation 3 is derived.

When the target UE is positioned at position 2 1902, the time when the operation UE receives the DS of the target UE acquires a condition regardless of x.

Meanwhile, in the case of $x > d_n$, the area where the target UE may be positioned is illustrated in FIG. 20.

The maximum value and the minimum value of the time when the operation UE receives the DS of the target UE are shown in target UE position 1 2001 and target UE position 2 2002, respectively.

When the target UE is positioned at position 1 2001, the time when the operation UE receives the DS of the target UE may be shown in Equation 4 given below.

$$u_n \leq t_n + d_n + x - F_n + x = t_n + d_n - F_n + 2x \quad \text{[Equation 4]}$$

That is, when $k_n = d_n + x$ is applied to Equation 1 given above, a result shown in Equation 4 is derived.

In this case, the same condition as the case of Equation given above is acquired.

Further, when the target UE is positioned at position 2 2002, the time when the operation UE receives the DS of the target UE may be shown in Equation 5 given below.

$$u_n \geq t_n + x - d_n - F_n + x = t_n - d_n - F_n + 2x \quad \text{[Equation 5]}$$

That is, when $k_n = d_n - x$ is applied to Equation 1 given above, a result shown in Equation 5 is derived.

Herein, a condition of $x \leq (u_n + F_n - t_n + d_n)/2$ is acquired.

When the above calculated result is summarized, the propagation delay 'x' between the operation UE and the target UE satisfies a condition shown in Equation 6 given below.

$$\frac{u_n + F_n - (t_n + d_n)}{2} \leq x \leq \frac{u_n + F_n - (t_n - d_n)}{2} \quad \text{[Equation 6]}$$

In Equation 6, since '$u_n$' is the time when the operation UE receives the DS transmitted by the target UE, '$u_n$' may be measured by the operation UE.

Since '$t_n + d_n$' is the time when the operation UE receives the downlink subframe boundary of the eNB$_n$, '$t_n + d_n$' may be measured.

If $F_n$ is a predetermined value, $F_n$ is a value which the operation UE has already known or if $F_n$ is a value indicated by the eNB, the eNB may transfer the value or the target UE may directly announce the value to the operation UE. For example, $F_n$ may be transferred by using a partial field of the DS.

The operation UE determines $d_n$ based on a measurement value of '$t_n + d_n$' to calculate '$t_n - d_n$'. For example, the operation UE may attempt a random access to the DS reference eNB$_n$ and in this case, a timing advance value announced by the eNB$_n$ may be regarded as a round trip delay with the operation UE and the eNB$_n$, that is, $2 \ast d_n$. Further, the operation UE may acquire $d_n$ from a signal (e.g., a cell reference signal (CRS), a demodulation reference signal (DMRS), a channel state information-RS (CSI-RS), a PRS, and the like) transmitted by the DS reference eNB.

According to the aforementioned operation, the operation UE may determine the upperlimit and the lowerlimit for the propagation delay 'x' with the target UE. Since the determined upperlimit and lowerlimit have different values with respect to different DS reference eNBs, the operation UE first calculates the upperlimit and the lowerlimit of x with respect to each DS reference eNB and thereafter, sets an intersection for areas of a plurality of calculated x to narrow a range of the area where x is present.

When information on the propagation delay 'x' with the operation UE and the target UE is acquired, the information is multiplied by a progress speed of an electromagnetic wave to be converted into the distance between the operation UE and the target UE.

Hereinafter, a method for measuring the position of the target UE by using the positional information of the DS reference eNB and the DS receiving time will be described.

FIGS. 21 to 24 are diagrams for describing a method of measuring a position of the target UE by using the D2D signal/channel according to an embodiment of the present invention.

As described in FIG. 18 as above, since $u_n = t_n + k_n - F_n + x$ is given, the case where the operation UE receives the DSs transmitted by the target UE is received at the same time at two different points means, that is to say, that '$k_n + x$'s calculated from two points have the same value (since $t_n$ and $F_n$ are constant). Herein, since '$k_n + x$' means the spread delay of the signal which reaches the operation UE from the DS reference eNB$_n$ through the target UE, the position of the target UE which makes the same $u_n$ shows an oval shape having the positions of the DS reference eNB$_n$ and the operation UE as a focus as illustrated in FIG. 21.

That is, when the operation UE measures $u_n$ and calculates $k_n + x$ based on the measured $u_n$, the operation UE may find that one oval is formed and the target UE is positioned at any point on the corresponding oval.

In FIG. 22, it may be determined that the ovals are formed with respect to two DS reference eNBs and the target UE may be present at positions 2201 and 2202 corresponding to intersection points of two ovals according to a principle described in FIG. 21.

In addition, FIG. 23 corresponds to a case where the operation is repeated with respect to three DS reference eNBs. Since an intersection point of three ovals is expressed as a single point 2301, the position of the target UE may be fixed as one.

In FIGS. 22 and 23, $a_{nm}$ represents a distance between DS reference eNB$_n$ and eNB$_m$.

As described above, the oval where the target UE may be positioned is formed with respect to two or more DS reference eNBs, and as a result, the operation UE requires information on the position of each DS reference eNB in order to determine the position of the target UE. The network may transmit the information on the position of each DS reference eNB to the UE through the system information (e.g., the master information block (MIB) or the system information block (SIB) or the high layer signal such as the RRC signaling, or the like (e.g., a broadcast scheme) and announce the information to the UE in advance.

The positional information of the DS reference eNB may be expressed as a form of an absolute coordinate such as a longitude and a latitude of each eNB and in this case, the operation UE may determine the absolute coordinate of the target UE by applying the described principle.

On the contrary, when not the position of the target UE but the distance between the target UE and the operation UE is measured, the absolute coordinate of the DS reference eNB is not required but only a relative position is required. In this case, for example, only information on a distance between the DS reference eNBs may be provided to the operation UE.

Referring to FIG. 23, when the target UE acquires information on the distance ($a_{nm}$) between the DS reference $eNB_n$ and the $eNB_m$, the relative position of the respective eNBs may be determined and the relative position of the operation UE may also be determined by applying the principle based on the relative position of the respective eNBs.

The operation UE needs to determine the distance from each DS reference eNB even by such a scheme and the distance may be determined from the timing advance value acquired during the random access process as described above. Further, the operation UE may acquire $d_n$ from the signal (e.g., the CRS, the DMRS, the CSI-RS, the PRS, and the like) transmitted by each DS reference eNB.

Meanwhile, when the operation UE may find the distance between the target UE and the DS reference eNB, the distance also assists measuring the distance from the target UE or determining the position of the target UE.

For example, it is assumed that the network announces a distance between the target UE and specific DS reference eNB to the operation UE or the target UE announces the distance between the target UE and the specific DS reference eNB to the operation UE by using the D2D signal (e.g., by using some bits of the DS).

In this case, the operation UE may determine a candidate position of the target UE from the DS transmitted by the target UE based on the corresponding DS reference eNB according to the principle described in FIG. 21 given above and herein, a circle corresponding to the distance between the corresponding DS reference eNB and the target UE is added to the determined candidate position as illustrated in FIG. 24 to reduce the candidate position of the target UE.

Hereinafter, a method for measuring the position of the target UE or the distance from the target UE by using a difference in reception time of the DS signal will be described.

FIGS. 25 and 26 are diagrams for describing a method of measuring the position of the target UE or the distance from the target UE by using the D2D signal/channel according to an embodiment of the present invention.

Since $u_n = t_n + k_n - F_n + x$ is given as described in FIG. 18, if the operation UE measures $u_n$ and $u_m$ with respect to the DSs which the target UE transmits based on $eNB_n$ and $eNB_m$ which are two DS reference eNBs, respectively, distances between the target UE and two DS reference eNBs may be determined due to a difference between two values.

In more detail, the difference between $u_n$ and $u_m$ becomes $u_n - u_m = t_n - t_m + k_n - k_m - F_n + F_m$ and herein, the distance x between the target UE and the operation UE which is a common element disappears.

As described above, the operation UE determines $F_n$ and $F_m$ or for easy operation, two values may be similarly described and in this case, two components disappear.

Information on $t_n$ and $t_m$ may be derived from time information (e.g., the radio frame and subframe indexes) when the target UE transmits the DS based on each DS reference eNB and it may be assumed that the DS reference eNB is synchronized by a time unit (e.g., the unit of 1 ms configuring the subframe) at a predetermined level or less.

That is, assumed that two DS reference eNBs are synchronized by the unit of 1 ms, the operation UE may assume that the DL subframe boundaries transmitted by two DS reference eNBs correspond to the same time.

According to the operation, the operation UE may calculate $k_n - k_m$ corresponding to the difference in distance between the target UE and the DS reference eNB from $u_n - u_m$.

A curve representing a candidate area where the target UE may be positioned may be formed based no the positional information of two DS reference eNBs as illustrated in FIG. 25 based on $k_n - k_m$. That is, the curve is represented by a set of points where the difference between the distances from two DS reference eNBs is constantly given.

When the operation is performed with respect to a combination of two other eNBs, another curve may be formed and an intersection point of two curves becomes the position of the target UE. FIG. 26 corresponds to a case where the operation is additionally performed with respect to eNB2 and eNB3.

Similarly eve in the scheme, the operation UE needs to determine the distance from each DS reference eNB and the distance may be determined from the timing advance value acquired during the random access process as described above. Further, the operation UE may acquire $d_n$ from the signal (e.g., the CRS, the DMRS, the CSI-RS, the PRS, and the like) transmitted by each DS reference eNB.

D2D UE Group Managing Method

The present invention proposes a method for efficiently maintaining or managing the group as a plurality of D2D UEs forms the group and manages group members based on specific D2D UE (e.g., a group leader) in the corresponding D2D group to transmit and receive an appropriate message for separation from the group and a service using the same. That is, the present invention proposes a technology that determines the positions of the respective group members by using the D2D signals including the D2D discovery signal (that is, the PSDCH), the D2D control channel (that is, the PSCCH), the D2D data channel (that is, the PSSCH), the D2D broadcast channel (that is, the PSBCH), the D2D synchronization signal, and the like and manages the group and a service to which the technology may be applied.

For example, it is assumed that a teacher (a group representative, a group leader, and the like) performs outdoor activities together with students (group members except for the teacher). It is assumed that if necessary, the leader in the group may become anyone of the members in the group and changed as necessary and the outdoor activities include inside/outside activities and the group members may perform activities anywhere simultaneously indoors and outdoors. In this case, the teacher may continuously verify the positions of the students, bidirectionally communicate with the students in real time, and announce a range deviation warning to a counterpart. This will be described in more detail with reference to drawings given below.

Herein, in describing the present invention, even though detailed description of the method for transmitting the D2D discovery signal (that is, the PSDCH) or the D2D direct communication data is not mentioned, the aforementioned transmission method (in particular, the method according to FIGS. 11 to 16) may be similarly applied.

Further, in the specification, a D2D identifier (ID) may be an ID for distinguishing the D2D UE, an ID for distinguishing a specific application program of the UE, or all temporary allocated IDs valid only for a designated time.

FIG. 27 illustrates a user interface for implementing a D2D terminal group managing method according to an embodiment of the present invention.

FIG. 27(a) illustrates, a user interface for a group representative UE (UE A, e.g., a teacher's UE), a step of generating multiple UEs (e.g., UEs of high school students) stored in a contact history of UE A as the group and the group which may receive the D2D service. FIG. 27 illustrates a case in which group 1 and group 2 are stored in the contact history of UE A and group 2 is selected.

Further, the group may be generated by searching a name of a person (UEs B, C, D, E, F, and the like in FIG. 27) in contacts not stored as the group in order to add the member to the D2D group or directly receiving phone numbers not stored in the contact history of UE A from the user.

As such, the D2D group may be generated in UE A itself without approval (alternatively, permission) to the member which belongs to the corresponding group when the group is generated in UE A.

Further, contrary to this, a group request message for requesting the approval (alternatively, permission) may be transmitted to the member (e.g., UEs B, C, D, E, F, and the like) which belongs to the corresponding group when the group is generated in UE A. In addition, only UE that transmits a group response message as a response to the group request message may become the member of the D2D group generated in UE A.

When the generation of the D2D group is completed, positions 2702, 2705*a*, 2705*b*, and 2705*c* of UEs which belong to the corresponding D2D group are displayed and tracked together with a position 2701 of UE A in UE A in real time as illustrated in FIG. 27(*b*). Further, not the positions 2702, 2705*a*, 2705*b*, and 2705*c* of the UEs which belong to the D2D group but distances from UE A based on the position 2701 of UE A may be displayed.

Herein, the position 2701 of UE A, the positions 2702, 2705*a*, 2705*b*, and 2705*c* of the UEs which belong to the D2D group, or the distances between UE A and the UEs which belong to the D2D group may be derived by using the methods described in FIGS. 17 to 26 given above. Further, the position 2701 of UE A, the positions 2702, 2705*a*, 2705*b*, and 2705*c* of the UEs which belong to the D2D group, or the distances between UE A and the UEs which belong to the D2D group may be obtained by using a global positioning system (GPS).

Boundaries 2703 and 2704 representing a predetermined range may be configured based on the position of UE A and a plurality of boundaries may be configured according to purposes thereof. FIG. 27 illustrates a case where two boundaries are configured.

Herein, boundary 2 2704 may be configured as a maximum distance (e.g., 1 km) which may be covered by using the D2D technology or configured by a specific distance (e.g., 600 m) determined by the user (e.g., the teacher) of UE A. Further, boundary 1 2703 may be configured as a boundary of a specific area from which the group members should not deviate due to safety of the group members or specific other reasons. This case means a state (an excessive area to receive a warning message) in which group members (that is, B 2705*a*, C 2705*b*, and 2705*c*) positioned between boundary 1 2703 and boundary 2 2704 are positioned out of coverage desired (that is, configured) by UE A. As illustrated in FIG. 27(*b*), UE A may automatically/manually transmit a warning to the group members (that is, B 2705*a*, C 2705*b*, and D 2705*c*) which deviate from a predetermined area.

FIG. 27(*c*) illustrates a UI/user experience (UX) for UE B that receives the warning message or a notification message from UE A by using the D2D technology when UE B deviates from predetermined coverage. For example, UE A may transmit the warning message or notification message to UE B through the discovery message (that is, the PSDCH) or PSSCH.

Further, various services associated with the next action may be immediately connected together with the warning/notification message indicating that UE B deviates from the predetermined coverage. For example, a call may be connected from UE B to UE A, a text message (e.g., including positional information of UE B) is transmitted, or a path finding service from the position of UE B to UE A may be provided. Herein, a phone call/short message service (SNS) to UE A may be supported through the D2D communication (e.g., using the PSSCH) or a cellular network. The path finding service may also be supported through the D2D communication (e.g., using the PSSCH) or the cellular network and the path finding service may support UE B to go to the position where UE A is positioned by using a map, and the like.

In FIG. 27, a scenario in the open air is a representative example, but a scenario in which both the inside and outside activities are performed like a shopping mall may also be considered. In this case, when representative group UE or member UEs which belong to the group are positioned indoors, it is difficult to know an accurate distance by using the GPS and when an indoor position based service (LBS) such as a wireless local area network (WLAN), or the like is used, there is a difficulty in an accurate position of an access point (AP) needs to be secured in advance, and the like. In this case, the position measuring technology using the D2D discovery message, and the like, which is described in FIGS. 17 to 26 as above enables effectively securing the positional information of the UEs under any situation regardless of the inside/the outside based on stability which a cellular technology guarantees.

Which flow a related signal has in order to support the service of FIG. 27 will be described with reference to FIG. 27 given below.

FIG. 28 is a diagram illustrating a D2D terminal group managing method according to an embodiment of the present invention.

Although not illustrated in FIG. 28, it is assumed that all group member UEs form a specific group like the example of FIG. 27 based on the D2D ID or another membership service in advance. Further, it is assumed that all UEs periodically or aperiodically broadcasts the D2D signal (e.g., the D2D discovery signal).

First, case 1 is described. In case 1, it is assumed that UE A is the representative group UE.

When a specific UE A user of the corresponding group needs to determine the positions of the group members while performing a personal activity, UE A executes an application by receiving an input from the user (S2801).

UE A receives the discovery signal periodically or aperiodically broadcasted from the group member UEs (e.g., a smart phone and a wearable device) positioned within D2D coverage (S2802).

As described above, the D2D UE periodically or aperiodically broadcasts the discovery signal. Therefore, in FIG. 28, it is illustrated that step S2802 is performed after step S2801 for easy description, but UE A continuously receives the discovery signal from the group member UE regardless of execution of the application (that is, regardless of step S2801).

Further, UE A continuously receives the discovery signal from adjacent D2D UE regardless of generation of the group. However, UE A may identify the discovery signal transmitted from the group member UE based on the UE identity ID (alternatively, the D2D ID) included in the discovery signal after the group is generated.

Further, although not illustrated in FIG. 28, UE A also periodically or aperiodically broadcasts the discovery signal.

In this case, UE A may calculate the distance between UE A and the group member UE or the position of the group member UE by using the methods described in FIGS. 17 to 26 given above based on the discovery signal received from the group member UE.

Further, the positions of the group member UEs including UE A may be displayed on the map like the example of FIG. 27(*b*) given above in order to conveniently support the UX.

As such, in order to display the positions of the group member UEs on the map, UE A transmits a map transmission request message to a map server (S2803) and receives map information from the map server (S2804).

In addition, UE A displays the map by using the received map information and displays the position of the group member UE on the map (S2805).

Herein, the map server may correspond to a communication operator or a service provider. As a result, UE A may display the received map information and display the positions of the group members or the distance between UE A and the group member UE on the map.

Meanwhile, UE A may store the map in advance. In this case, steps S2803 and S2804 in which UE A requests and receives the map information from the map server may be omitted.

Next, case 2 is described.

UE A may transmit/receive the D2D data to/from one or more group member UEs (S2806) and perform the D2D direct communication with any one group member UE (S2807).

One example of the D2D direct communication may correspond to 1:1 communication (the SNS, the phone call, a video call, and the like) or group communication (the SNS, the phone call, the video call, and the like) with a plurality of group member UEs and packets of data of the service are transmitted/received through the D2D communication process.

Herein, although not illustrated in FIG. 28, UE A may be allocated with the resource (that is, the PSSCH resource) for transmitting the D2D data to the base station according to the procedure of FIG. 16 given above and perform the D2D communication with any one group member UE by using the allocated resource in order to transmit the D2D data to the group member UE.

Further, UE A may perform the resource allocation procedure like the example of FIG. 10 given above in order to request the resource allocation for transmitting the D2D data. However, since this case is a case where UE A requests allocating not the PUSCH resource but the PSSCH resource, the PUCCH resource index (that is, the combination of the PRB in which the SR is transmitted, the cyclic shift (CS) applied to the basic sequence (e.g., the ZC sequence) for the frequency domain spread of the SR, and the orthogonal code (OC) for the time domain spread of the SR) distinguished from the SR for requesting the PUSCH resource may be used.

Next, case 3 is described. In case 3, it is assumed that UE A is any one member UE among a plurality of group members.

Case 3 is a case where a coverage warning message is received just before UE A deviates from the representative group UE (e.g., the group leader) when UE A deviates from designated coverage as illustrated in FIG. 27 given above.

As described above, UE A periodically or aperiodically broadcasts the discovery signal (S2808).

The representative group UE may calculate the distance between the representative group UE and the group member UE (including UE A) or the position of the group member UE (including UE A) by using the methods described in FIGS. 17 to 26 given above based on the discovery signal received from the group member UE (including UE A).

When the distance between the representative group UE and the group member UE (including UE A) increases by a predetermined distance or the position of the group member UE (including UE A) deviates from predetermined coverage, the representative group UE transmits the warning message (alternatively, the notification message) by using the D2D communication (S2809).

The representative group UE may be allocated with the resource (that is, the PSSCH resource) for transmitting the D2D data to the base station according to the procedure of FIG. 16 and perform the D2D communication with any one group member UE by using the allocated resource, as described above in order to transmit the D2D data to the group member UE (including UE A). That is, the representative group UE is allocated with the PSSCH resource by receiving the D2D grant and transmits the warning message through the PSSCH resource.

When UE A receives the warning message (alternatively, the notification message) from the representative group UE, UE A displays the received warning message (alternatively, the notification message) on a screen (S2810).

Additionally, when UE A uses the map service in order to go to the position of the representative group UE, verify the position of UE A, or return into predetermined coverage, UE A may transmit the map transmission request message to the map server (S2811) and receive the map information from the map server (S2812).

In addition, UE A may display the position of the representative group UE or the position of UE A on the received map or display a path for guiding to the position of the representative group UE or the predetermined coverage.

In this case, UE A may calculate the distance between UE A and the representative group UE or the position of the representative group UE by using the methods described in FIGS. 17 to 26 given above based on the discovery signal received from the representative group UE. Further, the representative group UE may transmit the position thereof or predetermined coverage information to UE A in step S2809 given above.

Among the procedures of case 1 to case 3 described above, any one procedure may be independently performed or one or more procedures may be simultaneously performed. Further, one or more procedures may be sequentially performed temporally regardless of an order.

Meanwhile, assumed that a criterion for displaying the position of the group member UE moves, in this case, coverage for the group member UE itself continuously moves. For example, a case in which the representative group UE (e.g., the teacher) is not continuously positioned somewhere in the middle but the representative group UE moves together with the group member UE (e.g., the student) is the example. In this case, the same method as above may be implemented based on a fixed D2D beacon device.

FIG. 29 is a diagram illustrating a D2D terminal group managing method according to an embodiment of the present invention.

Referring to FIG. 29, D2D beacon devices 2910, 2920, and 2930 are fixedly positioned in advance and positions of the respective D2D beacon devices 2910, 2920, and 2930 may be provided to the respective D2D UEs in advance.

Herein, in the specification, the D2D beacon device means a device that periodically or aperiodically transmits the D2D signal while being present at a fixed position.

For example, the D2D beacon device is fixed in places of a famous tourist site to transfer information on each position to the D2D UE or predict even an environment in which each D2D beacon device is installed at a street lamp.

The group member UEs including the representative group UE register the D2D IDs based on a fixed D2D beacon device (e.g., D2D beacon 3 of FIG. 26) which becomes a criterion to generate the group.

In this case, the D2D ID may be registered as two types. Type 1 D2D ID represents the representative group UE (e.g., UE A) 2901 and the other one as Type 2 D2D ID represents group member UEs 2902 other than the representative group UE. Herein, according to a use environment, the number of types may be two or more.

Each UE (that is, type 1 UE and type 2 UE) may display the positions of the group member UEs (including the representative group UE) on the screen based on the D2D beacon device.

In this case, since each UE knows the position of the D2D beacon device in advance, each UE may acquire the position thereof by using a mobile communication network or using a known technology such as the global positioning system (GPS), or the like and display the positions of the group member UEs (including the representative group UE) on the screen based on the D2D beacon device.

Further, the distance from the D2D beacon device may be calculated and the positions of the group member UEs (including the representative group UE) on the screen based on the D2D beacon device by using the methods described in FIGS. 17 to 26 given above with the discovery signal broadcasted from the D2D beacon device.

Boundaries 2903 and 2904 representing a predetermined coverage may be configured based on the position of the fixed D2D beacon device and a plurality of boundaries may be configured according to purposes thereof. FIG. 29 illustrates a case where two boundaries are configured.

Herein, boundary 2 2904 may be configured as the maximum distance (e.g., 1 km) which may be covered by using the D2D technology or configured by the specific distance (e.g., 600 m) determined by the user (e.g., the teacher) of Type 1 UE. Further, boundary 1 2903 may be configured as a boundary of a specific area from which the group members should not deviate due to safety of the group members or specific other reasons. This case means a state (an excessive area to receive a warning message) in which a group member (that is, B 2905) positioned between boundary 1 2903 and boundary 2 2904 are positioned out of coverage desired (that is, configured) by Type 1 UE.

Figure 31:
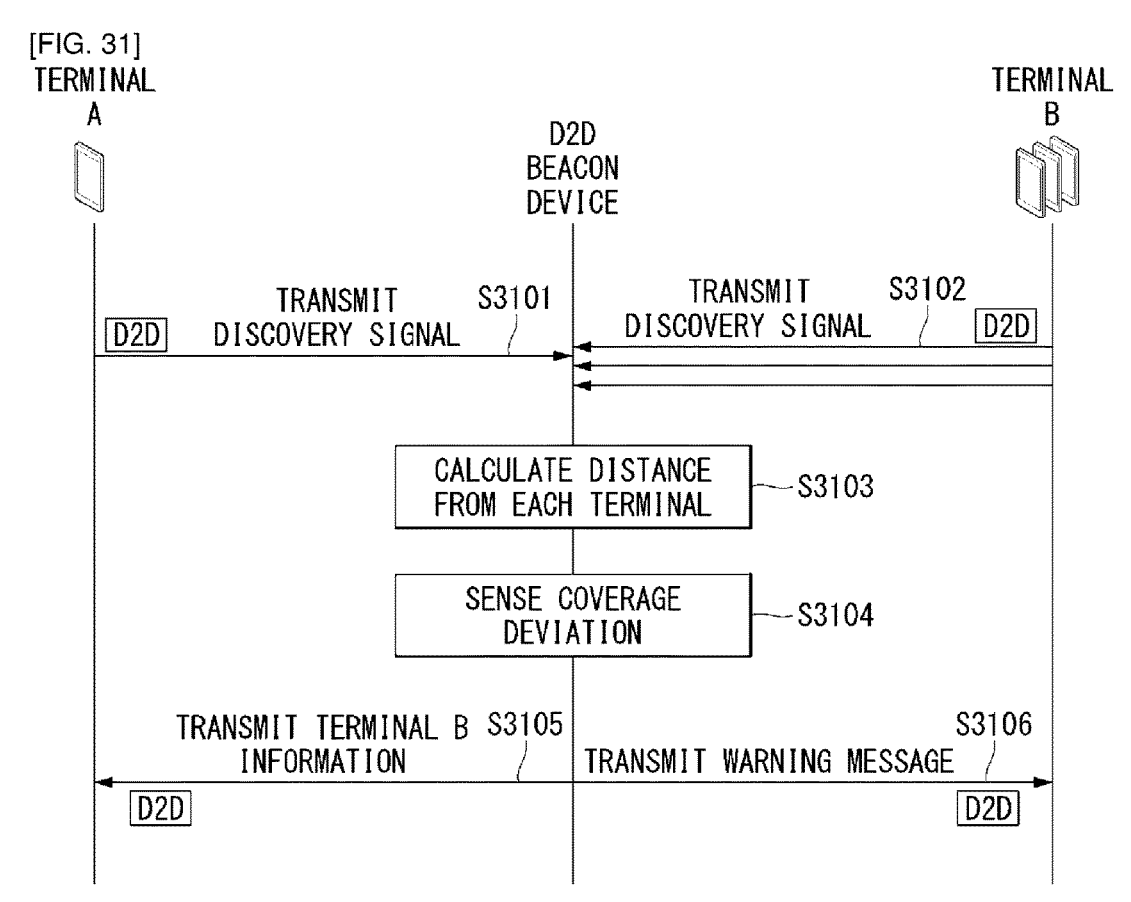

Which flow a related signal has in order to support the service of FIG. 29 will be described with reference to FIGS. 30 and 31 given below.

FIG. 30 is a diagram illustrating a D2D terminal group managing method according to an embodiment of the present invention.

Referring to FIG. 30, the D2D beacon device periodically or aperiodically broadcasts the discovery signal (S3001).

UE (UE A) having Type 1 D2D ID and UE (UE B) having Type 2 D2D ID calculate the distances from the D2D beacon device based on the discovery signal broadcasted from the D2D beacon device (S3001 and S3003). That is, each UE calculates the distance from the D2D beacon device by using the methods described in FIGS. 17 to 26 given above.

Further, as described above, since each UE knows the position of the D2D beacon device, each UE may obtain the position thereof by using the mobile communication network or using the known technology such as the global positioning system (GPS), or the like and calculate the distance from the D2D beacon device.

Continuously, when it is sensed that UE B deviates from the coverage (boundary 1 2903 of FIG. 29) of the specific area (that is, just before or just after UE B deviates from the coverage) while calculating the distance from the D2D beacon device (S3004), UE B autonomously displays the warning message/notification message to warn the user of UE B (S3005).

Additionally, a fact that UE B deviates from the coverage, that is, information on UE B may be transmitted to UE A through the D2D data channel (S3006). Herein, the information on UE B may include an identity of UE B and indication information for notifying that UE B deviates from the coverage.

Herein, although not illustrated in FIG. 30, UE B may be allocated with the D2D data channel resource (that is, the PSSCH resource) to the base station in order to transmit the information on UE B to UE A through the D2D channel and transmit the D2D data (that is, the information on UE B) to UE A by using the allocated D2D data channel resource. Further, UE B may perform the SNS, the phone call, the video call, and the like with UE A while performing the D2D direct communication.

In addition, although not illustrated in FIG. 30, additionally, when UE B uses the map service in order to go to the position of the representative group UE (that is, UE A), verify the position of UE B, or return into predetermined coverage, UE B may transmit the map transmission request message to the map server and receive the map information from the map server. In addition, UE B may display the position of the representative group UE or the position of UE B on the received map or display a path for guiding to the position of the representative group UE or the predetermined coverage.

FIG. 31 is a diagram illustrating a D2D terminal group managing method according to an embodiment of the present invention.

Referring to FIG. 31, UE (UE A) having Type 1 D2D ID and UE (UE B) having Type 2 D2D ID broadcast the discovery signal (S3101 and S3102).

The D2D beacon device calculates the distance from each UE based on the discovery signals broadcasted from UE A and UE B (S3103). That is, each D2D beacon device calculates the distance from each UE by using the methods described in FIGS. 17 to 26 given above.

Continuously, when it is sensed that UE B deviates from the coverage (boundary 1 2903 of FIG. 29) of the specific area (that is, just before or just after UE B deviates from the coverage) while calculating the distance from the D2D beacon device (S3104), the D2D beacon device notifies the information on UE B to UE A through the D2D data channel (that is, the PSSCH) (S3105). Herein, the information on UE B may include the identity of UE B and the indication information for notifying that UE B deviates from the coverage.

Further, simultaneously therewith, the D2D beacon device transmits the warning message (alternatively, the notification message) for notifying that UE B deviates from the coverage through the D2D data channel (that is, the PSSCH) (S3106).

Herein, although not illustrated in FIG. 31, the D2D beacon device may be allocated with the D2D data channel resource (that is, the PSSCH resource) to the base station in order to transmit the information on UE B and the warning message to UE A and UE B through the D2D channel and transmit the D2D data (that is, the information on UE B) to UE A by using the allocated D2D data channel resource and simultaneously therewith, the D2D beacon device may transmit the D2D data (that is, the warning message) to UE B.

Meanwhile, a method is described, which represents by which path the group member UE which deviates from the coverage accesses another group member UE or maintains the corresponding UE group on a communication protocol when the group member UE deviates from predetermined coverage while performing a group activity.

Herein, the predetermined coverage may be configured as the maximum distance (e.g., 1 km) which may be covered by using the D2D technology or configured by the specific distance (e.g., 600 m) determined by the user (e.g., the teacher) of the representative group UE. Further, the predetermined coverage may be configured as a boundary of a specific area from which the group members should not deviate due to safety of the group members or specific other reasons.

FIG. 32 is a diagram illustrating a D2D group managing method according to an embodiment of the present invention.

In FIG. 32, it is assumed that one D2D group is generated and the corresponding group member is UE 1 to UE 5. However, it is assumed that UE 1 deviates from the group and D2D connectivity even with UE 2 closest to UE 1 among the group members is impossible.

In this case, as one method for UE 1 to maintain the access to the group members UE 2 to UE 5, when UE 1 is in the RRC idle state, UE 1 attempts accessing the cellular network and establish RRC connection with one UE among the group member UEs.

In FIG. 32, since only UE 3 is in an RRC connected mode, UE 3 may become anchor UE for communication between UE 4 and the group. However, if another member UE which is in the RRC connected state is present other than UE 3 among the group member UEs, the anchor UE may be selected by using an appropriate criterion.

As one example, UE which may make all individual connections of the group members or UE which may make most connections may be selected as the anchor UE by considering a distribution state of the group members. In this case, the 1:1 connection is not actually made but parameters (e.g., reference signal received power (RSRP), a signal to noise ratio (SNR), a signal to interference plus noise ratio (SINR), and the like for the D2D direct link to be in advance is used to be used as the criterion for selecting the anchor UE. For example, each group member UE may periodically (alternatively, voluntarily (by UE trigger)) or aperiodically (alternatively, involuntarily (by base station trigger)) transmit a parameter for the discovery signal received from group member UE other therethan to the base station. The base station may select the anchor UE based on the parameter received from each group member UE.

As another method, UE 1 may select UE that transmits the synchronization signal as the anchor UE for connection with the group. In this case, the eNB may allow the corresponding UE to be in the RRC connected state and make the connection with UE 1. That is, the base station may select UE (that is, the D2D synchronization source or the sidelink synchronization source) that periodically transmits the D2D synchronization signal among the corresponding group member UEs as the anchor UE.

Alternatively, when a cluster head managing the group is present (e.g., UE that serves to transmit the beacon, broadcast primary information, and the like), the cluster head may be designated as group management anchor UE. For example, the base station may select UE that periodically transmits the PSBCH among the group member UEs as the anchor UE.

It should be construed that when UE 1 attempts communication by selecting target UE that intends to perform communication by making the RRC connection among the group member UEs during such a process, UE 1 attempts connection to a group to which the target UE belongs. In addition, it is meant that not destination UE (that is, the target UE) but group anchor UE may be connected during such a process. That is, UE 1 attempts a cellular access to UE 2, but the eNB may make UE 1 be connected to UE 3 by construing such a request. Herein, the connection may be a different procedure and a different state from a 1:1 cellular RRC connection. That is, since UE 1 intends to perform group communication with UE 2, UE 3, UE 4, and UE 5, even though UE 1 requests the communication with UE 2, the eNB configures a communication path with UE 3 and allows UE 3 and UE 2 to perform the communication by the D2D communication. That is, the anchor UE serves even as UE that relays the communication.

When UE 1 which is positioned out of the coverage needs to perform the group communication, all of UE 1 to UE 5 need to be in the RRC connected state in the case of the cellular communication in the related art and thereafter, the group communication is performed. In this case, the D2D group communication becomes actually meaningless. Therefore, when it is considered that the D2D group communication is made to be meaningful and the D2D communication is still performed, a scheme in which only one UE in the group makes the cellular connection is a preferable operation scheme. This will be described in more detail with reference to a drawing given below.

FIG. 33 is a diagram illustrating a D2D terminal group managing method according to an embodiment of the present invention.

In FIG. 33, it is assumed that the target UE (that is, the destination UE) with which UE 2 intends to communicate by making the RRC connection is UE 3 and the base station knows the D2D UE group in advance.

Further, it is assumed that UE 1 is selected as the anchor UE by the aforementioned method. In this case, the anchor UE may be selected by the base station or a rule which the base station and the group member UE share with each other, and the like may be selected.

Referring to FIG. 33, UE 2 transmits to the base station a group communication link setup request including the identity of UE 3 that intends to perform the group communication by making the RRC connection (S3302).

In this case, when UE 2 may be in the RRC_IDLE state, UE 2 is transitioned to the RRC_CONNECTED state according to the procedures of FIGS. 8 and 9 given above (S3301) and UE 2 may transmit the group communication link setup request message to the base station (S3302).

Since UE 1 is the anchor UE as described above, the base station transmits a group communication link setup message to UE 1 (S3303).

UE 1 transmits to the base station a link communication link setup response message as a response to the D2D link setup message (S3305).

In this case, when UE 1 may be in the RRC_IDLE state, UE 1 is transitioned to the RRC_CONNECTED state according to the procedures of FIGS. 8 and 9 given above (S3304) and UE 1 may transmit the group communication link setup response message to the base station (S3305).

UE 2 establishes (that is, cellular-connects) the group communication link with UE 1 through the base station.

Thereafter, UE 2 performs the group communication with one or more group member UEs through UE 1. In other words, when UE 2 transmits data to group 1 through the group communication link (that is, the cellular connection) in order to transmit the data to one or more group member UEs, UE 1 transmits the data of UE 2 to one or more group member UEs through the D2D direct communication, that is, the PSSCH. Further, the reverse thereto is possible.

FIG. 34 is a diagram illustrating a D2D group managing method according to an embodiment of the present invention.

FIG. 34 illustrates a case where corresponding UE deviates from coverage of UE that is present at the center of group A, but does not deviate from a group periphery, in particular, the coverage of UE 2 close to UE 1.

In this case, proposed is a method in which group A is normally operated and UE 2 continuously relays a packet of group A to support UE 1 to operate as a member of group A. That is, the D2D direct communication link is established between UE 1 and UE 2, UE 2 and the D2D direct communication link is established between the group members UE 3, UE 4, and UE 5), and UE 2 relays data between UE 1 and one or more group members UE 3, UE 4, and UE 5.

In this case, an additional cellular connection illustrated in FIGS. 32 and 33 need not be maintained. In the case where cellular coverage is not valid, an effect of extending the coverage of group A may be obtained. In such a group management, a technical reward or a monetary reward may be provided to the corresponding relay UE.

Proximity Based Notification Method

The present invention proposes a method for solving a technical problem required for implementing a proximity based notification service based on a UE-to-UE communication or beacon-UE direct communication technology. The UE-to-UE direct communication may be implemented by using methods including LTE D2D, WLAN, and Bluetooth. Hereinafter, in order to clearly describe the present invention, the D2D is primarily described, but a technical feature of the present invention is not limited thereto.

It is predicated that LTE D2D will have technical features given below.

Long range (service coverage)
High mobility (velocity)
Large Scalability (discovered/communication users)
Low Battery Consumption (synchronized operation)
High Reliability/Robustness (LTE technology based)
Small Delay (elapsed time for discovering)
High-level Security (privacy)
Small Latency (direct data delivery)
Connectionless communication (no radio link setup)
Pure interworking of Cellular and D2D by one LTE technology
Implemented within a single UE modem chip
One of LTE features in Rel-12 and later releases
Improved multi-hop synchronization and relaying
Evolved to Mesh Network Hereinafter, the proximity based notification method according to the present invention will be described.

In the proximity based notification method according to the present invention, for example, when participants a meeting have a prior consultation to detect mutual D2D IDs and thereafter, the D2D IDs of the participants are sensed from a promise time (e.g., 1 hour ago), the notification may be given. In addition, as subsequent consecutive operations, a call, a message, a map, and the like are provided. A service provided by applying the present invention may be called a bump into service. Hereinafter, in the specification, the service is called a notification service.

In the specification, a D2D identifier (ID) may be an ID for distinguishing the D2D UE, an ID for distinguishing a specific application program of the UE, or all temporary allocated IDs valid only for a designated time.

Herein, in describing the present invention, even though detailed description of the method for transmitting the D2D discovery signal (that is, the PSDCH) or the D2D direct communication data is not mentioned, the aforementioned transmission method (in particular, the method according to FIGS. 11 to 16) may be similarly applied.

FIG. 35 is a diagram illustrating a user interface (UI) for implementing a method of proximity-based notification according to an embodiment of the present invention.

FIG. 35 illustrates a process in which UE A (that is, host UE of the meeting) is allocated with the D2D IDs of the participants by using a schedule function (e.g., a calendar application).

When UE A executes the calendar application, the schedule function additionally supports a participant field 3501 and a notification field 3502 to allow a UE A user to easily use the notification service.

The participant field 3501 is a field for adding the participant (alternatively, participant UE) to which the proximity based notification is applied. UE A may be selected in address histories of participants (UE B, UE C, and UE D). For example, UE A may be selected by a phone number, an e-mail address, and the like of the participant.

The notification field 3502 is a field for setting a notification time and a notification method notifying that the participant UE is proximate.

In other words, the notification field 3502 is a field for setting a value associated with how far in advance (e.g., 1 hour ago, 30 minutes ago, 10 minutes ago, and the like) a schedule time a UE controller is automatically turned on so that UE A transmits the discovery signal for transferring the D2D ID. Further, the notification field 3502 is a field for setting the notification method (e.g., vibration and/or bell sound or whether a notification message is displayed on the screen, and the like).

When setting a schedule function is completed in UE A (for example, a storage button input is received from the user), a process of verifying whether the D2D ID may be shared to UE included in a participant list starts simultaneously therewith. That is, the UE A controller automatically transmits a message for querying a participation intention to each participant UE simultaneously when setting the schedule function is completed. For example, a text message is transmitted to each participant UE through a short message service (SMS) or other messenger applications to query whether to agree to using the notification service.

Hereinafter, the proximity based notification method will be described in more detail with reference to a drawing. Hereinafter, the proximity based notification method will be described by assuming that the number of participants is one for easy description in the drawing, but the present invention is not limited thereto and the number of participants UEs is not limited.

FIG. 36 is a diagram illustrating a method for proximity-based notification according to an embodiment of the present invention.

The proximity based notification method may be generally divided into a first step of setting the schedule function and being allocated with the D2D ID, a second step of displaying a proximate notification message, and a third step of returning the allocated D2D ID.

First, referring to the first step, UE A (that is, the host UE) sets the schedule function (e.g., the host UE) like the example of FIG. 35 given above (S3601). As described above, setting the schedule function includes setting the notification method when generating the participant UE that participates in the notification service and sensing that the participant UE is proximate. Further, setting the schedule function may further include setting information on a schedule time and a schedule place.

The UE A controller transmits a use agreement request message of the notification service to UE B (that is, the participant UE) (S3602).

UE B that receives the use agreement request message of the notification service from UE A may agree to or reject the request of UE A. For example, as described above, the use agreement request message of the notification service from UE A may be transmitted as the SMS or the message of the messenger application. In addition, UE B displays an agreement/rejection window together with the message transmitted from UE A and the agreement/rejection is determined according to a selection input of the UE B user.

In this case, when the UE B user rejects the request, a process is not performed any longer. In this case, although not illustrated in FIG. 36, UE B may transmit a response message indicating the rejection to UE A as a response to the use agreement request message of the notification service.

In FIG. 36, a case where UE B agrees to the request (that is, a case where an agreement button is input from the UE B user) is assumed.

When UE B agrees to the request of UE A (S3603), UE A and UE B receive D2D IDs of the respective UEs or D2D IDs of all UEs (that is, UE A and UE B) from a D2D ID management server (S3604). That is, the D2D ID management server transfers the mutual D2D IDs to UE A and UE B through a predetermined procedure to allow UE A and UE B to know D2D IDs of counterparts thereof.

Herein, the D2D ID management server may be implemented as the base station or a network node (e.g., MME, M2M server, and the like).

Hereinafter, step A will be described in more detail with reference to a drawing. In this case, step A may be divided into procedures of FIG. 37 or 38 given below according to which information is transmitted when the host UE transmits the use agreement request of the notification service to the participant UE.

FIG. 37 is a diagram illustrating a method for proximity-based notification according to an embodiment of the present invention.

Referring to FIG. 37, UE A (that is, the host UE) sets a notification function (e.g., the host UE) like the example of FIG. 35 given above (S3701). That is, the notification method is set when the participant UE list which participates in the notification service and the participant UE is proximate.

The UE A controller transmits the use agreement request message of the notification service to UE B (that is, the participant UE) (S3702).

UE A may transmit the use agreement request message of the notification service, which includes a 'UE A specific information field' to UE B. For example, UE A may transmit the use agreement request message including a proximity-based services (ProSe) application ID.

The ProSe App ID used in a service layer (alternatively, an application layer) is a human readable character or code and a service type and shot information, and the like are transferred and the ProSe App ID is determined as a value which is not changed like an email address.

Further, the use agreement request message of the notification service may further include the schedule time and schedule place information.

When UE B agrees to the request of UE A (S3703) UE B transmits a D2D ID share request message to the D2D ID management server (S3704).

In this case, UE B transmits the D2D ID share request message including the ProSe App IDs of UE A and UE B.

The D2D ID share request message means a message for requesting allocation of the D2D ID to the D2D ID management server.

On the contrary, although not illustrated in FIG. 37, when UE B rejects the request of UE A, UE B may transmit to UE A a response message indicating the rejection as the response to the use agreement request message of the notification service.

The D2D ID management server transmits the D2D IDs to both UE A and UE B as the response to the D2D ID share request message (S3705). That is, the D2D ID management server allocates the D2D ID to each of UE A and UE B and transmits all of the D2D IDs allocated to UE A and UE B to UE A and UE B, respectively.

The D2D ID is transferred while being included in the D2D discovery signal which UE A and/or UE B periodically or aperiodically broadcasts.

When the controllers of UE A and UE B receive the D2D IDs from the D2D management server, the controllers automatically display a notification service ready notification to the respective users (S3706 and 3707).

FIG. 38 is a diagram illustrating a method for proximity-based notification according to an embodiment of the present invention.

Referring to FIG. 38, UE A (that is, the host UE) sets the notification function (e.g., the host UE) like the example of FIG. 35 given above (S3801). That is, the notification method is set when the participant UE list which participates in the notification service and the participant UE is proximate.

The controller of UE A transmits the use agreement request message of the notification service to UE B (that is, the participant UE) (S3802).

Herein, the use agreement request message of the notification service may include the schedule time and schedule place information.

When UE B agrees to the request of UE A (S3803), UE B transmits to UE A a response message indicating the agreement as the response to the use agreement request message of the notification service (S3804).

On the contrary, although not illustrated in FIG. 38, when UE B rejects the request of UE A, UE B may transmit to UE A a response message indicating the rejection as the response to the use agreement request message of the notification service.

UE A and UE B transmit a D2D ID share request message to the D2D ID management server (S3805 and S3807).

Herein, UE A may transmit the D2D ID share request message including the UE A specific information field (e.g., the ProSe App ID of UE A) and UE B may transmit the D2D ID share request message including a UE B specific information field (e.g., the ProSe App ID of UE B).

The D2D ID management server transmits to UE A the D2D ID allocated to UE A as the response to the D2D ID share request message received from UE A (S3803). Further, the D2D ID management server transmits to UE B the D2D ID allocated to UE B as the response to the D2D ID share request message received from UE B (S3806).

That is, UE A is allocated with the D2D ID of UE A and UE B is allocated with the D2D ID of UE B from the D2D ID management server.

Subsequently, the controllers of UEs that agree to the notification service share mutual D2D IDs (S3809). That is, UE A transmits the D2D ID of UE A to UE B and UE B transmits the D2D ID of UE B to UE A.

When sharing the D2D ID is completed, the controllers of UE A and UE B automatically display the notification service ready notification to the respective users (S3810 and 3811).

In the aforementioned first step, the D2D ID management server may be implemented by various schemes and basically, a method matching a specific information field and the D2D ID may vary depending on a personality of a server manager. This will be described with reference to a drawing given below.

FIG. 39 is a diagram for describing a method for matching a specific information field and a D2D ID according to an embodiment of the present invention.

Referring to FIG. 39, the provider may use the specific information field for matching the D2D ID based on the phone number. The phone number is transferred to a D2D ID server operated by the communication provider to be allocated with the D2D ID.

Further, a chip manufacturer may use a unique ID of a chip installed in the UE for the specific information field for matching the D2D ID.

Further, other application and service providers may use an e-mail or a website of the user or login account information of the application for the specific information field for matching the D2D ID.

Referring back to FIG. 36, the second step will be described in detail.

When it is assumed that since then, a time elapsed and a set date of a predetermined function arrives in step S3601, both the host and the participant will start toward an appointed place.

In this case, the D2D discovery signal may be broadcasted (that is, the D2D ID may be broadcasted) or not broadcasted according to setting of the users of UE A and UE B or the operating application.

In FIG. 36, it is assumed that a function associated with transmission of the discovery signal is turned off in both UE A and UE B.

Further, in FIG. 36, it is assumed that an alarm is set 1 hour before the schedule time in UE A (that is, the host UE) like the example of FIG. 35.

As such, since the alarm is set 1 hour before the schedule time in UE A, the controller of UE A starts transmitting the discovery signal earlier than UE B (S3605). In FIG. 36, the step in which UE A broadcasts (that is, D2D ID broadcasting) the discovery signal is omitted for easy description.

Thereafter, UE B starts transmitting the discovery signal by the controller of UE B (S3606). Herein, a start time of the discovery signal of UE B may be automatically set and in this case, the start time may be previously set at the schedule time or a predetermined time before the schedule time. Alternatively, transmission of the discovery signal may start from a time set by the user of UE B.

When UE A receives the discovery signal from UE B, UE A senses that UE B is proximate based on the D2D ID in the discovery signal (S3607) and displays a notification that UE B is proximate on the screen and notifies the notification to the user (S3608).

Further, when UE B also receives the discovery signal from UE A, UE B senses that UE A is proximate based on the D2D ID in the discovery signal and displays a notification that UE A is proximate on the screen and notifies the notification to the user (S3609).

In this case, since receiving the D2D discovery signal means that the UE-to-UE distance is within the coverage of the discovery signal, each UE may verify that a distance from counterpart UE that transmits the discovery signal is the coverage (e.g., approximately 1 km) of the discovery signal.

Further, each UE may calculate a distance between each UE and the counterpart UE group member UE or the position of the counterpart UE by using the methods described in FIGS. 17 to 26 given above based on the discovery signal received from the counterpart UE. In addition, when the counterpart UE is close by a predetermined (set by the user or default) distance in UE A and/or UE B, a notification message indicating that the counterpart UE is proximate may be displayed on the screen.

As such, when the participants are close to a meeting place, since the participants are naturally positioned at a position close to each other, the participants sense that the counterparts are proximate to each other and display the notification message.

Hereinafter, a user use case for a notification service according to the present invention will be described.

FIG. 40 is a diagram illustrating a user interface for implementing a method for proximity-based notification according to an embodiment of the present invention.

Referring to FIG. 40, as illustrated in FIG. 40A, when terminal A detects that UE B is proximate within a constant distance (within a discovery signal coverage, a predetermined distance), UE A (that is, a controller) displays a notification message that UE B is proximate on a screen.

Herein, in a notification message window, a call connection button 4001, a message transmission button 4002, and a verification button 4003 may be displayed together.

When the user selects the call connection button 4001, UE A attempts to connect the call to UE B.

When the user selects the message transmission button 4002, UE A is converted into a message transmission screen (that is, a message window with UE B) as illustrated in FIG. 40B to receive the message from the user.

When the user selects the verification button 4003, UE A recognizes that the user verifies the notification message and closes the notification message window.

FIG. 41 is a diagram illustrating a user interface for implementing a method for proximity-based notification according to an embodiment of the present invention.

In FIG. 41A, when terminal A (a host terminal) detects that UE B and terminal C are proximate within a constant distance (within a discovery signal coverage, a predetermined distance), UE A (that is, a controller) displays a notification message that UE B and UE C are proximate on a screen.

Herein, on a notification message window, a position button 4101 and a verification button 4102 may be displayed together.

When the user selects the position button 4101, UE A converts a map screen as illustrated in FIG. 40B to display positions of UE B 4103 and terminal C 4104 on the map.

A technique capable of verifying its own position includes a method for using a GPS. In addition, a LTE/LTE-A positioning technique may be used. That is, a technique of verifying positions of terminals by receiving a positioning reference signal (PRS) transmitted by a neighboring base station to analyze a difference in arrival time of the received signal may be used.

UE B and UE C measure their own positions by using the method and may transmit information on their own positions to UE A through a D2D data channel, respectively.

In this case, the B/C terminal may receive a D2D data channel resource (that is, a PSSCH resource) to the base station in order to transmit information on its position to UE A through the D2D data channel and transmit D2D data (that is, information on their positions) to UE A by using the received.

Further, UE A may calculate a distance between UE A and UE B/C or a position of UE B/C by using the method described in FIGS. 17 to 26 below.

On the contrary, when the user selects the verification button 4102, UE A recognizes that the user verifies the notification message and closes the notification message window.

FIG. 42 is a diagram illustrating a user interface for implementing a method for proximity-based notification according to an embodiment of the present invention.

FIG. 42 illustrates a case where all except for UE B are gathered at a predetermined place. When the late UE B is approximate to an adjacent position, the gathered participant terminals all receive a discovery signal transmitted from UE B to detect that UE B is proximate to the periphery and the participant terminals (that is, controllers) all display a notification message for notifying that UE B is approximate. FIG. 42A illustrates a screen of UE A (the host terminal).

Like the example of FIG. 40 above, on a notification message window, a call connection button 4201, a message transmission button 4202, and a verification button 4203 may be displayed together.

When the user selects the call connection button 4201, UE A attempts to connect the call to UE B.

When the user selects the message transmission button 4202, UE A is converted into a message transmission screen (that is, a message window with UE B) as illustrated in FIG. 42B to receive the message from the user.

When the user selects the verification button 4203, UE A recognizes that the user verifies the notification message and closes the notification message window.

Referring back to FIG. 36, Step 3 will be described in detail.

In the schedule function set in step S3601 above, when the schedule time ends, each terminal (the controller of UE A and UE B) automatically transmits a D2D ID return request message to a D2D ID management server, and then the D2D ID is released for other users (S3611).

Simultaneously, each terminal (the controller of UE A and UE B) stops discovery signal transmission (that is, broadcasting of the D2D ID of each terminal).

In this case, in the controller of each terminal, a reference of two actions (that is, the D2D ID return and the discovery message transmission interruption) above may follow a schedule time set in the schedule function as described above, but a field for the discovery message transmission interruption (that is, notification service off) may be added to the schedule function. Herein, UE A may set the reference of the discovery message transmission interruption as a reference by a distance or a time. For example, when all of the participant terminals are reached within a predetermined distance (for example, 5 m) based on UE A (host terminal), the discovery signal may be interrupted, or when a predetermined time (for example, 5 minutes) is elapsed from the schedule time, the discovery signal may be interrupted.

Further, even though the field is not separately added, when all of the participant terminals are reached within the predetermined distance (for example, 5 m) based on UE A (host terminal) or the predetermined time (for example, 5 minutes) is elapsed from the schedule time, the discovery signal may be automatically interrupted.

As such, according to the method for proximity-based notification of the present invention, it is advantageous that any one having the D2D device may receive the service without a pre-built service platform. In addition, existing users may easily use the notification service using the D2D discovery signal by adding only the related field to a practiced calendar application.

Meanwhile, yet another embodiment of the method for proximity-based notification according to the present invention will be described.

The method for proximity-based notification according to the present invention proposes a method in which the terminal finds association services (stores, goods, etc.) of information stored or shown through a specific function by using a specific algorithm and the terminal performs a specific operation when the specific condition is satisfied. For example, when word A is received from the user, the terminal performs an associated operation (for example, provides an association service) when any condition is satisfied at any position by mapping/extracting service B associated with the word A.

The aforementioned "algorithm" is commonly referred to as specific hardware mapping an extracted word input from the user with association words/association service language, software performing the function/role, or an object expressed in a combination thereof. Hereinafter, for convenience of description, it may be referred to as 'a serendipity engine (S-engine)' or 'a smart agent (S-agent)'.

For example, when the above algorithm is implemented by a processor, the mapping operation may be performed in a processor of the terminal. Further, when the above algorithm is implemented by a separate hardware module, the mapping operation may be performed by the corresponding module. Further, when the above algorithm is implemented by software, an algorithm code is stored in a memory and the processor may perform the mapping operation by referring to the code stored in the memory.

In order to recommend the specific service (that is, the association service) to the user, user related information is required. As an example of a method for collecting the information, all types of information which is received to letters and numbers, audio languages, scanning documents/drawings, various applications (calendars, memos, notices, Internet applications, etc.) typed directly from the user or downloaded or downloaded and processed from an external device (for example, a web site server) corresponds thereto. Hereinafter, although not explicitly mentioned in the present invention, when the S-engine may extract and/or process meaningful information when any type is input, the input may be considered as an available input. Furthermore, sensing information measured or received through the sensor of the terminal such as shock, temperature, biometric information, and smell may be used as an input value of the S-engine.

For example, when the text is received from the user, the terminal determines contents of the corresponding text, maps words associated with the meaning of the text, and associates the mapped words with the recommendation service to propose the corresponding service to the user.

Further, in the case of SMS texts or Internet, the terminal extracts words which are clicked or selected by the user and processes the extracted words to propose a user customized service. That is, the user may use the texts, Internet, or the like and then select manually desired information. Hereinafter, in this specification, for convenience of description, a function of manually selecting and extracting specific words or sentences by the user may be called a (smart) link function.

FIG. 43 illustrates a user interface for receiving the information from the user according to an embodiment of the present invention.

In FIG. 43, for convenience of description, a text in which information transferred to the S-engine is input from the user will be exemplified and described.

In the case of calendar, notification, note applications, when the user stores the information, the stored information may be automatically transferred to the S-engine.

In the case of the calendar application, as illustrated in FIG. 43A, an association word (serendipity) 4301 with the position input from the user is transferred to the S-engine.

In the case of the notification application, as illustrated in FIG. 43B, an association word (serendipity) 4302 with the position input from the user is transferred to the S-engine.

In the case of the memo application, as illustrated in FIG. 43C, the entire content 4303 written in the memo input from the user may be transferred to the S-engine.

Although not illustrated in FIG. 43, in addition, even in various functions (alternatively, applications) of the terminal stored based on other texts, the association word (serendipity) or the entire content is transferred to the S-engine.

Further, even in the case of the calendar application and the notification application, like the memo application, the entire memo content input from the user is transferred to the S-engine and the S-engine may also perform an information processing operation by itself. For example, the S-engine may perform mapping of the association word/association service for each unit by dividing the sentence into predetermined units (for example, morphemes and words) and extracting meaning units.

Before the information input from the user is transferred to the S-engine, the user may pre-verify whether information can be mapped in the S-engine.

For example, in the case of the calendar application and the notification application, button type icons 4301a and 4302a are displayed beside the association word (serendipity) are displayed, and like the memo application, when the entire content is transferred to the S-engine, a button 4303a is displayed in a separate space in the screen.

When the information input from the user can be mapped by the S-engine, the association word input buttons 4301a, 4302a, and 4303a are received from the user, the terminal displays the information input from the user and the mapped association word/association service language in a separate screen or popup form.

When the information input from the user can not be mapped by the S-engine, the terminal displays the association word/association service language on the manually connected screen as illustrated in FIG. 43D.

In FIG. 43D, for convenience of description, a word which can not be mapped with the association word/association service language is assumed as "aspirin".

After the user inputs the word of "aspirin", when the user presses the association word input buttons 4301a, 4302a, and 4303a, as illustrated in FIG. 43D, the word is connected to the screen selecting a service name corresponding to "aspirin". The "aspirin" is a type of "drug" and thus it is assumed that the user selects a service name of "pharmacy" in FIG. 43D. When the word of "pharmacy" is selected by the user, a service corresponding to the pharmacy is manually connected and the word is recorded (transferred) the S-engine. Thereafter, when the "aspirin" is input from the user, the S-engine may map the "aspirin" to the "pharmacy".

When the user inputs one or more words, the words are segmented base on a blank text and the operation of FIG. 43D is performed. In the case of inputting "eating aspirin", "aspirin" and "eat" may be displayed on the screen illustrated in FIG. 43D, respectively.

FIG. 44 is a diagram illustrating a user interface for receiving information from a user by using a link function according to an embodiment of the present invention.

FIG. 43A illustrates a process of extracting the information input by the user by a link function to transfer the extracted information to the S-engine.

For example, when the user lengthily selects the link function by pressing (alternatively, touching) the message, a link selection window 4401 may be displayed on the screen. The link selection window 4401 includes an S-engine input button 4401a. When the user selects the S-engine input button 4401a, a word associated with the action in the corresponding text message, that is, a word of "cold medicine" is displayed in the terminal, and when the corresponding word is clicked by the user, the corresponding word is transferred to the S-engine.

FIG. 43B illustrates an internal operation of the S-engine.

The S-engine basically stores a table mapping an association service and a service ID. Hereinafter, in this specification, for convenience of description, herein, the table is called an association service table.

Herein, the service ID means an identifier for distinguishing a specific store (alternatively, a D2D terminal/device installed in the store). The service ID may be the same identifier as the D2D ID or a different identifier from the D2D ID.

FIG. 45 is a diagram illustrating an association service table according to an embodiment of the present invention.

Referring FIG. 45, the association service table is configured by association words and the corresponding service identifier (ID).

FIG. 45 illustrates an example of the association service table. That is, the present invention is not limited thereto and configuration items of the association service table may be partially changed if necessary.

The association service table allows multi-language support and is compared based on a language input by the user. Further, the association service table may be manually updated by the user through a separate UI screen, a signal of the neighboring LTE D2D device is received and updated, or data is received from the service ID management server to be integrally updated.

Hereinafter, for convenience, a process of mapping the user's input and the association words will be described by exemplifying Korean in FIG. 45.

Referring to FIGS. 44 and 45, In FIG. 44A, the S-engine receiving the word of "cold medicine" searches the association word in the association service table to search whether the same word as the "cold medicine" is present.

Like the example of FIG. 45, in the association service table, there is no association word of the "cold medicine". As such, when an association word coinciding with one word is not present, the S-engine researches the word in a combination of two or more words. In the above example, the word of "cold" and the word of "medicine" are combined to be "cold medicine" and thus a service ID 0x001123 corresponding to "cold" or "medicine" is mapped.

The association word and the mapped service ID are added to a list monitoring the D2D discovery signal together with link information which can be approximate to the application in which the words are extracted. For convenience of description, herein, the list is referred to as a D2D discovery signal monitoring list.

FIG. 46 is a diagram illustrating a D2D discovery signal monitoring list according to an embodiment of the present invention.

The D2D discovery signal monitoring list (alternatively, the D2D signal monitoring list) may be configured in a form of FIG. 46, and link information (that is, an association link) capable of finding a function (alternatively, an application program and an application) of receiving the information from the mapped service ID and the user is stored. That is, when the information is extracted from an SMS message through the link function, Message ID:5 is stored as the association link, and in the case of receiving the information from the user in the calendar application, Calendar ID:8 is stored as the association link.

The configuration items in the D2D discovery signal monitoring list may be partially changed if necessary. The D2D discovery signal monitoring list can be stored within an available range of a terminal memory without a limitation.

Referring back to FIG. 44, the association word of "cold medicine" may be mapped to an association store of "pharmacy" by the S-engine of the terminal according to the above-described method. That is, the association word of "cold medicine" is mapped with the service ID corresponding to "pharmacy" and the terminal generates the D2D discovery signal monitoring list configured by the corresponding service ID and the link information.

FIG. 44C illustrates a terminal screen which can be viewed by the user when the pharmacy is present among neighboring stores.

When the LTE D2D device broadcasting the discovery signal is present around the user terminal during moving, the user terminal continuously receives the D2D discovery signal. In addition, in the case of coinciding with the service ID (that is, a service ID recommended in the S-engine) in the D2D discovery signal monitoring list among the received D2D discovery signals, as illustrated in FIG. 44C, a name of the corresponding store, a position of the store, and a guide message 4403 are shown.

The guide message 4403 may include an original text viewing button 4403a and a verification button 4403b.

When the call original text viewing button 4403a is selected by the user, the terminal is converted to a screen which has been registered though the link function. In this case, the terminal is converted to the corresponding screen by referring to the link information included in the D2D monitoring list. Herein, the link information means input information input from the user to refer to generated the original text viewing association word, and for example, a text message, a memo, a voice, an Internet page, and the like may correspond thereto.

Meanwhile, when the verification button 4403b is selected by the user, the guide message window disappears.

Additionally, the service ID may be hierarchically configured through a combination of one or more sub-service IDs. This will be described in detail with reference to the following drawings.

FIG. 47 is a diagram illustrating a branch of a hierarchical service ID according to an embodiment of the present invention.

Referring to FIG. 47, a top level corresponds to a commercial ID and may be hierarchically classified as a lower level until reaching a lowest-level store ID.

FIG. 47 illustrates an example in which the commercial ID is classified as a lower-level broad category, the broad category is classified as a lower-level sub-category, the sub-category is classified as a lower-level business name, and the business name is classified as a lower-level store ID. Herein, one sub-category is assumed and exemplified, but the sub-category may not be present and a plurality of sub-categories may also be present.

In addition, a sub-service ID according to the corresponding level is allocated for each level. The commercial ID and the store ID may correspond to the sub-service ID. Further, an unique sub-service ID may be allocated for each node which belongs to each broad category, the sub-category, and the business name.

In the association service table configured by the terminal, a plurality of sub-service IDs for each association word may be mapped. This will be described in detail with reference to the following drawings.

FIG. 48 is a diagram illustrating a mapping result of an association word and a service ID according to an embodiment of the present invention.

As illustrated in FIG. 48, when the association words are 'cold', 'fatigue', 'medicine', 'pharmacy', and 'hospital', a level N−1 sub-service ID 0x2134 (meaning of 'health') and a level N sub-service ID 0x1123 (meaning of 'pharmacy') may be mapped with each other.

As such, when the plurality of sub-service IDs for the association word is mapped, each sub-service ID may be mapped with a plurality of hierarchical sub-service IDs at different levels in a hierarchical service branch.

Further, when the plurality of sub-service IDs for the association word is mapped, each sub-service ID may be mapped with a plurality of sub-service IDs at the same levels in a hierarchical service branch.

For example, in the example of FIG. 47 below, when an association word is 'café', sub-service IDs corresponding to 'café' and 'restaurant' and a sub-service ID corresponding to a coffee shop may be mapped with each other.

As such, since the service ID may be hierarchically configured through a combination of one or more sub-service IDs, each association word and one or more sub-service IDs may be mapped in the association service table.

Further, similarly, one or more sub-service IDs corresponding to the link information may be stored in the D2D discovery signal monitoring list. That is, in the example of FIG. 46 above, one association link (that is, an application in which an association word is extracted and the like) and the plurality of sub-service IDs may be mapped with each other and stored.

Further, each store may transmit a discovery signal including its own higher-level sub-service ID in a hierarchical structure. This will be described in detail with reference to the following drawings.

FIG. 49 is a diagram illustrating a format of a discovery signal according to an embodiment of the present invention.

Referring to FIG. 49, the D2D discovery signal includes a service ID field 4901. The service ID field 4901 includes a sub-service ID corresponding to each level in the hierarchical structure of the service ID. FIG. 49 illustrates a case where a level 1 sub-service ID 4911, a level 2 sub-service ID 4912, a level 3 sub-service ID 4913, a level 4 sub-service ID 4914, a level 5 sub-service ID 4915, and a level 6 sub-service ID 4916 are included.

When the terminal receives the D2D discovery signal, with reference to the hierarchical branch structure of the service ID, when at least one sub-service ID among the plurality of sub-service IDs mapped with a specific association word in the discovery signal monitoring list configured by the terminal is matched, the terminal determines that the D2D discovery signal mapped with the corresponding association word is detected. That is, when one or more sub-service IDs included in the discovery signal are matched with one or more sub-service IDs mapped with the specific association word in the discovery signal monitoring list, the terminal determines that the D2D discovery signal mapped with the corresponding association word is detected.

Further, the terminal determines that a desired service of the user is provided in a neighborhood and selects and notifies an optimal method (for example, a graphical representation, a sound representation, a haptic representation, and the like) to the user.

Further, when the plurality of sub-service IDs mapped with the specific association word in the discovery signal monitoring list is matched with the discovery signal received by the terminal, the terminal may first determine that a lowest-level sub-service ID among the plurality of matched sub-service IDs is mapped. In addition, the terminal notifies to the user that the service in which the lowest-level sub-service ID is mapped in a neighborhood.

In this case, the terminal may notify to the user that the service mapped in the second-level sub-service ID is also provided in the neighborhood.

Further, the terminal notifies to the user that the service mapped in the lowest-level sub-service ID is mapped is provided in the neighborhood, but when a feedback input that the information is inadequate is received by the user, the terminal may notify that the service mapped in the second-level sub-service ID among the plurality of sub-services is secondarily provided in the neighborhood.

In this case, a method in which the terminal notifies to the user that the mapped service is provided in the neighborhood or contents thereof may vary according to a level of the mapped sub-service ID.

FIG. 50 is a diagram illustrating a setting menu screen for implementing a method of proximity-based notification according to an embodiment of the present invention.

FIG. 50 illustrates a separate setting menu screen capable of controlling the S-engine, and the user can verify information on the S-engine and enables a detailed setting. Basically, the following functions may be performed through the corresponding menu.

Use of corresponding function

Viewing and updating of association service table

Viewing and deleting of D2D signal monitoring list

The user may use or not the functions through an S-engine on/off button 5001. While the use of the S-engine is turned off, the association word information is not transferred to the S-engine and the terminal does not provide a screen receiving the association word (Serendipity) in each function (alternatively, an application). Further, the terminal does not compare the received D2D discovery signal with the D2D signal monitoring list.

When an association service table 5002 is selected by the user, an association service table corresponding to a language shown in the terminal is displayed. The user may add/correct/delete the association word in the association service table through the corresponding screen.

When a D2D signal monitoring list 5003 is selected by the user, a D2D signal monitoring list which is automatically set in the terminal may be shown. The user may verify an association link through the corresponding screen and delete an undesired monitoring list.

A signal flow for a method of notifying store/service related with the association word by extracting information in which the association word is mapped from the message through the link function will be described with reference to the following drawings.

FIG. 51 is a diagram illustrating a method for proximity-based notification according to an embodiment of the present invention.

Referring to FIG. 51, terminal A receives information for mapping with a service ID from the user (S5101). That is, UE A directly receives the information from the user or receives the information by extracting information for mapping with a service ID by a link function. For example, in the example described above, a word of "cold medicine" is extracted from the message by the link function to be input to the terminal.

UE A (for example, a user D2D terminal) extracts a service ID mapped with the information input in step S5101 (S5102).

That is, UE A extracts the association word mapped with the information input (alternatively, extracted) in step S5101 with reference to the association service table and extracts a service ID mapped with the association word. In addition, the extracted service ID is registered in the D2D signal monitoring list.

For example, UE A searches whether the association word is matched with the word of "cold medicine" among the association words stored in the association service table or matched with the association words stored in the association service table in a combination of two or more words in the example described above. In this case, the word of "cold" and the word of "medicine" are combined to be "cold medicine" and thus a service ID 0x00112 corresponding to the pharmacy is mapped (extracted).

Herein, the S-engine may be present in the terminal, but operate in a specific server.

When the S-engine operates in the server, UE A may transfer the information input (alternatively, extracted) in step S5101 above and receive service information (alternatively, the service ID) mapped with the corresponding information from the server.

As such, when the S-engine operates in the server, even in the case of similar contents which are not matched with the association words, UE A may operate to add the similar contents to the D2D signal monitoring list. If the word of "aspirin" is transferred, the word is not present in the association words, but corresponds to a kind of "medicine, and thus the server transfers the information (alternatively, the service ID) mapped as the service of "pharmacy" by itself and UE A adds the word of "aspirin" in the service ID 0x001123 corresponding to the pharmacy to the D2D signal monitoring list.

Terminal B (for example, a store D2D terminal/device) periodically or aperiodically transmits a discovery signal including the service ID (S5103). Herein, the service ID may be configured by a plurality of sub-service IDs.

UE A monitors whether the service ID is included in the discovery signal transmitted from neighboring D2D terminals (that is, including UE B) (S5104).

In other words, whenever UE A receives the discovery signal of the neighboring D2D terminals (that is, including UE B), UE A compares the discovery signal with the D2D signal monitoring list in real time.

As described above, since the service ID that differentiates a store name/service is included in the discovery signal, the terminal extracts the service ID included in the corresponding signal and continuously verifies whether there are contents in that the service ID is matched with the service ID in the D2D signal monitoring list.

However, this process may operate only when at least one information is stored in the D2D signal monitoring list by considering performance of the terminal (alternatively, the S-engine). Further, this process may operate only when the user sets to use the notification function through a setting menu of the S-engine.

In step S5104 above, in order to provide a position-based association service (that is, a notification service), a direct communication technology between terminals (for example, LTE D2D, Bluetooth, WiFi, WiFi Direct, or the like) is required. For example, in a beacon device (for example, a device based on D2D, Bluetooth low energy (BLE), Wi-Fi direct services (WFDS), and the like) installed in the store, a physical signal including the store information is broadcasted and the terminal in a neighboring coverage receives the physical signal. Since the transmitting and receiving process is required, a transmitting and receiving technology needs to be defined in advance.

If the physical signal is transmitted by using a LTE D2D technique, desired information to be received by using the LTE D2D technique may be accurately obtained.

An example using a LTE D2D discovery signal (DS) will be described. The DS signal may use functionalities of a LTE system standard protocol, that is, channel coding, modulation, multiplexing, and error correction procedure as it is. Further, an uplink resource (LTE uplink band) is used and a resource unit may use a resource block (RB).

It is assumed that a method proposed in the present invention is to transmit the DS to the RB or resources allocated multiple times of RB by using a LTE SC-FDMA or OFDM waveform generation technology.

As described above, the DS signal receives the resource by largely two types of resource allocation methods.

A resource allocation method (type 1) is to allocate a resource pool which is a user to resource allocation units and select a resource to be transmitted by each terminal in the resource. As the selection method, various methods including random selection, received or measured energy based selection, variable transmission probability based selection, and the like are possible. When the number of terminals to be transmitted is larger than the number of resource allocation units in a given resource area, a situation in which two or more terminals selects one discovery resource unit occurs and in this case, there is a difference according to a selection method, but resource collision may occur.

Unlike this, a second resource allocation method (type 2) is a method in which a base station directly manages and allocates the resource of each terminal. That is, since the base station performs an operation of allocating and recovering the separate resource to the terminal, a probability that undesired abnormal collision as the resource collision intentionally occurs actually exists. As the type 2 resource allocation method, a method of periodically or continuously allocating a specific resource for a predetermined time in the resource allocation is included (type 2B), whereas a method of allocating the resource on a one-off basis when requesting a required resource (type 2A).

A resource allocation method for the discovery signal is summarized as follows.

Resource allocation (RA) Type 1: a discovery procedure where resources for discovery signal transmission are allocated on a non UE specific basis RA Type 2: a discovery procedure where resources for discovery signal transmission are allocated on a per UE specific basis RA Type 2A: Resources are allocated for each specific transmission instance of discovery signals RA Type 2B: Resources are semi-persistently allocated for discovery signal transmission In step S5103 above, UE B transmits the discovery signal through the discovery resource allocated according to any one type of the discovery resource allocation types described above.

When the service ID included in the received discovery signal is matched with the service ID included in the D2D signal monitoring list, UE A displays the matched service IDs on the screen to notify the service IDs to the user (S5105).

That is, when UE A receives the discovery signal including the service ID mapped with the information input in step S5101, store information corresponding to the service ID is displayed. In other words, when the store matched with the associated store is detected, UE A notifies the matched store on the screen through the S-engine. The user may verify the information and an original text.

When the original text viewing is selected by the user, UE A displays the detailed notification contents on the screen (S5106).

Particularly, when the original text viewing is selected by the user, UE A moves (is converted) to a function (alternatively, an application program, an application, and the like) in which the information is input (alternatively, extracted) in step S5101 above to display the function on the screen. For example, in the example described above, when UE A parses an association link in the D2D signal monitoring list, Message ID:5 is output and moves to a fifth item of the message function.

Since step S5106 above is a step to be performed if necessary, step S5106 may be omitted.

Further, in steps S5105 and S5106 above, when the screen shown in the terminal is completed, the terminal deletes the corresponding service ID in the D2D signal monitoring list.

Meanwhile, in a situation where a plurality of beacon transmission devices coexists, when the service ID is redundantly received, in order to solve the problem, the following method may be used.

Hereinafter, for convenience of description, a terminal which periodically broadcasts a beacon signal (for example, BLE iBeacon, a D2D discovery signal, or the like) is called a beacon terminal. As an example of the beacon terminal, a user terminal may correspond thereto and a device fixed and installed in a store and the like may correspond thereto.

1) Selection Method in Reception Terminal (BLE Beacon Terminal to D2D Beacon Terminal)

A BLE based beacon signal (hereinafter, referred to as 'iBeacon') and a LTE D2D discovery signal may coexist at the same place and the same time, and in this case, the operation of the terminal is proposed as follows. A case where both the iBeacon and the LTE D2D discovery signal support the same service based on the S-engine is assumed. In this case, various operation methods based on a technology or an application program are possible.

FIG. 52 is a diagram illustrating a method for preventing duplication of a service ID according to an embodiment of the present invention.

Referring to FIG. 52, a first beacon terminal (e.g., a BLE beacon terminal) and a second beacon terminal (e.g., a D2D discovery (beacon) signal transmitting terminal) broadcast a first beacon signal (e.g., iBeacon) and a second beacon signal (e.g., the discovery signal), respectively (S5201).

The terminal selectively receives the beacon signal among the first beacon signal and the second beacon signal (S5202).

When this is described in detail, the terminal may operate so that any one beacon signal is bound in terms of software or hardware so as to prevent receiving functions of the first beacon signal and the second beacon signal from being simultaneously turned on. For example, when the receiving function of iBeacon is turned on, the terminal operates so that the D2D discovery signal receiving function is turned off or operates so that the D2D discovery signal receiving function is turned on (operate alternately to each other). That is, the terminal may deactivate a function of any one communication module. If a priority is present between two associated words, only a receiving function of a specific signal having the high priority operates. For example, if a higher priority is set for the D2D discovery signal receiving function, the BLE iBeacon receiving function may be turned off. In other words, when both beacon signals (the iBeacon and discovery signals) are received, (that is, in an environment in which both beacon signals are received), the receiving function of any one beacon signal is turned off. Even when multiple application programs use the first beacon signal or the second beacon signal by extending such a concept, only the beacon signal receiving function of one of both beacon signals may be configured to be turned off.

Further, when a specific application program is configured to have the priority, the function of a communication module connected with the corresponding application program as a first priority may be turned on and the function of the residual communication module may be turned off. Alternatively, reverse implementation thereto is available.

Further, both the receiving functions of the first beacon signal and the second beacon signal are configured to be simultaneously turned on, but in the application program, simultaneous turn-on is bound to display the notification on the screen. That is, when the beacon signal is received by the physical layer and transferred to the high layer, the beacon signal transferred from the lower layer may be selectively bound in a highest layer (e.g., the application layer) that operates the application program. To this end, for which beacon signal the priority needs to be determined in the application program in advance. Settings of the priority may be changed by the user.

Further, both the receiving functions of the first beacon signal and the second beacon signal may be simultaneously turned on and both function based signals are simultaneously received to provide a separate service. That is, an ID (e.g., iBeacon ID) receiving the first beacon signal and an ID (e.g., D2D ID) receiving the second beacon signal are combined to transfer new information. Further, this may be implemented through a separate device. However, a terminal that may not recognize a combination of both IDs may receive the service based on the respective IDs.

As such, a problem may be prevented, in which a receiving end of the beacon signal selectively receives the beacon signal, and as a result, a service ID is duplicatively transmitted.

2) Method for Stopping Transmission Through Mutual Signal Detection Between Transmitting Beacon Devices (BLE Beacon Terminal to D2D Beacon Terminal)

In a situation in which the BLE iBeacon and the D2D discovery signal (beacon) are simultaneously transmitted, if the D2D beacon device (terminal) has the signal receiving function, the BLE beacon device may be turned off.

FIG. 53 is a diagram illustrating a method for preventing duplication of a service ID according to an embodiment of the present invention.

Referring to FIG. 53, a first beacon terminal (e.g., a BLE beacon terminal) and a second beacon terminal (e.g., a D2D discovery (beacon) signal transmitting terminal) broadcast a first beacon signal (e.g., iBeacon) and a second beacon signal (e.g., the discovery signal), respectively (S5301).

The first beacon terminal transmits a beacon stop request message for requesting stopping transmission of the beacon signal to the second beacon terminal (S5302). The second beacon terminal that receives the beacon stop request message stops transmitting the beacon signal (S5303).

For example, the D2D beacon device/terminal receives the iBeacon, the D2D beacon device/terminal attempts the connection to the BLE beacon device/terminal to stop the BLE device/terminal to transmit the beacon. Alternatively, reverse implementation thereto is also available. The operation may be selected according to which device the higher priority is set in the beacon signal.

3) Method for Turning Off Transmission of Other Device by Contacting and Connecting External Device (Between D2D Beacon Device and Terminal)

A docking apparatus (e.g., a docking station or a docking accessory) may be present for charging the terminal and interface with other device. In this case, when the terminal is connected to the docking apparatus or power of the terminal is connected, transmission of the beacon signal of other beacon terminal may be turned off by sensing such a situation. That is, D2D device (alternatively, BLE device) on/off may be automatically configured by using the docking apparatus. Hereinafter, the method will be described by assuming the D2D device for easy description.

The docking apparatus has a separate unique ID which interlocks with one D2D ID and when the D2D terminal is mounted on the docking apparatus, the D2D terminal automatically transmits the corresponding D2D ID. In this operation, it is assumed that even though the D2D terminal transmits another D2D ID from the related art, when the D2D terminal docks the docking apparatus, another D2D ID which interlocks with the docking apparatus is automatically changed.

FIG. 54 is a diagram illustrating a method for preventing duplication of a service ID according to an embodiment of the present invention.

When the terminal accesses the docking apparatus (S5401), the terminal broadcasts the discovery signal for requesting stopping the use of the same D2D ID (S5402).

Herein, at the moment when the discovery signal for requesting stopping the use of the same D2D ID is connected to the docking station, a specific discovery signal (alternatively, the beacon signal) may corresponding thereto and further, the operation of the beacon device using the same D2D ID around the beacon device by using a specific D2D ID may be turned off. In this case, a specific discovery signal may be continuously transmitted, but the specific discovery signal may be transmitted temporarily only for a predetermined time at the connection moment.

Thereafter, the terminal broadcasts the discovery signal (alternatively, the beacon signal) including a normal D2D ID (S5403).

Further, the discovery signal (including a specific discovery signal or a special D2D ID) for requesting stopping the use of the same D2D ID may be transmitted only for a partially limited time in the course of transmitting the normal D2D ID.

In addition, information for requesting stopping the use of the same D2D ID may be transmitted while being included in a normal discovery signal. That is, step S5402 given above may be omitted and the information for requesting stopping the use of the same D2D ID may be transmitted while being included in the discovery signal transmitted in S5403.

In more detail, the signal which the D2D device mounted on the docking station transmits includes a D2D on/off field to turning off the device transmitting the same D2D ID around the device to indicate a specific value in the corresponding field. When the D2D device that transmits the same D2D ID (that is, transmits the discovery signal) is present around the D2D device and the D2D device receives the same D2D ID and the D2D on/off field is configured (that is, an off value is indicated), the corresponding D2D device that receives the D2D ID is automatically turned off. The D2D on/off field may not arbitrarily be input in a general user or server and the D2D on/off field may be limited to a particular case such as a case in which the D2D device docks the docking station.

General Wireless Communication Apparatus to which Present Invention can be Applied FIG. 55 is a block diagram of a wireless communication apparatus according to an embodiment of the present invention.

Referring to FIG. 55, the wireless communication system includes a base station/network node 5510 and multiple terminals 5520 (alternatively, a D2D/BLE beacon terminal/device). Herein, one example of the network node may correspond to an MME or M2M server.

The base station/network node 5510 includes a processor 5511, a memory 5512, and a communication unit 5513.

The processor 5511 implements a function, a process, and/or a method which are proposed in FIGS. 1 to 54 given above. Layers of a wired/wireless interface protocol may be implemented by the processor 5511. The memory 5512 is connected with the processor 5511 to store various pieces of information for driving the processor 5511. The communication unit 5513 is connected with the processor 5511 to transmit and/or receive a wired/wireless signal. In particular, when the base station/network node 5510 is a base station, the communication unit 5513 may include a radio frequency (RF) unit for transmitting/receiving the wireless signal.

The terminal 5520 includes a processor 5521, a memory 5522, and a communication unit (alternatively, a radio frequency (RF) unit) 5523. The processor 5521 implements a function, a process, and/or a method which are proposed in FIGS. 1 to 54 given above. The layers of the radio interface protocol may be implemented by the processor 5521. The memory 5522 is connected with the processor 5521 to store various pieces of information for driving the processor 5521. The communication unit 5523 is connected with the processor 5521 to transmit and/or receive a radio signal.

The memories 5512 and 5522 may be positioned inside or outside the processors 5511 and 5521 and connected with the processors 5511 and 5521 through various well-known means. Further, when the base station/network node 5510 is the base station, the terminal 5520 may have a single antenna or multiple antennas.

FIG. 56 is a block diagram of another terminal according to an embodiment of the present invention.

Referring to FIG. 56, a terminal 5600 may include a wireless communication unit 5610, an input unit 5620, a sensing unit 5640, an output unit 5650, a memory 5660, an interface unit 5670, a control unit 5680, and a power supply unit 5690. The components illustrated in FIG. 56 are not essential components. Therefore, a mobile terminal having more components therethan or less components therethan may be implemented.

Hereinafter, the components will be described in sequence.

The wireless communication unit 5610 may include one or more modules that enable wireless communication between the terminal 5600 and the wireless communication system or between the terminal 5600 and a network on which the terminal 5600 is positioned. For example, the wireless communication unit 5610 may include a broadcast receiving module 5611, a mobile communication module 5612, a wireless Internet module 5613, a short-range communication module 5614, and a positional information module 5615.

The broadcast receiving module 5611 receives a broadcast signal and/or broadcast associated information from an external broadcast management server through a broadcasting channel.

The broadcasting channel may include a satellite channel and a terrestrial channel. The broadcast management server may mean a server that generates and transmits the broadcast signal and/or broadcast associated information or a server that receives a pre-generated broadcasting signal and/or broadcast associated information and transmits the received broadcasting signal and/or broadcast associated information to the terminal. The broadcasting signal includes a TV broadcasting signal, a radio broadcasting signal, and a data broadcasting signal and may include even a broadcasting signal of a form in which the broadcasting signal is combined with the TV broadcasting signal or the radio broadcasting signal.

The broadcast associated information may mean information associated with the broadcasting channel, a broadcasting program, or a broadcasting service provider. The broadcast associated information may be provided eve through a mobile communication network. In this case, the broadcast associated information may be received by the mobile communication module 5612.

The broadcast associated information may be present in various forms. For example, the broadcast associated information may be present in a form such as an electronic program guide (EPG) of digital multimedia broadcasting (DMB) or an electronic service guide of digital video broadcast-handheld (DVB-H).

The broadcast receiving module 5611 may receive a digital broadcasting signal by using digital broadcasting systems including, for example, digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. Of course, the broadcast receiving module 5611 may be configured to be suitable for other broadcasting systems in addition to the aforementioned digital broadcasting systems.

The broadcasting signal and/or broadcast associated information received through the broadcast receiving module may be stored in the memory 5660.

The mobile communication module 5612 transmits/receives the wireless signal to/from at least one of the base station, an external terminal, and the server on the mobile communication network. The wireless signal may include a voice call signal, a video call signal, or various types of data depending on transmission/reception of a text/multimedia message.

The wireless Internet module 5613 which represents a module for a wireless Internet access may be internally or externally installed in the terminal 5600. As the wireless Internet technology, wireless LAN (WLAN) (Wi-Fi), wireless broadband (Wibro), world interoperability for microwave access (Wimax), high speed downlink packet access (HSDPA), or the like, may be used.

The short-range communication module 5614 represents a module for short-range communication. As short range communication technology, Bluetooth, radio frequency identification (RFID), infrared data association (IrDA), ultra wideband (UWB), ZigBee, or the like may be used.

The positional information module 5615 is a module for obtaining the position of a mobile terminal and a representative example of the positional information module 5615 includes a global positioning system (GPS).

The input unit 5620 is used for an audio signal or video signal input or a user input. The input unit 5620 may include a camera 5621 and a microphone 5622 for the audio signal or video signal input.

The camera 5621 processes an image frame such as a still image or a motion picture acquired by an image sensor in a video call mode or a pick-up mode. The processed image frame may be displayed in a display unit 5651.

The image frame processed by the camera 5621 may be stored in the memory 5660 or transmitted to the outside through the wireless communication unit 5610. Two or more cameras 5621 may be provided according to a use environment.

The microphone 5622 receives an external sound signal and processes the received external sound signal as electrical voice data by a microphone in a call mode, a recording mode, a voice recognition mode, or the like. The processed voice data is converted into a form transmittable and output to a mobile communication base station through the mobile communication module 5612 in the case of the call mode. Various noise removing algorithms for removing noise generated in the course of receiving the external sound signal may be implemented in the microphone 5622.

The user input unit 5623 generates input data for controlling an operation of the terminal by a user. The user input unit 130 may include a keypad, a dome switch, a touch pad (resistive/capacitive), a jog wheel, a jog switch, and the like.

The sensing unit 5640 generates a sensing signal for controlling the operation of the terminal 5600 by current states of the terminal 5600, which include an opening/closing state of the terminal 5600, the position of the terminal 5600, where the user contacts, an orientation of the terminal, acceleration/deceleration of the terminal, and the like. For example, when the terminal 5600 is a slide phone type, the sensing unit 5640 may sense whether a slide phone is opened or closed. Further, the sensing unit 5640 may sense whether the power supply unit 5690 supplies power, whether the interface unit 5670 is connected with an external apparatus, and the like. Meanwhile, the sensing unit 5640 may include a proximate sensor, a sensor that may sense a heart rate, a pulse, a breath, a blood pressure, and the like of the user of the terminal 5600, and a sensor that may sense a temperature, noise, and the like around the terminal 5600.

The output unit 5650 which is used for generating an output related with sight, hearing, or touch may include the display unit 5651, a sound output unit 5652, an alarm unit 5653, and a haptic module 5654.

The display unit 5651 displays (outputs) information processed in the terminal 5600. For example, when the mobile terminal is in the call mode, the display unit 5651 displays a user interface (UI) or a graphic user interface (GUI). When the terminal 5600 is in the video call mode or the pick-up mode, the display unit 5651 displays a picked-up or received image, the UI, and the GUI.

The display unit 5651 may include at least one of a liquid crystal display (LCD), a thin film transistor-liquid crystal display (TFT LCD), an organic light-emitting diode (OLED), a flexible display, and a 3D display.

Some of the displays may be configured as a transparent or light transmissive type to view the outside through the displays. This may be called a transparent display and a representative example of the transparent display includes a transparent OLED (TOLED), and the like. The display unit 5651 may be configured in a rear structure and a light transmissive structure. By such a structure, the user may view an object positioned in the rear of a terminal body through an area occupied by the display unit 5651 of the terminal body.

According to the implementation form of the terminal 5600, two or more display units 5651 may be present. For example, in the terminal 5600, a plurality of displays may be separated from each other or integrally disposed on one surface, and further, disposed on different surfaces, respectively.

When the display unit 5651 and a sensor (hereinafter, referred to as a 'touch sensor') sensing a touch operation form a mutual layer structure (hereinafter, referred to as a 'touch screen'), the display unit 5651 may be used as an input device in addition to the output device. The touch sensor may have forms including, for example, a touch film, a touch sheet, a touch pad, and the like.

The touch sensor may be configured to convert pressure applied to a specific portion of the display unit 5651 or a change in capacitance generated at the specific portion of the display unit 5651 into an electrical input signal. The touch sensor may be configured to detect touch pressure as well as touched position and area.

When there is a touch input for the touch sensor, a signal(s) corresponding to the touch input is(are) sent to a touch controller. The touch controller processes the signal(s) and thereafter, transmits data corresponding thereto to the control unit 5680. As a result, the control unit 5680 may know which area of the display unit 5651 is touched.

The proximate sensor may be displayed in an internal area of the mobile terminal, which is covered by the touch screen or in the vicinity of the touch screen. The proximate sensor represents a sensor that detects whether an object approaching a predetermined detection surface or an object which exits in the vicinity of the detection surface is present without a mechanical contact by using force of an electronic system or infrared rays. The proximate sensor is longer in life-span and higher in utilization than a contact type sensor.

Examples of the proximate sensor include a transmissive photoelectric sensor, a direct reflective photoelectric sensor, a mirror reflective photoelectric sensor, a high-frequency oscillation type proximate sensor, a capacitive proximate sensor, a magnetic proximate sensor, an infrared proximate sensor, and the like. When the touch screen is capacitive, the touch screen is configured to detect proximity of a pointer due to a change in electric field depending on the proximate of the pointer. In this case, the touch screen (touch sensor) may be classified as the proximate sensor.

In the aforementioned embodiments, the elements and characteristics of the present invention have been combined in specific forms. Each of the elements or characteristics may be considered to be optional unless otherwise described explicitly. Each of the elements or characteristics may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and or microprocessors or all of them.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

In the wireless communication system, the example in which the proximate based notification method is applied to the 3GPP LTE/LTE-A system is primarily described, but the proximate based notification method can be applied to various wireless communication systems in addition to the 3GPP LTE/LTE-A system.

The invention claimed is:

1. A proximity based notification method in a wireless communication system supporting device to device (D2D) communication, the method comprising:
configuring, by a first terminal, a list of terminals which participate in a notification service and a notification time;
broadcasting, by the first terminal, a discovery signal including a first D2D ID on a physical sidelink discovery channel (PSDCH) when the notification time arrives;
outputting, by the first terminal, a notification for notifying that a second terminal is proximate when the first terminal receives a second discovery signal including a second D2D ID from the second terminal included in the terminal list on the PSDCH;
transmitting, by the first terminal, a notification service use agreement request message for requesting participation in the notification service to the second terminal;
receiving, by the first terminal, the first D2D ID and the second D2D ID from a D2D ID management server; and
returning, by the first terminal, the first D2D ID to the D2D ID management server.

* * * * *